United States Patent [19]

Cukor et al.

[11] Patent Number: 5,168,444
[45] Date of Patent: Dec. 1, 1992

[54] SHIPMENT SYSTEM INCLUDING PROCESSING OF DOCUMENT IMAGES

[75] Inventors: Peter M. Cukor, Berkeley; Charles J. Rosselle, Lafayette; Steven Archibald, Oakland; Matthew C. Hobbs, Richmond, all of Calif.

[73] Assignee: Teknekron Transportation Systems, Berkeley, Calif.

[21] Appl. No.: 437,477

[22] Filed: Nov. 15, 1989

[51] Int. Cl.⁵ ............................................. G06F 15/21
[52] U.S. Cl. ..................................... 364/401; 364/406
[58] Field of Search ................................. 364/401, 406

[56] References Cited

U.S. PATENT DOCUMENTS

| | | | |
|---|---|---|---|
| 4,264,808 | 4/1981 | Owens et al. | 235/379 |
| 4,553,206 | 11/1985 | Smutek et al. | 364/300 |
| 4,918,588 | 4/1990 | Barrett et al. | 364/200 |

OTHER PUBLICATIONS

*Modern Railroads*, "Trafficking Invoices Behind the Freight", Oct. 1989, pp. 46-47 (abstract only).
*Systems/3X & AS World*, vol. 18, No. 7, Jul. 1990, "The Paper Predicament", p. 72 (abstract only).
*Columbus Dispatch*, May 24, 1991, "Freight Firm Tries Going Paperless", p. G2 (abstract only).

*Communication News*, "Wide Area Networks: How Consolidated . . .", Aug. 1991, p. 19.

Primary Examiner—Robert Weinhardt
Assistant Examiner—David Huntley
Attorney, Agent, or Firm—Townsend & Townsend

[57] ABSTRACT

An integrated system for image processing of documents generated in shipping transactions includes a central transaction processing facility, which receives images of shipping transaction documents. The document images may be captured by scanners at a plurality of remote stations or they may be telefaxed directly to the processing facility by the individual shippers. A central shipping transaction database is maintained on a host computer, for example, along with appropriate applications for processing the transaction data and invoicing the transactions. The system includes a plurality of image processing stations, at which key operators may view the images of shipping documents according to predetermined workflow queues and, based on the images of the documents, enter transaction data into the shipping transaction database. The system allows for printing of transaction invoices from the data in the database along with a hard copy of any shipping document images which are to accompany the invoices.

9 Claims, 45 Drawing Sheets

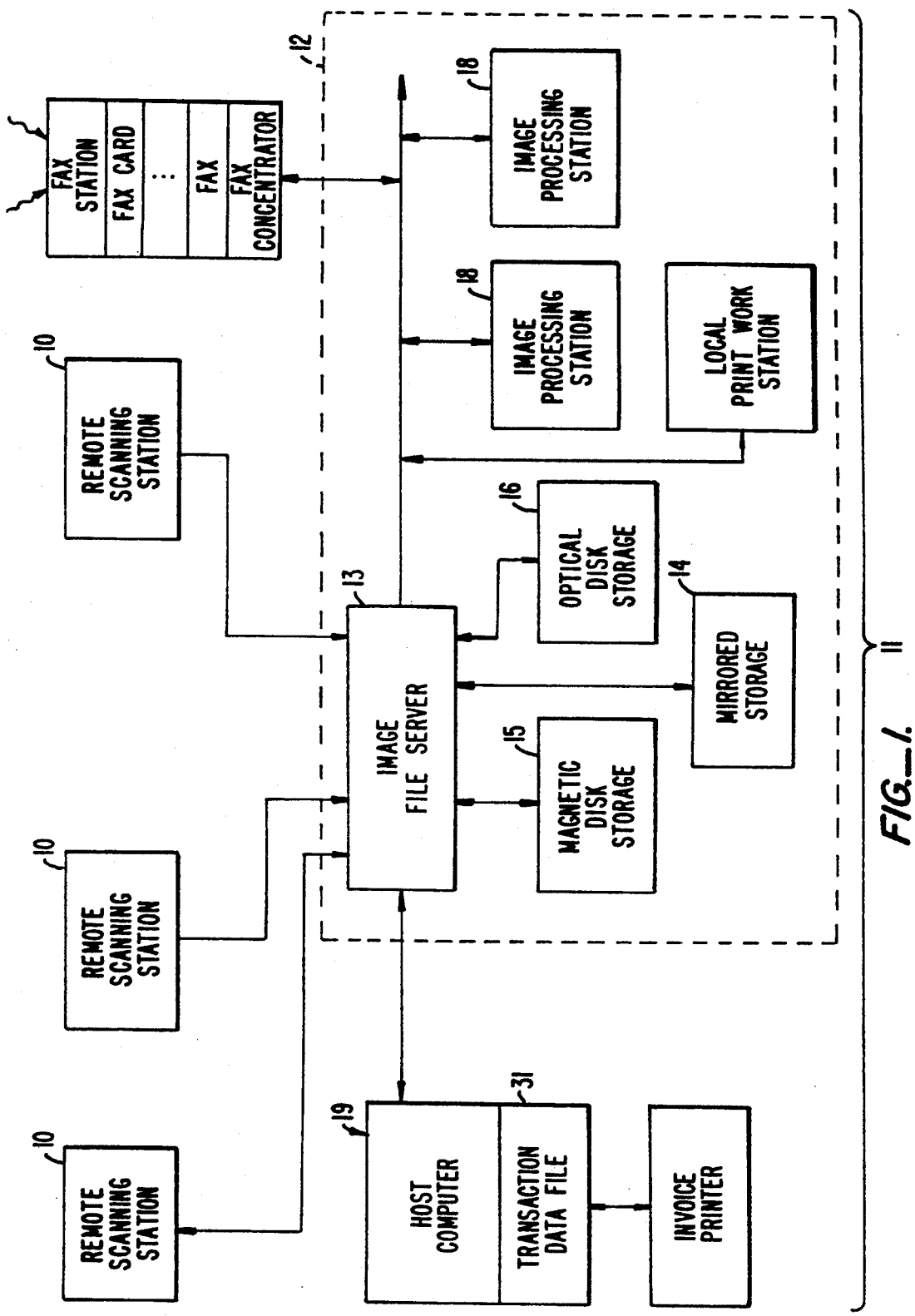

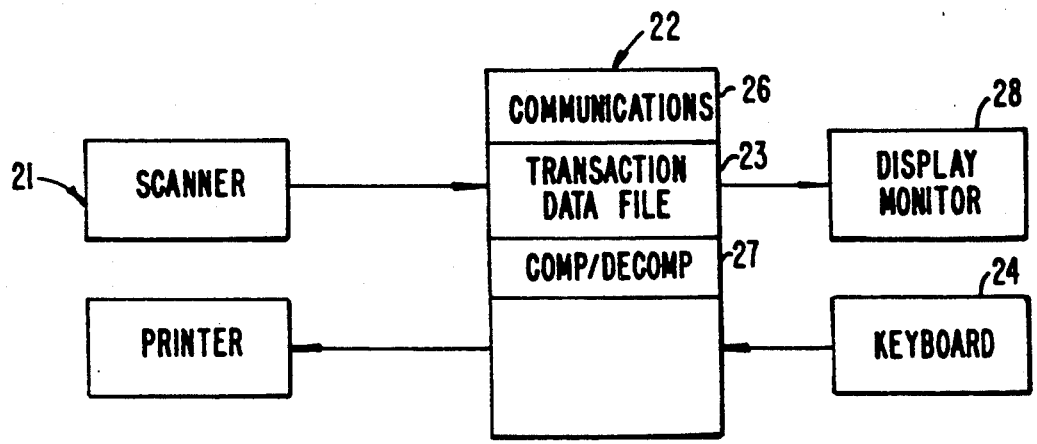
FIG._2.
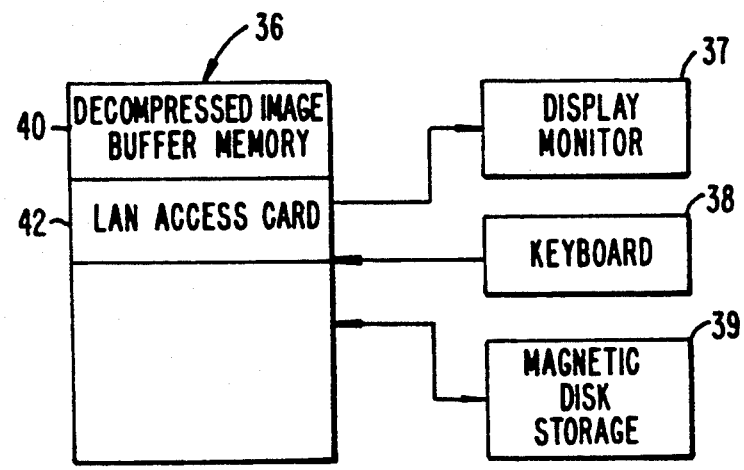
FIG._3.

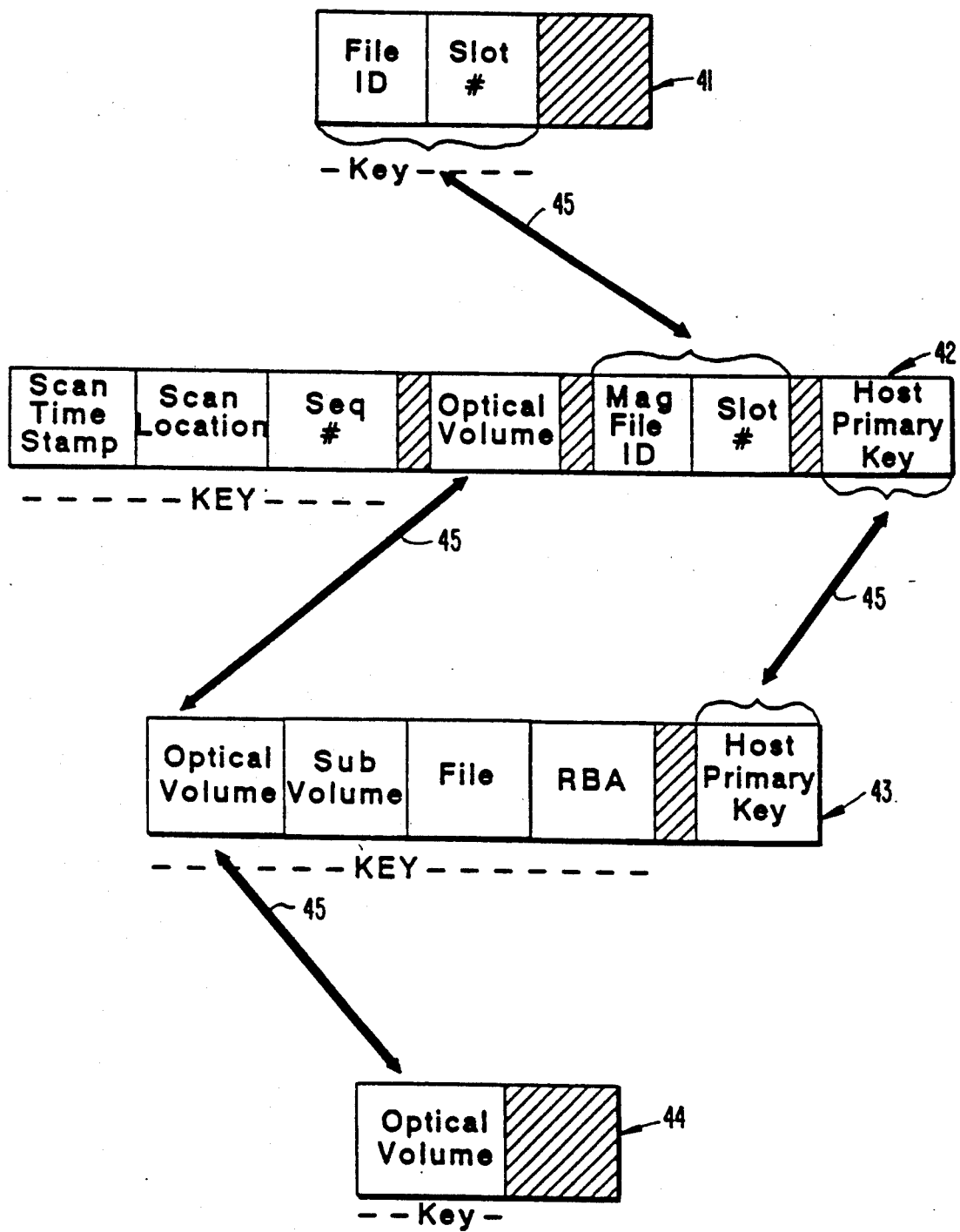
FIG._4.

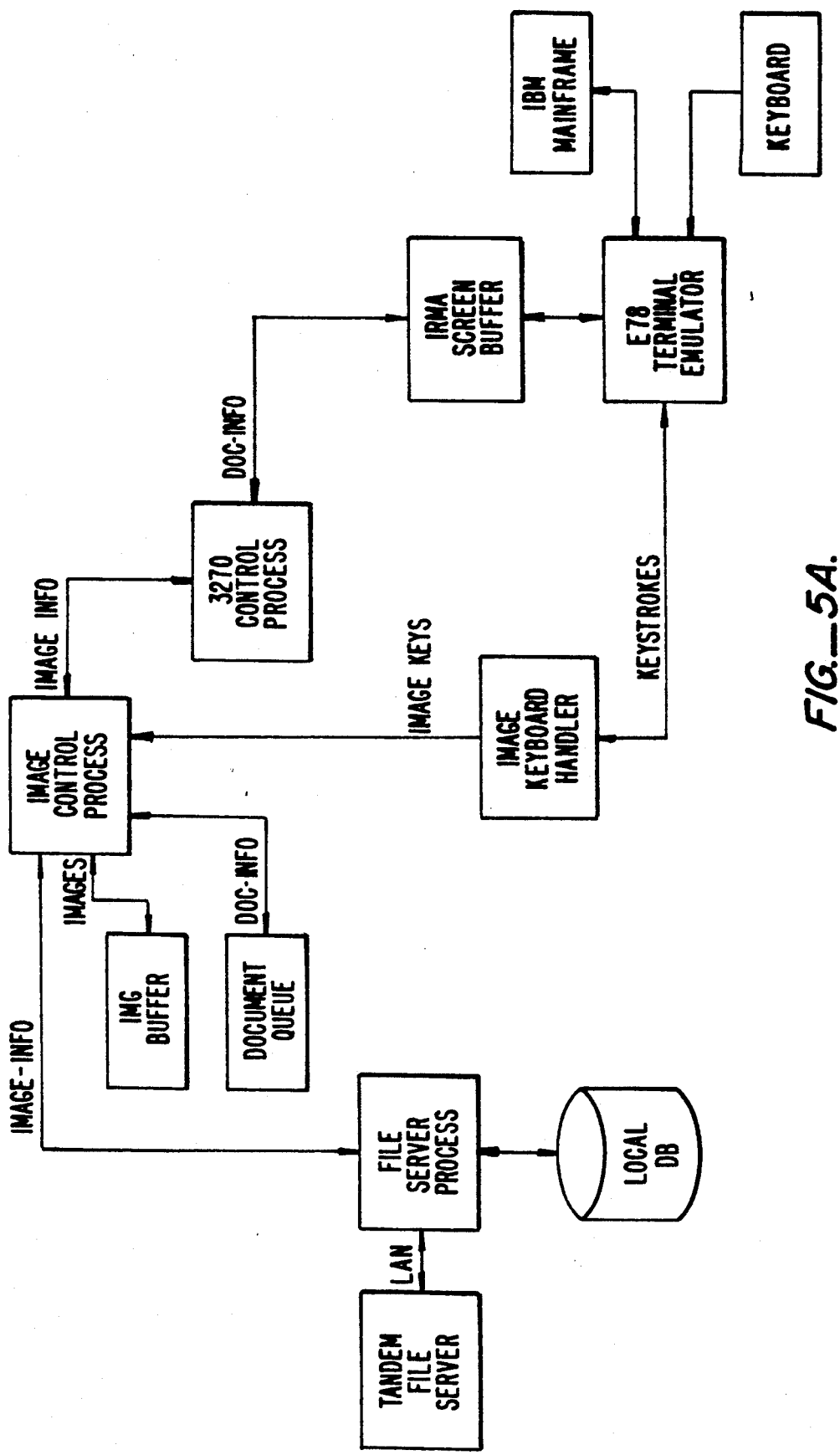
FIG._5A.

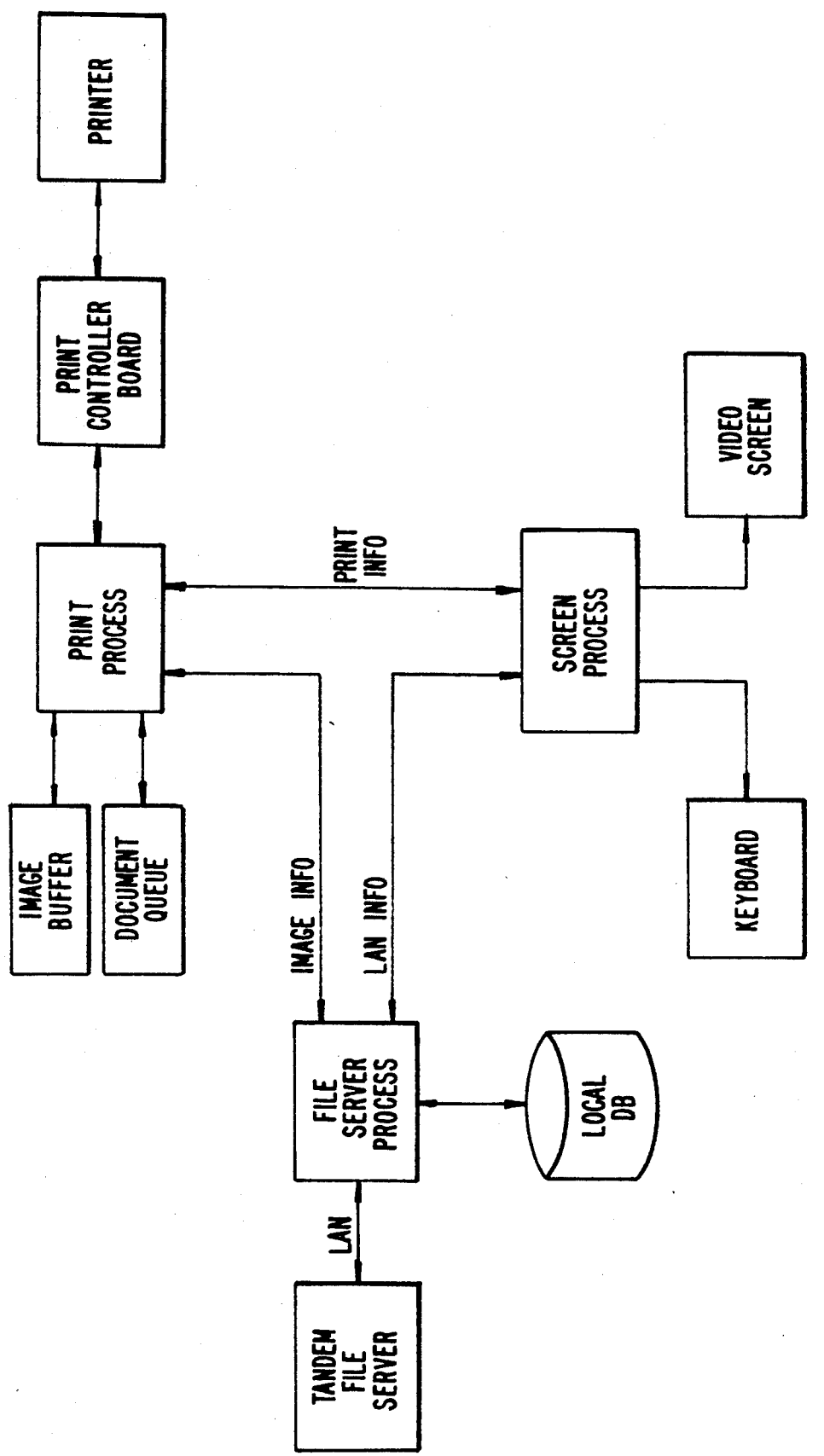
FIG._5B.

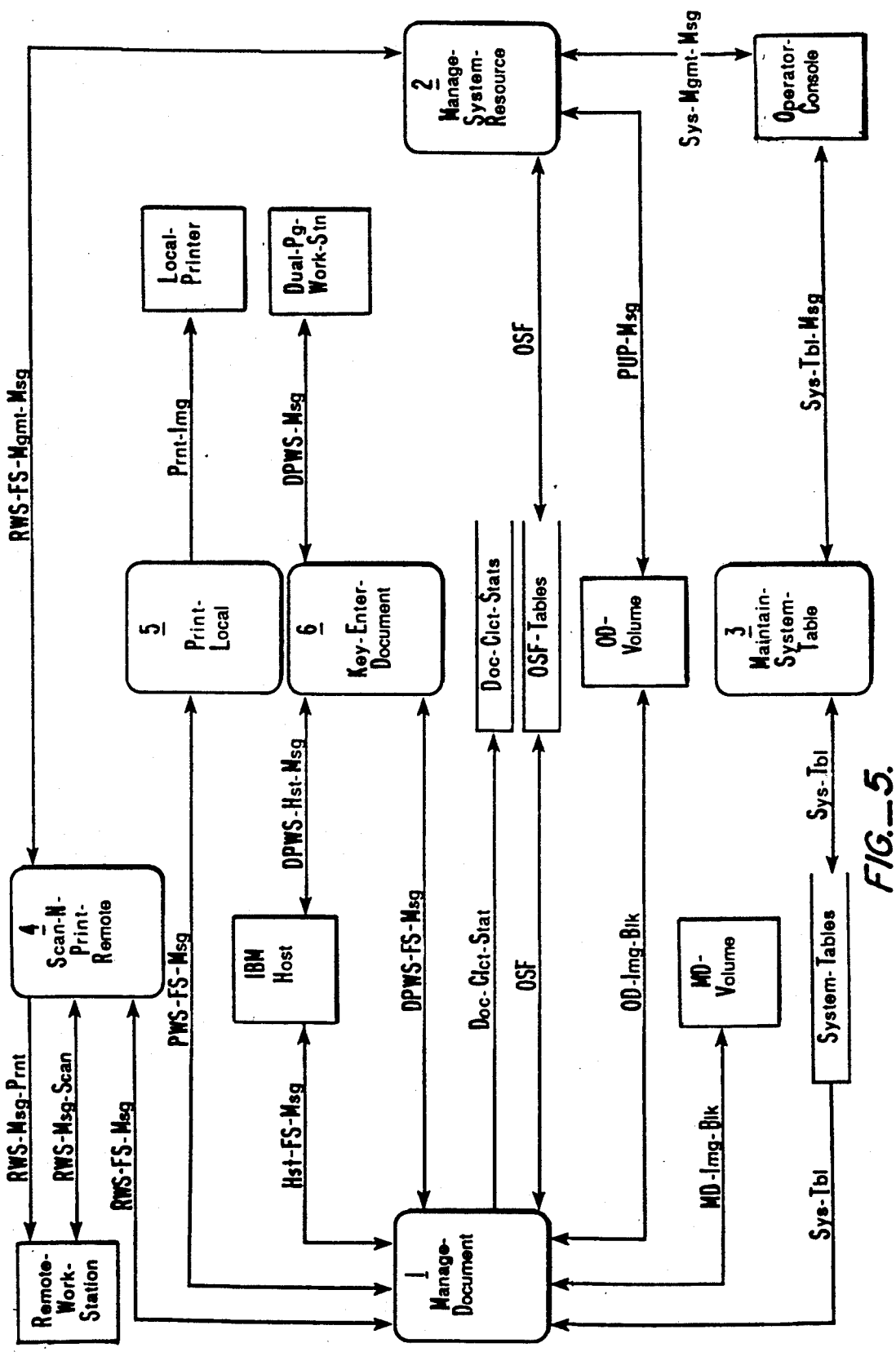
FIG._5.

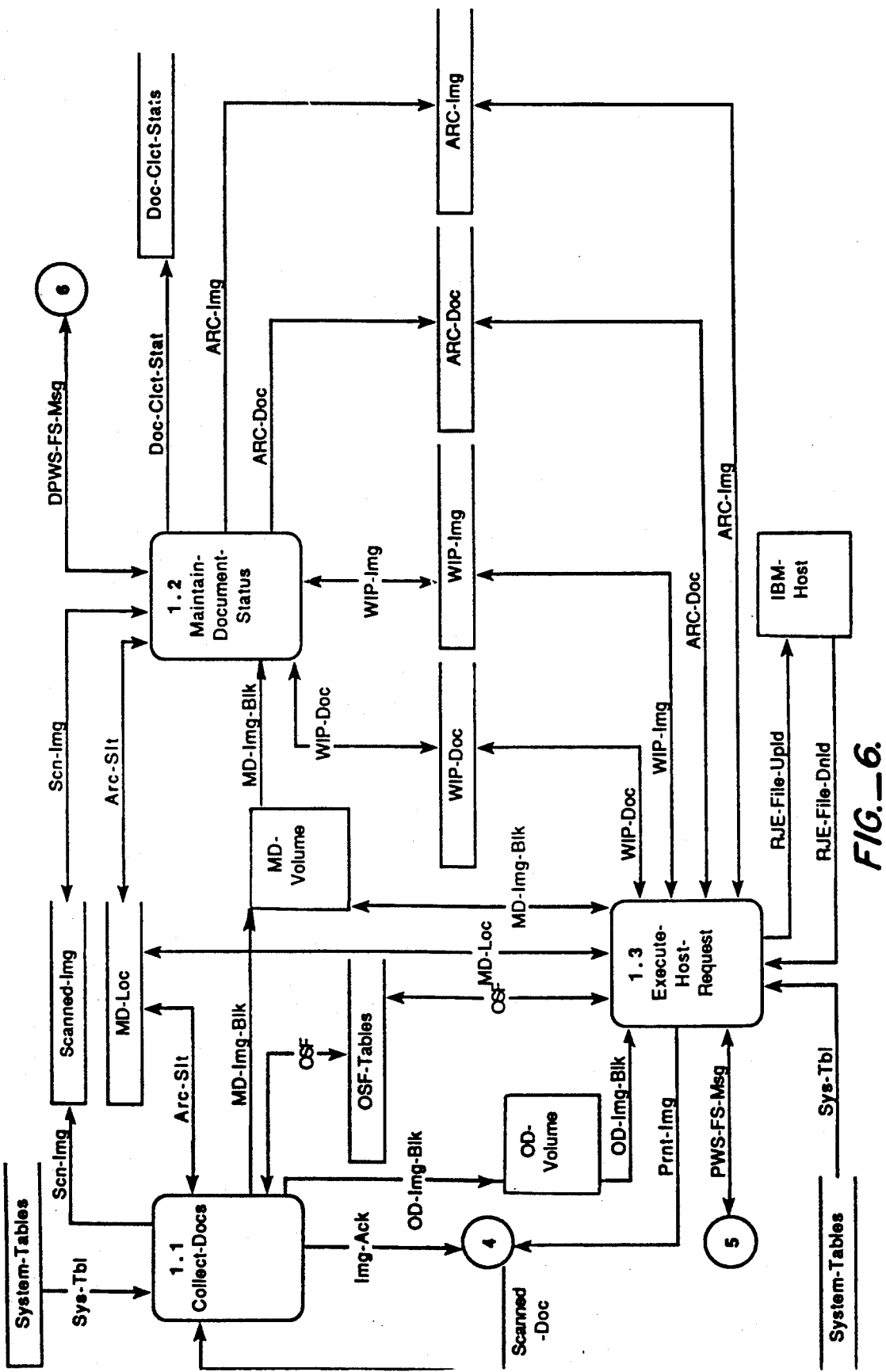
FIG._6.

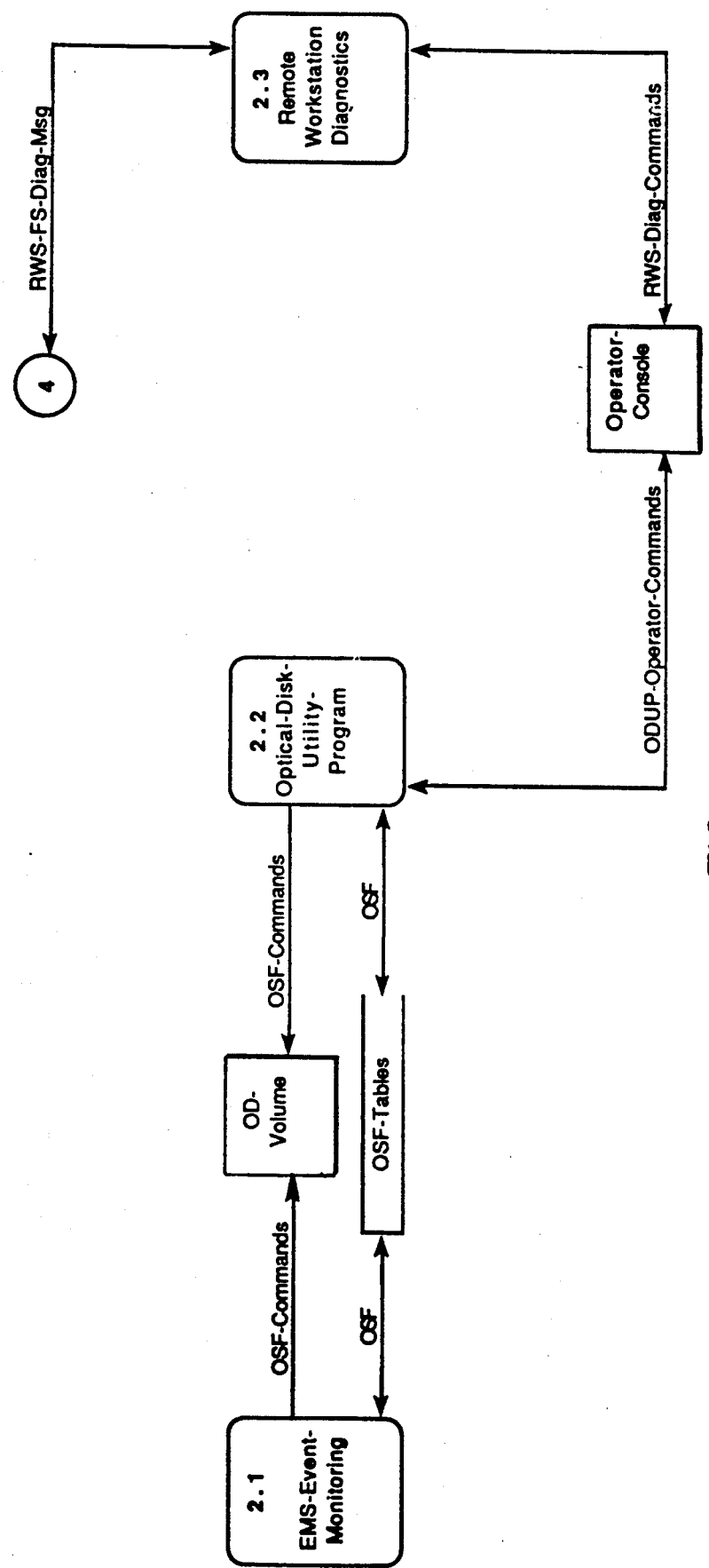
FIG._7.

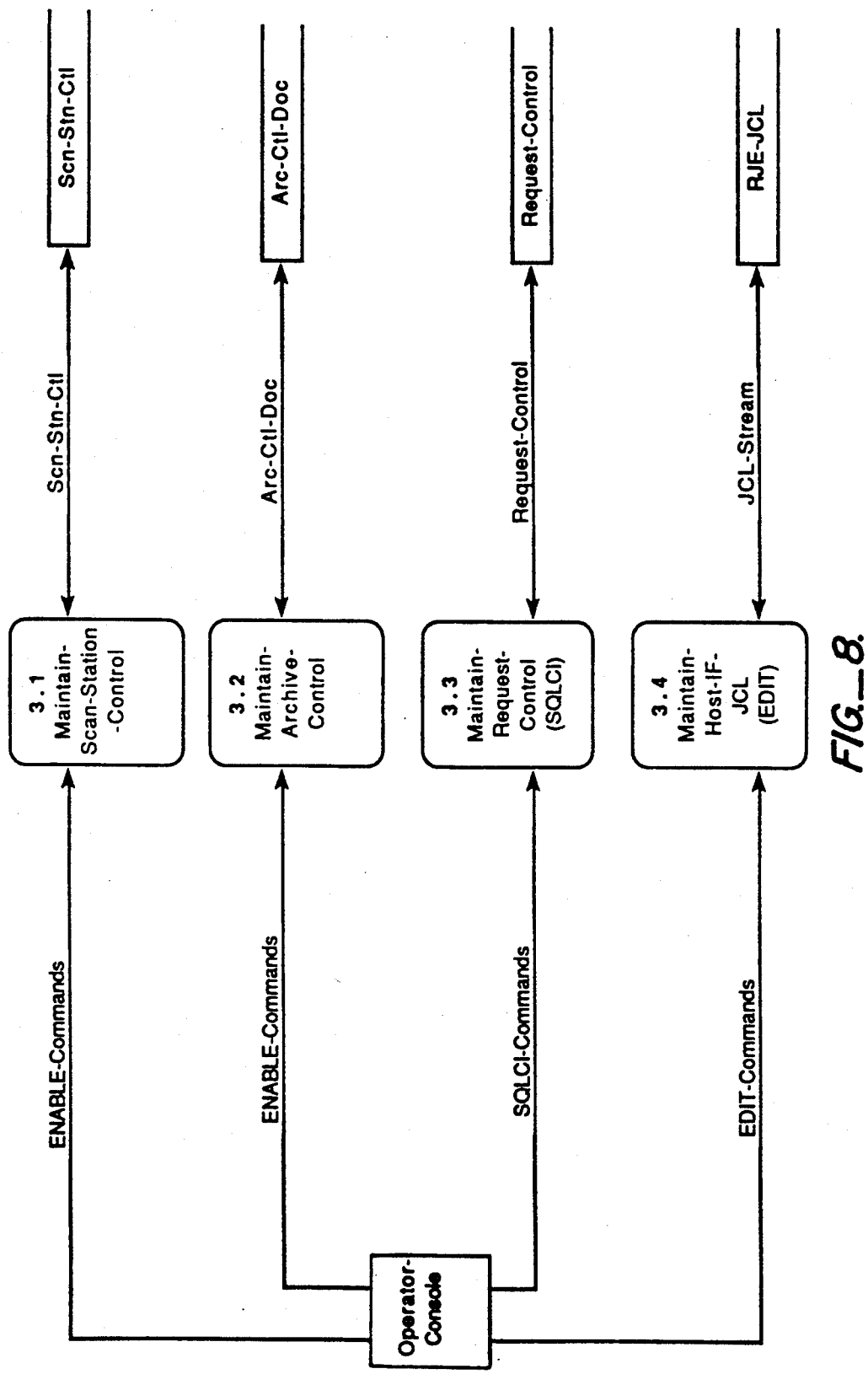
FIG._8.

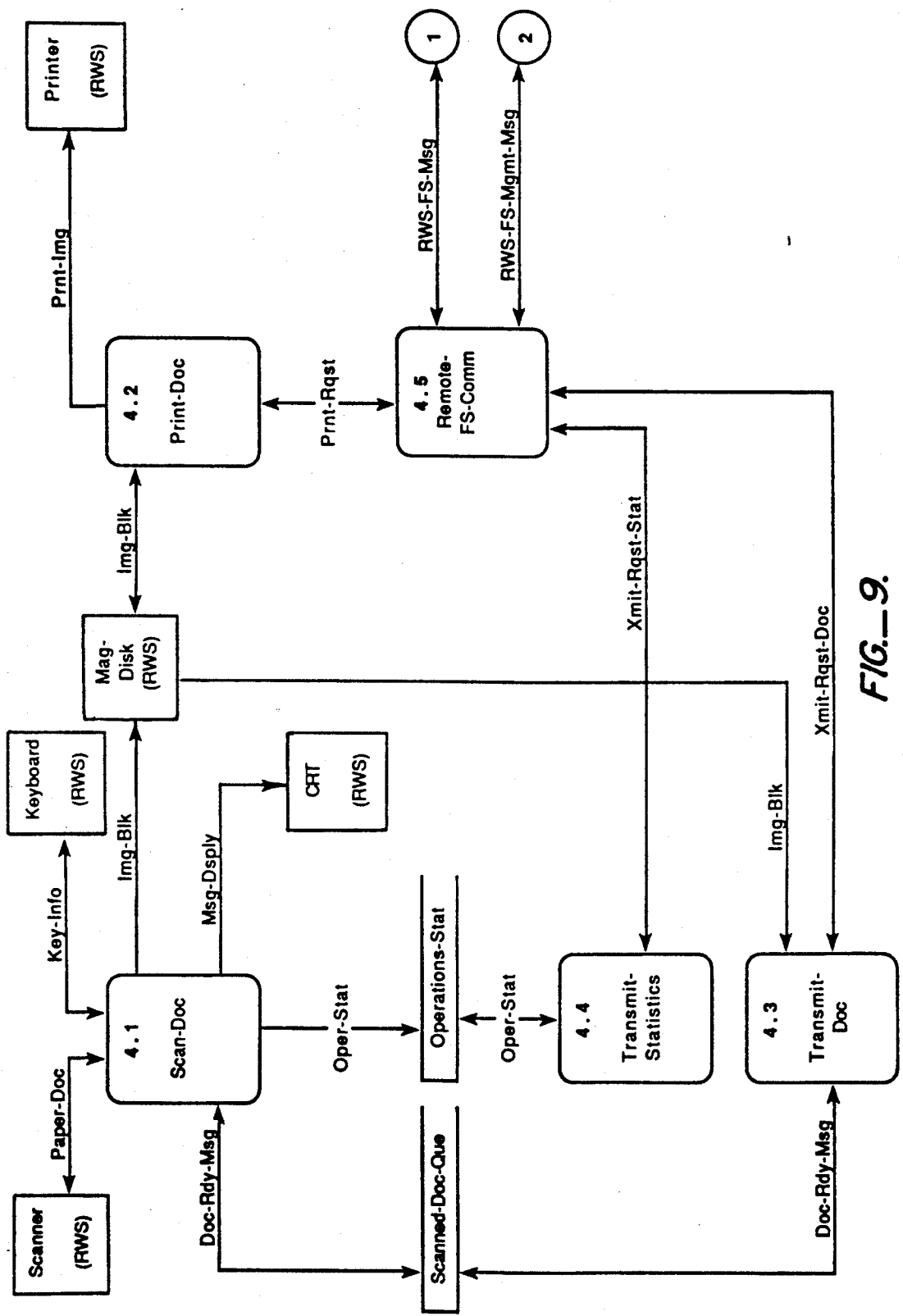
FIG._9.

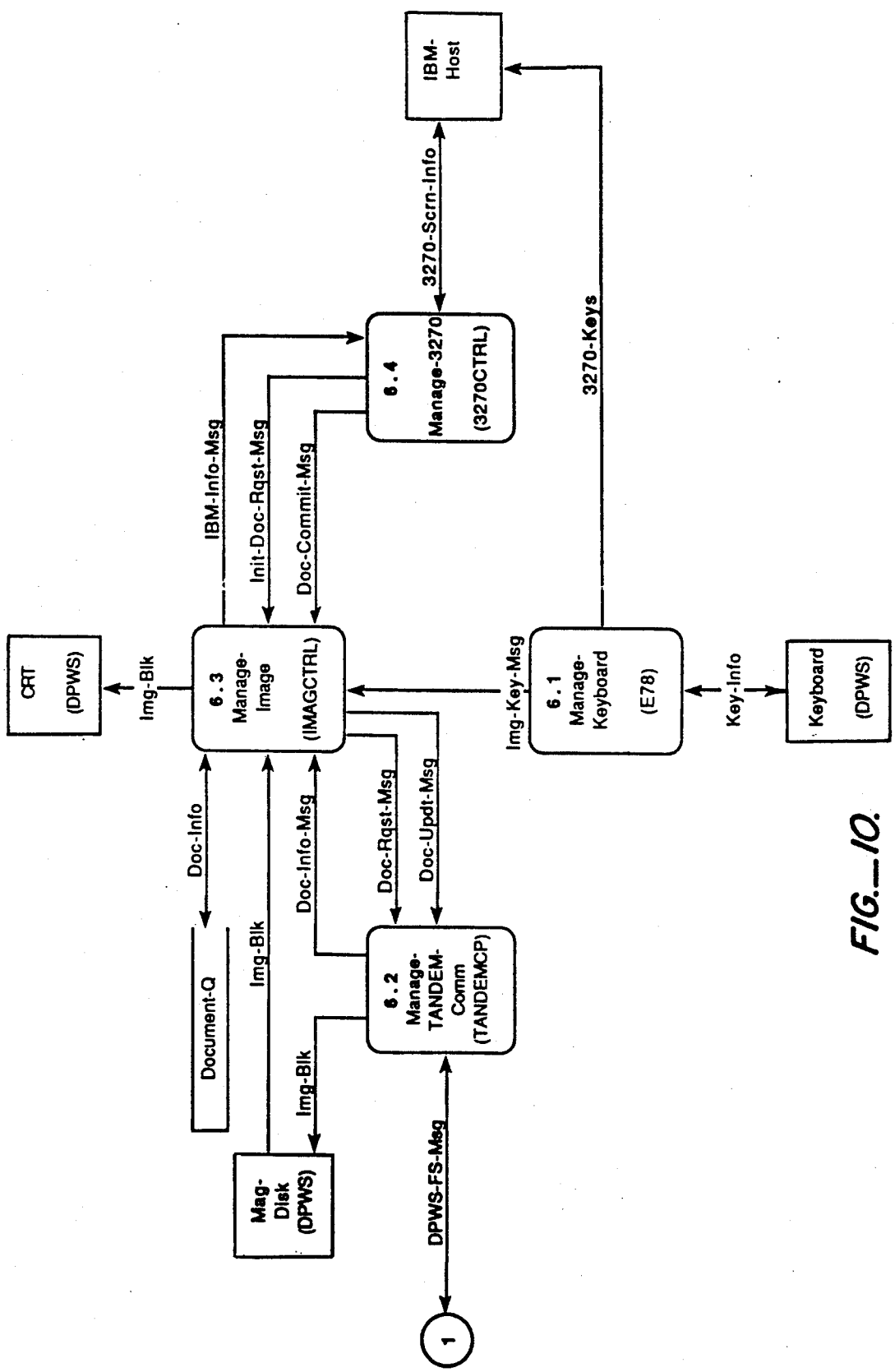
FIG._10.

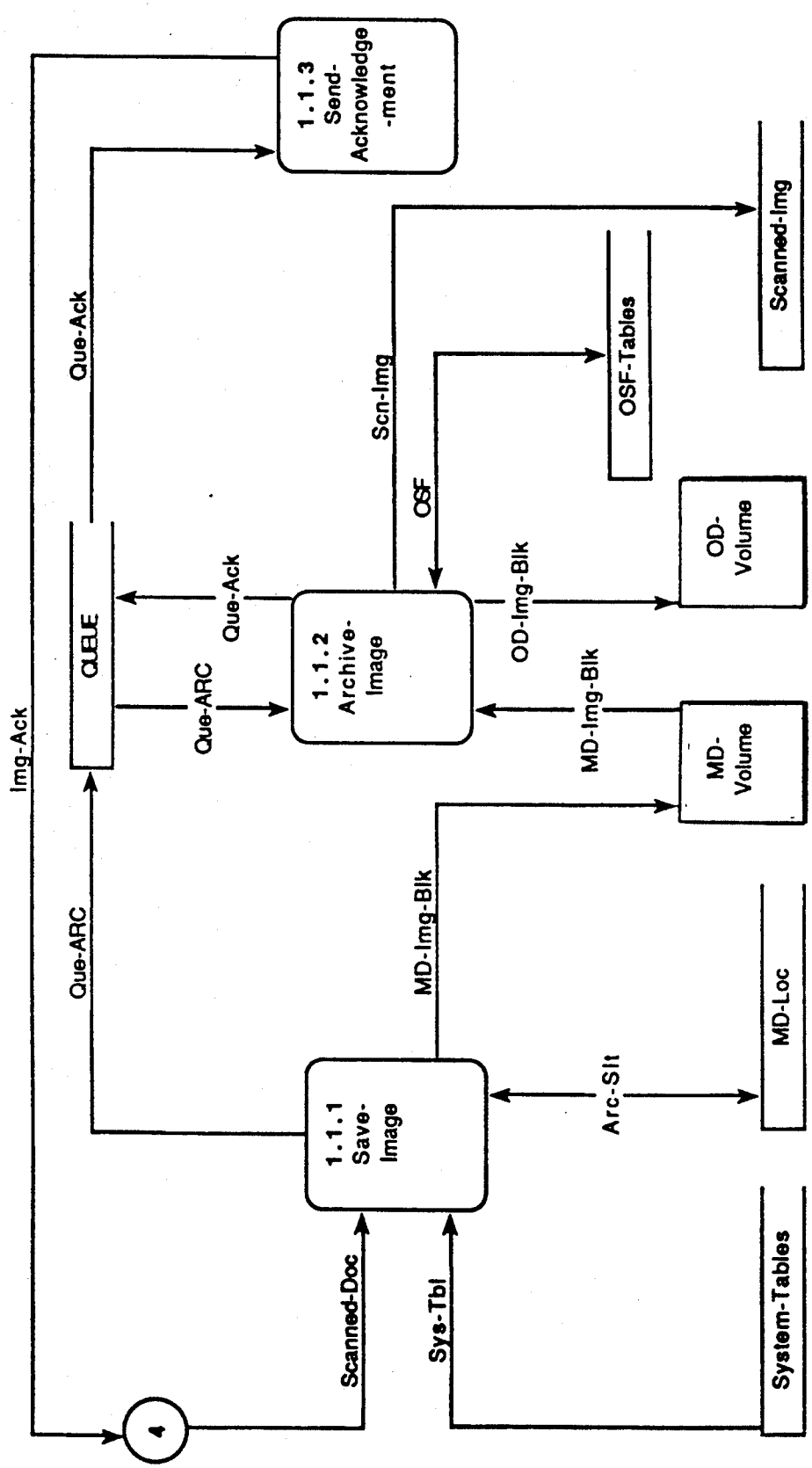
FIG._11A.

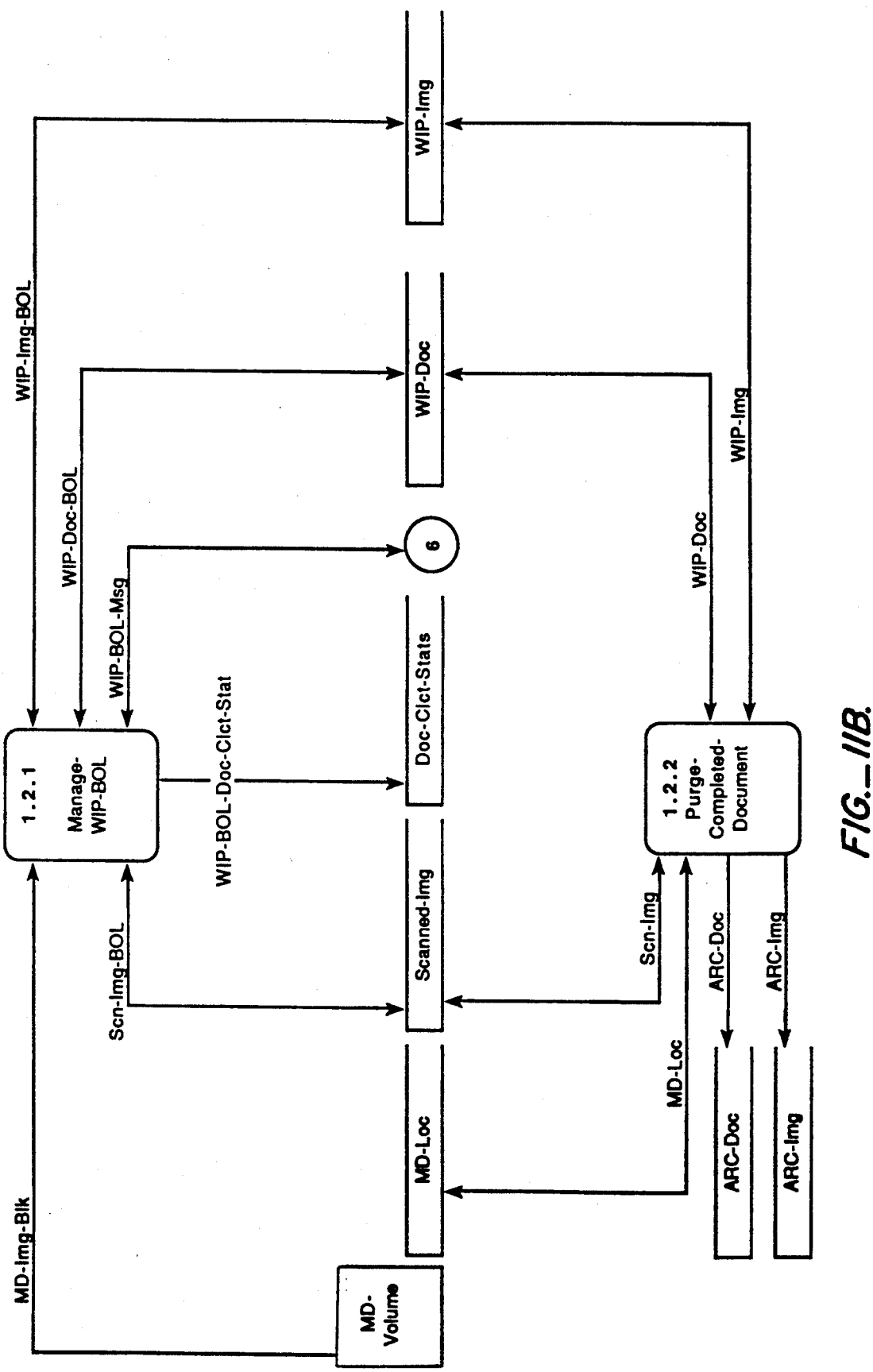
FIG._11B.

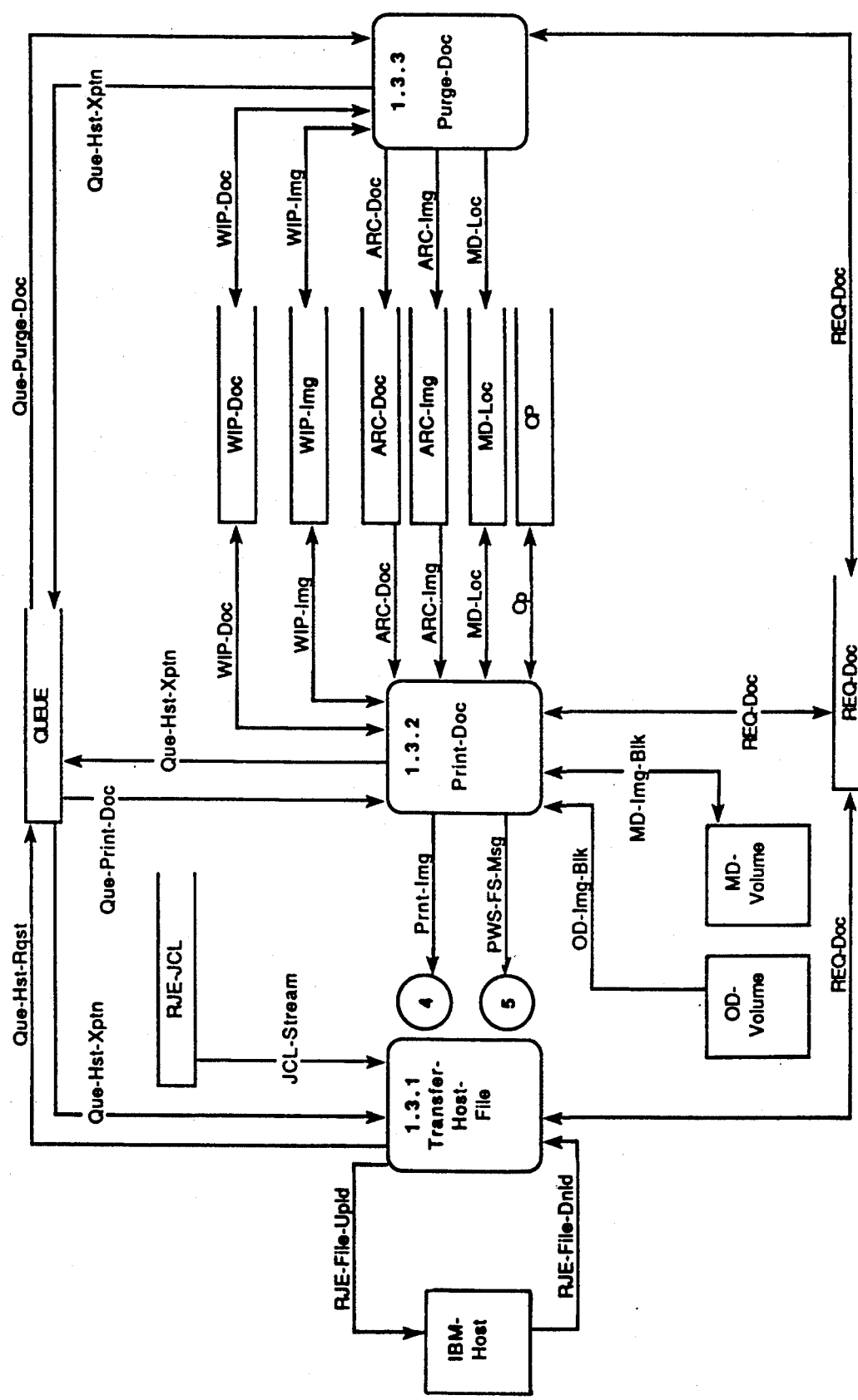
FIG._IIC.

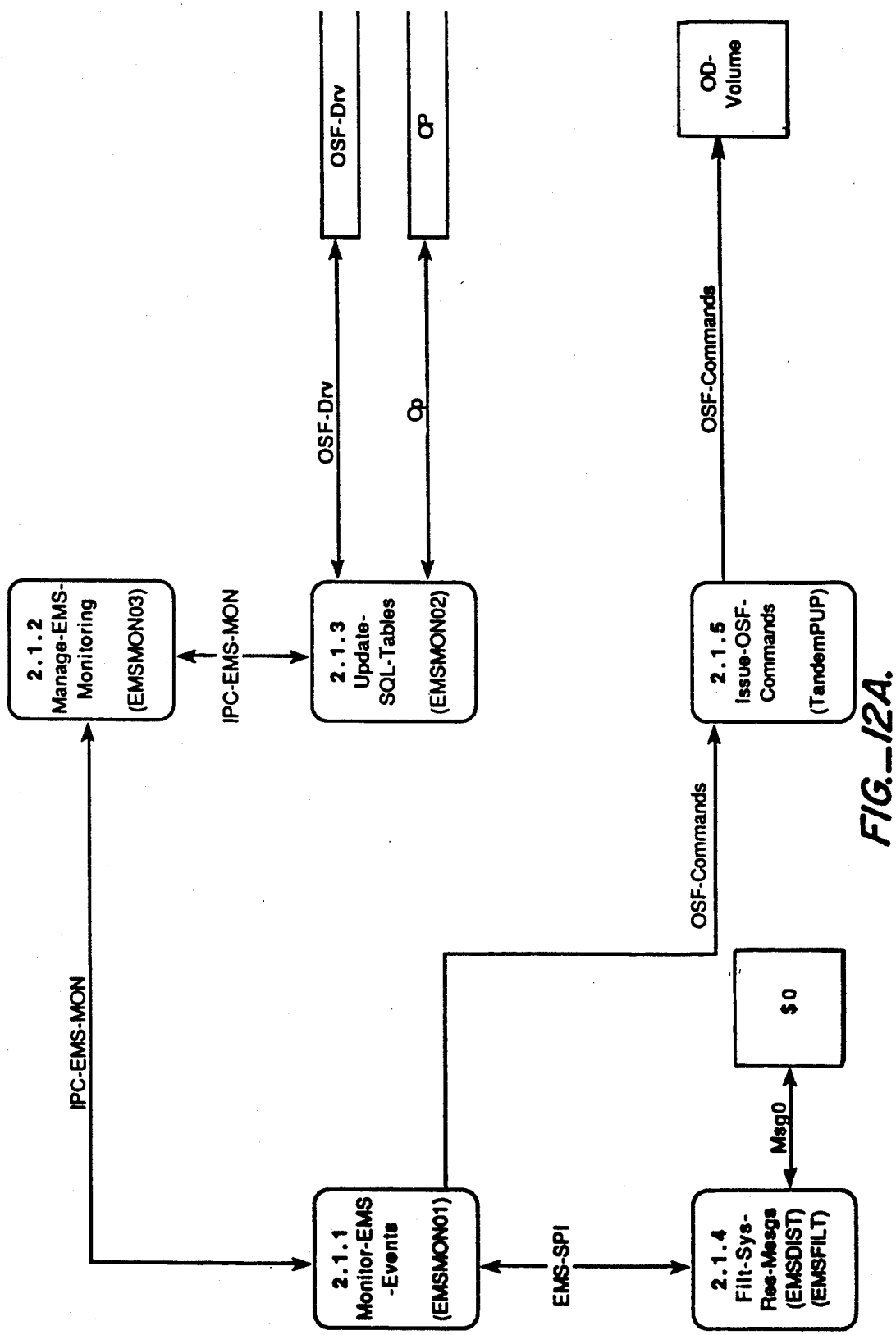
FIG._12A.

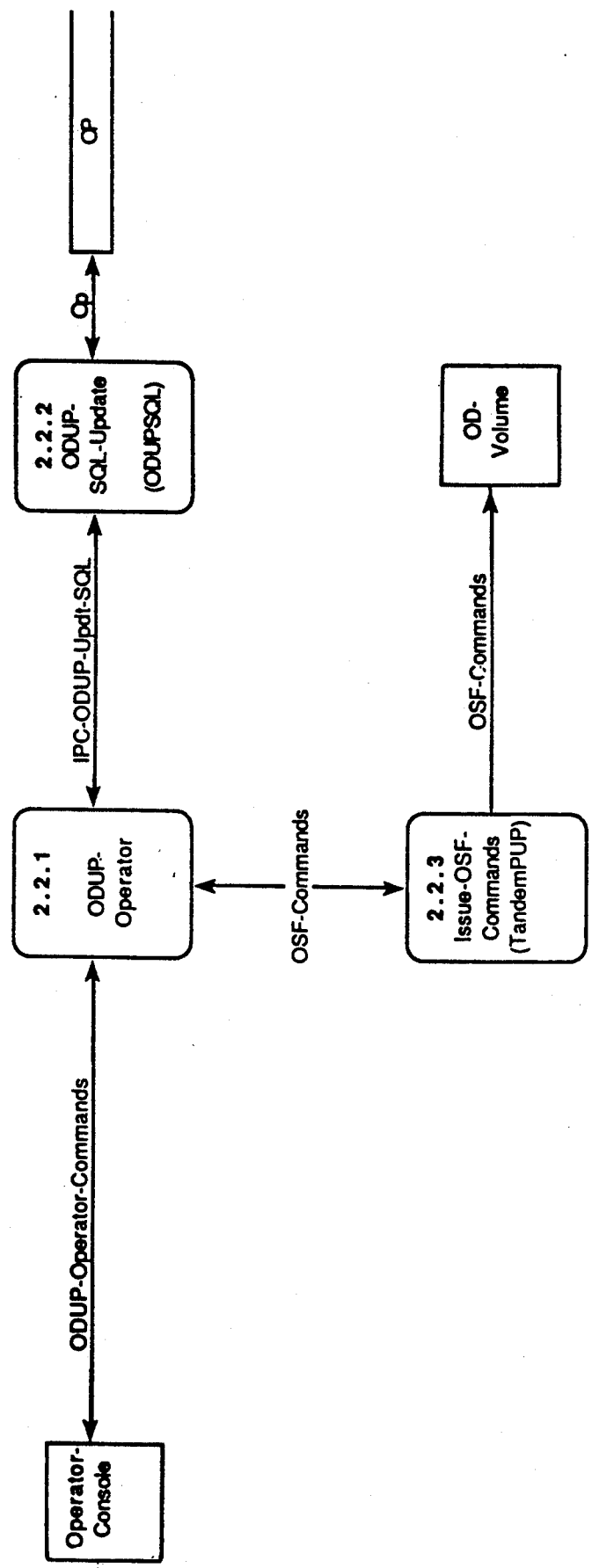
FIG._12B

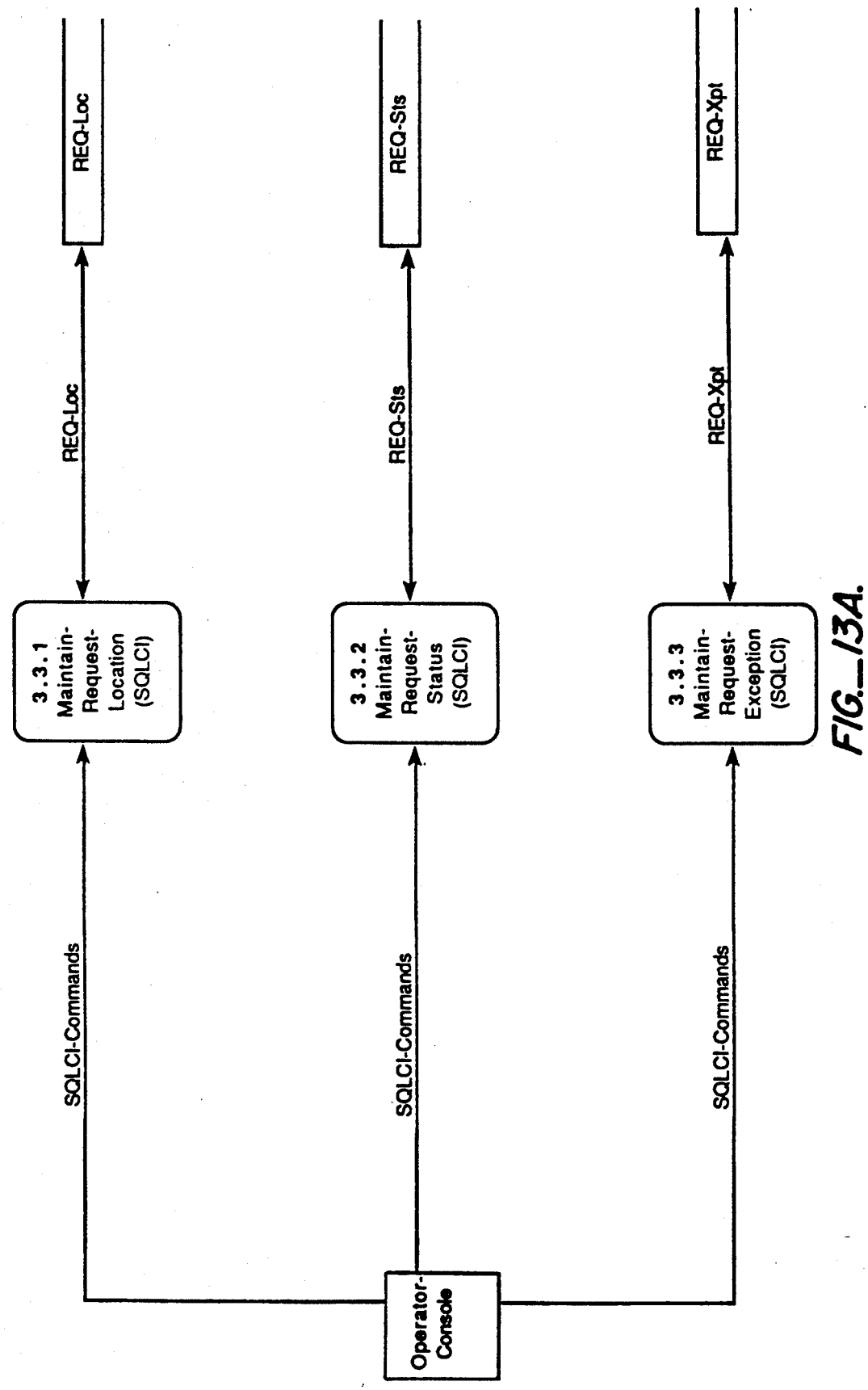

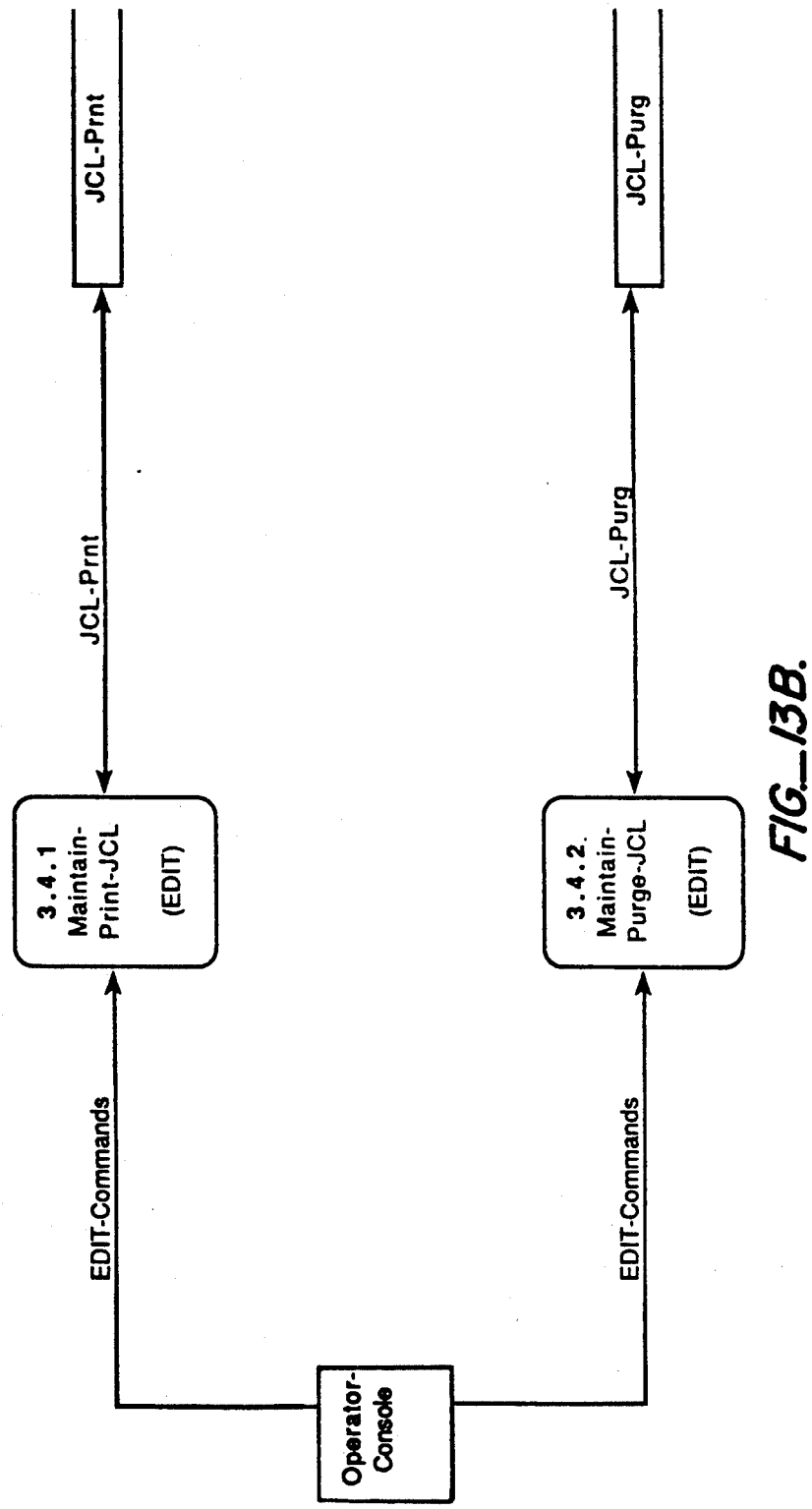
FIG._13B.

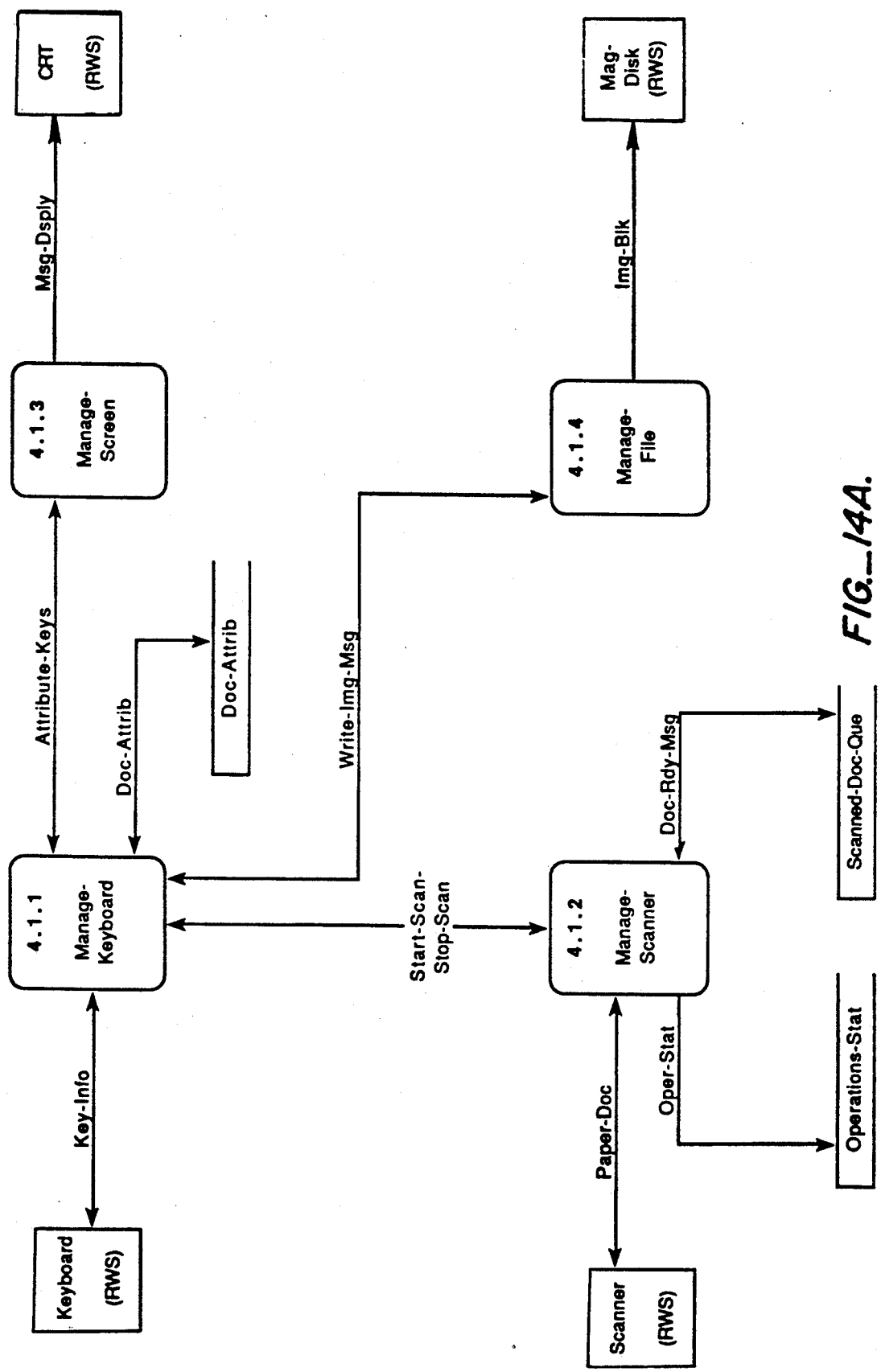
FIG._14A.

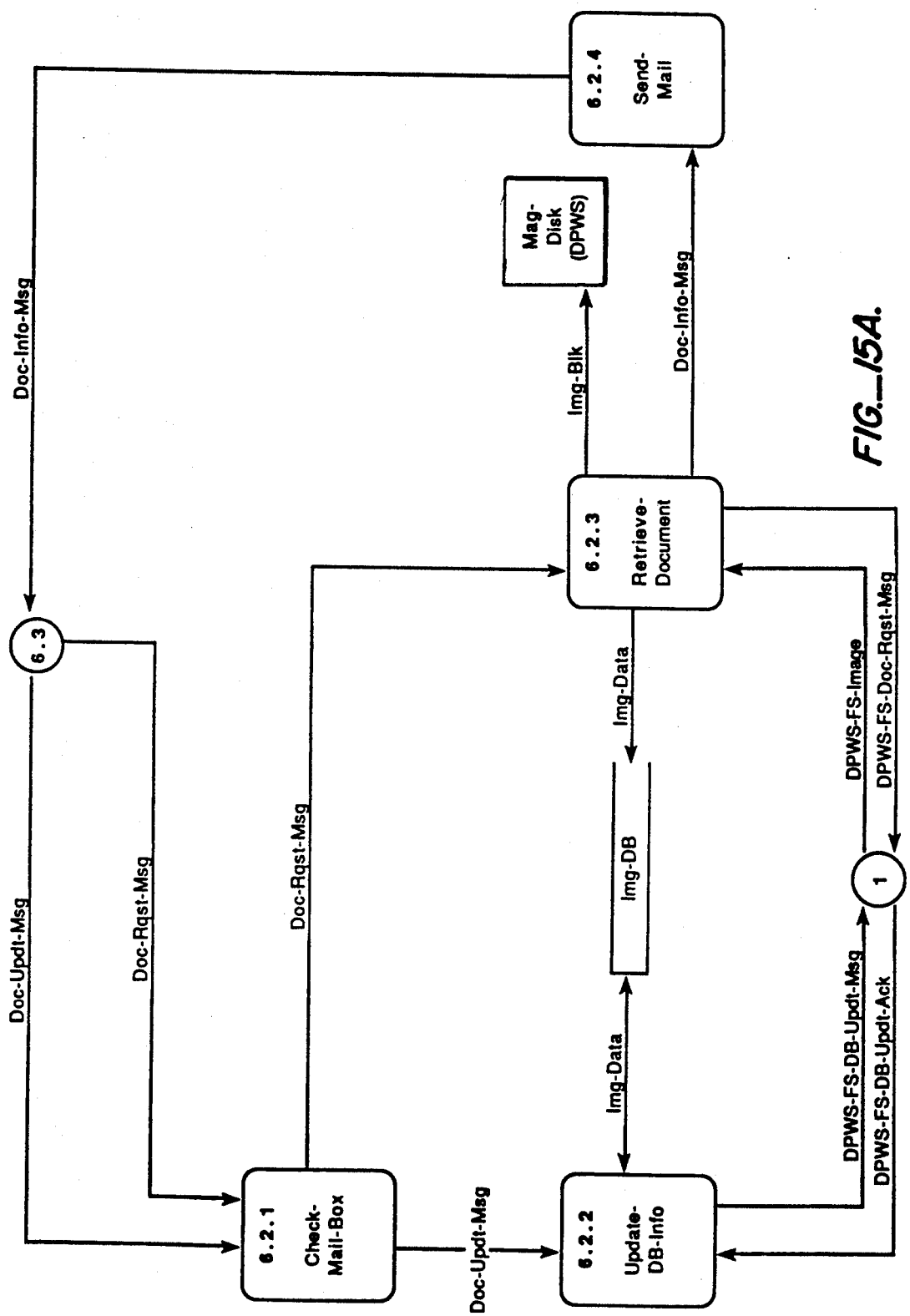
FIG._15A.

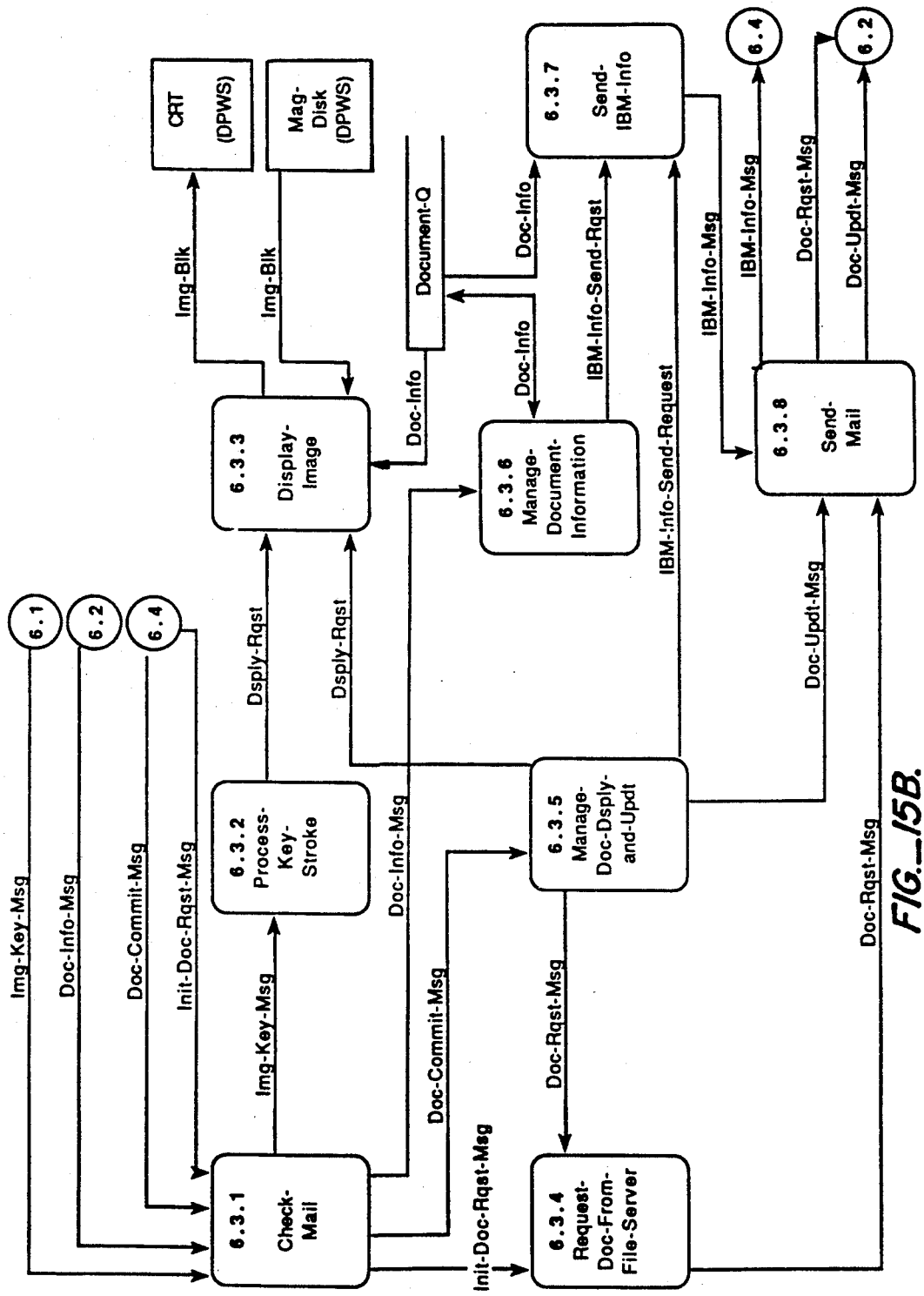
FIG._15B.

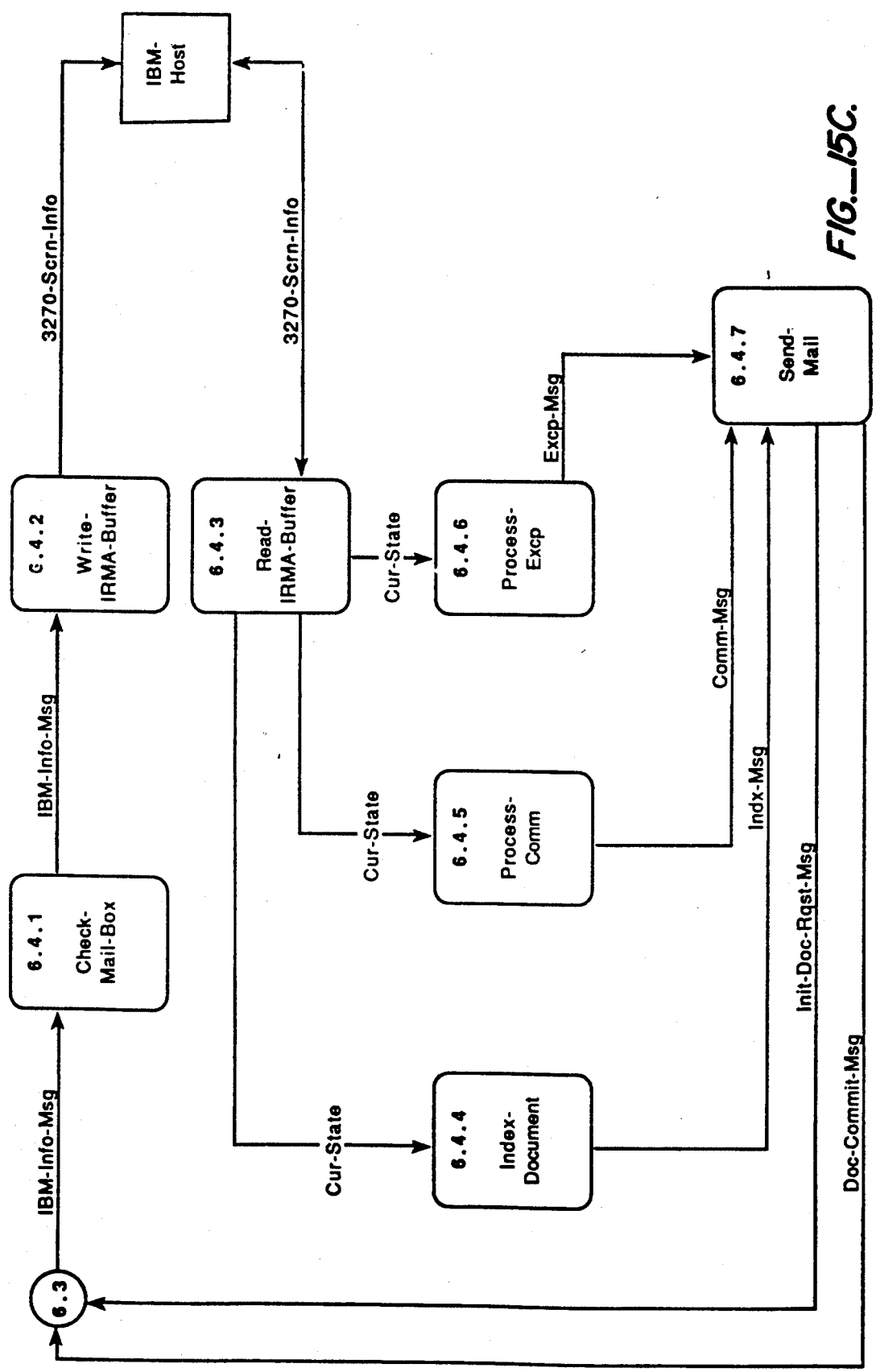
FIG._15C.

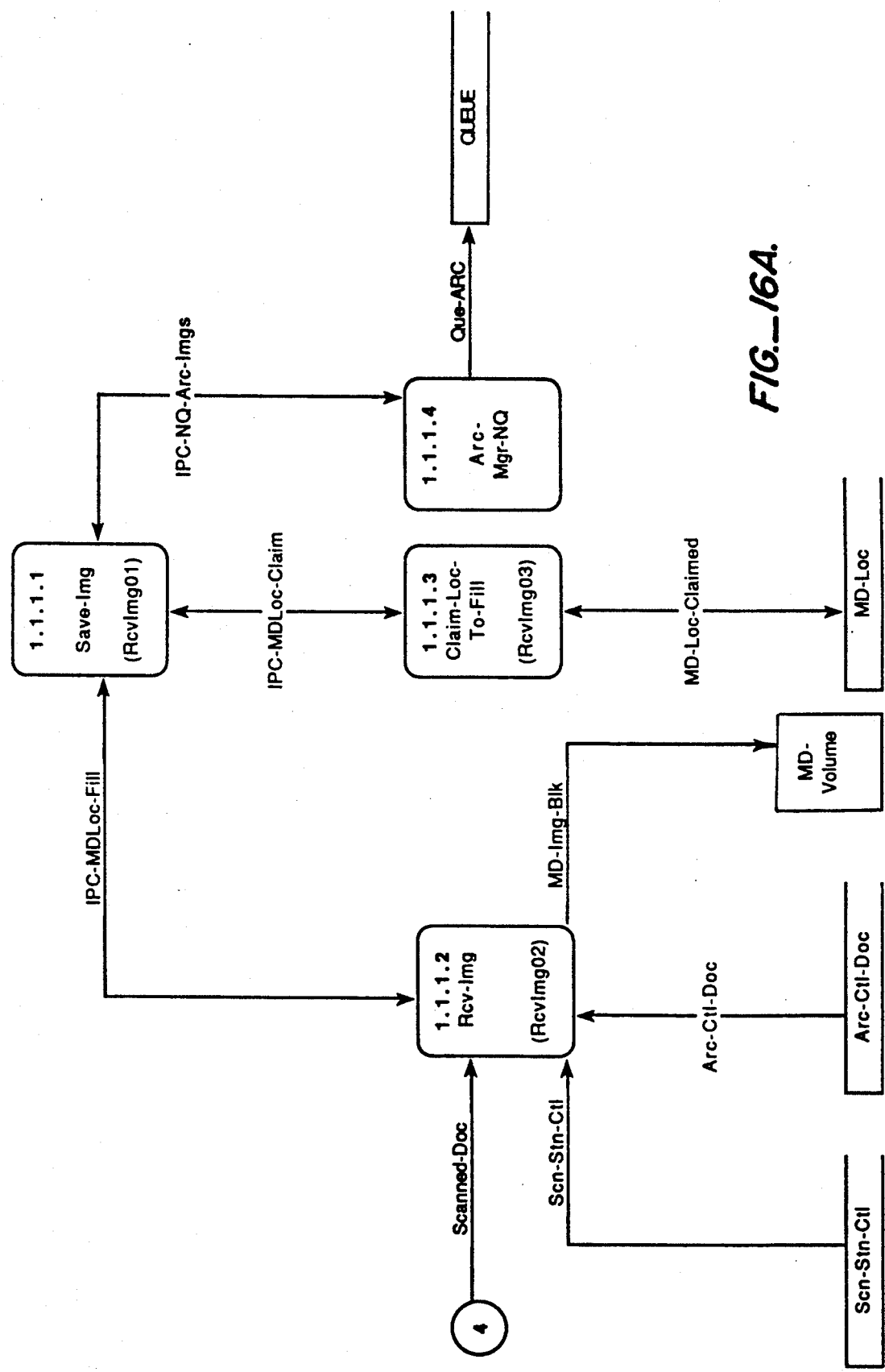
FIG._16A.

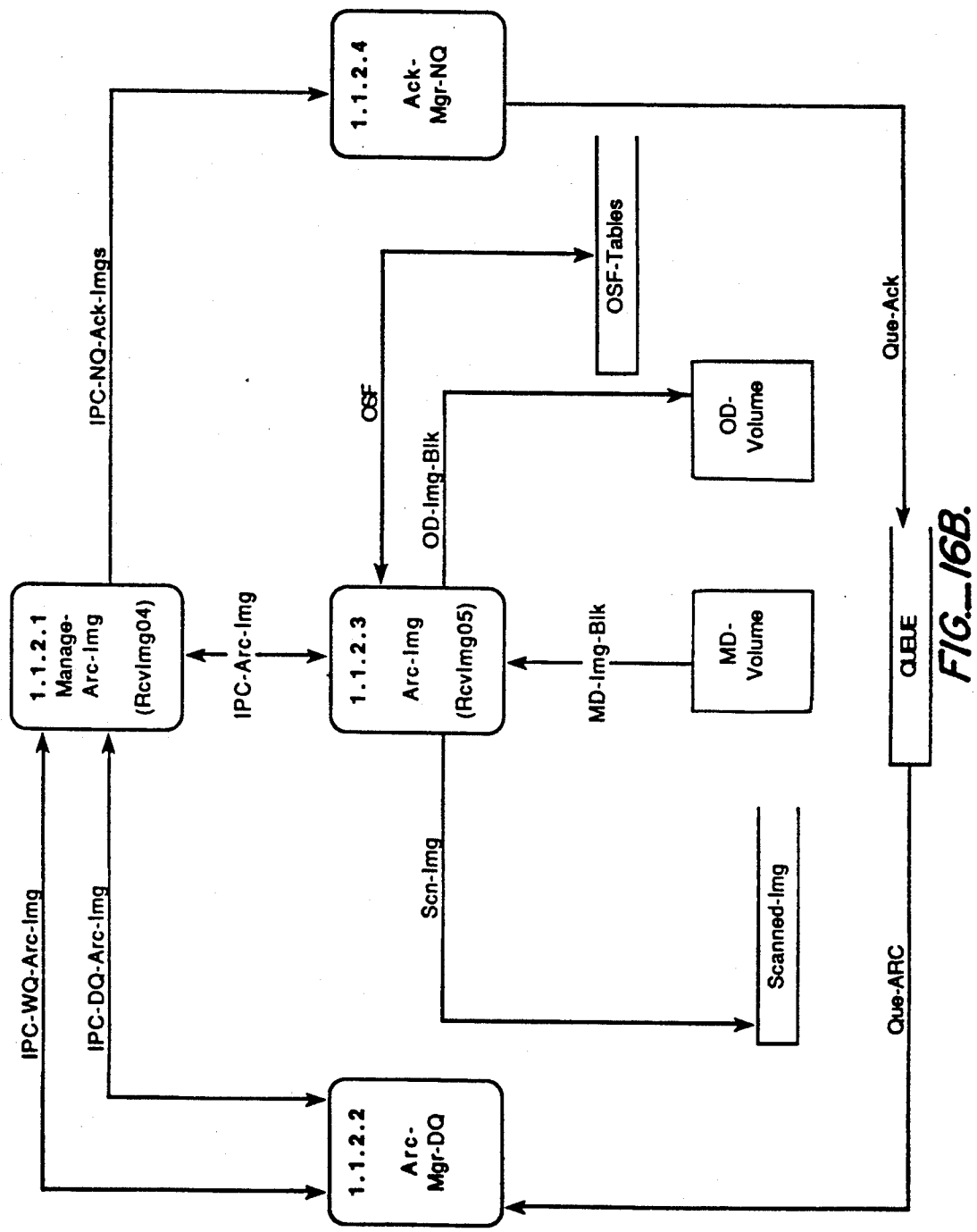
FIG.—16B.

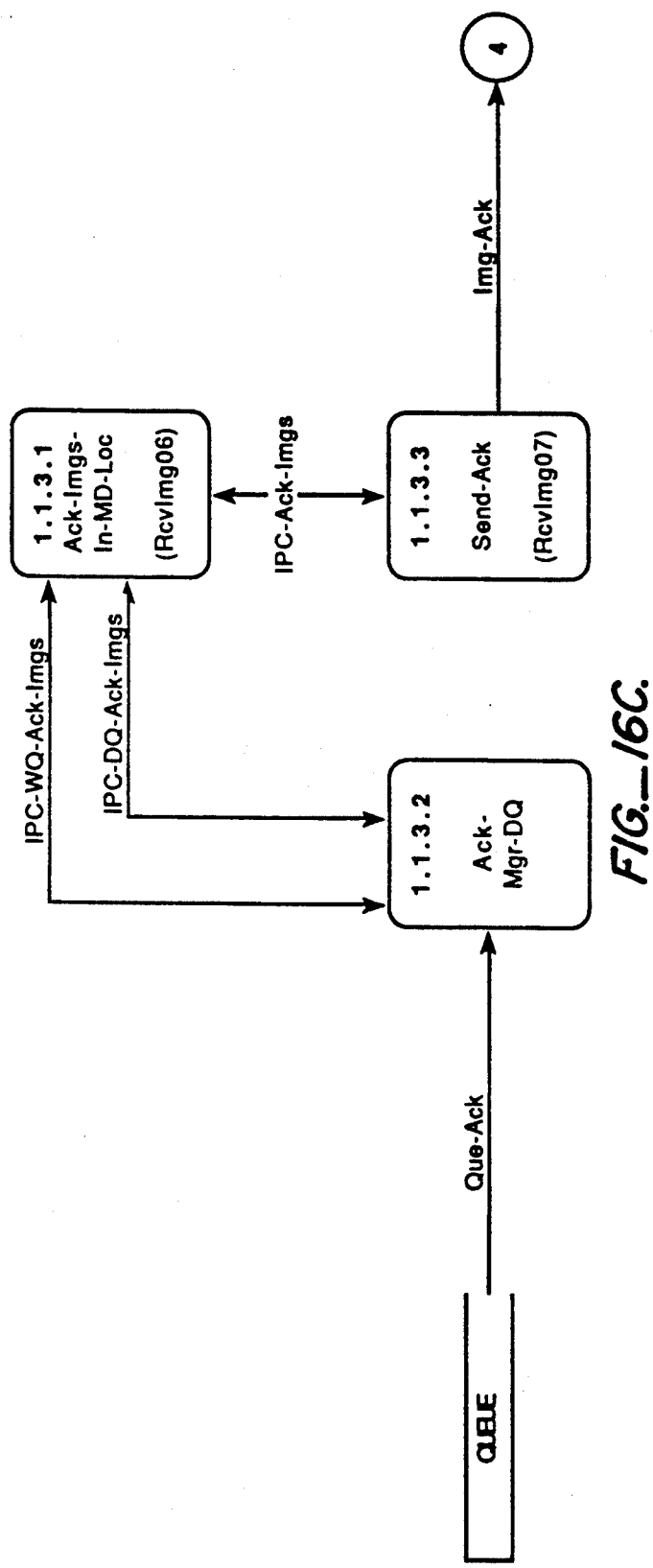
FIG._16C.

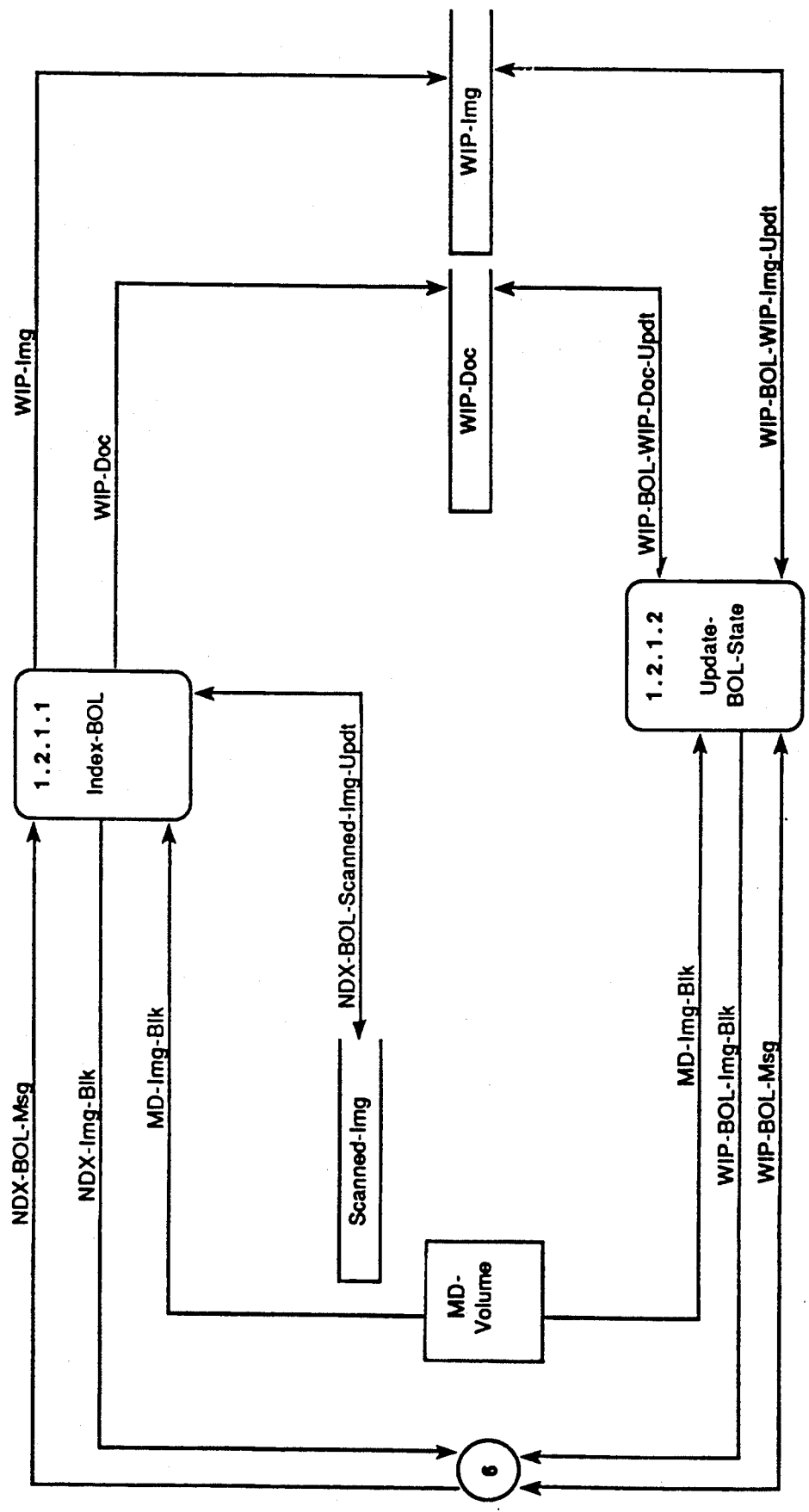
FIG._17A.

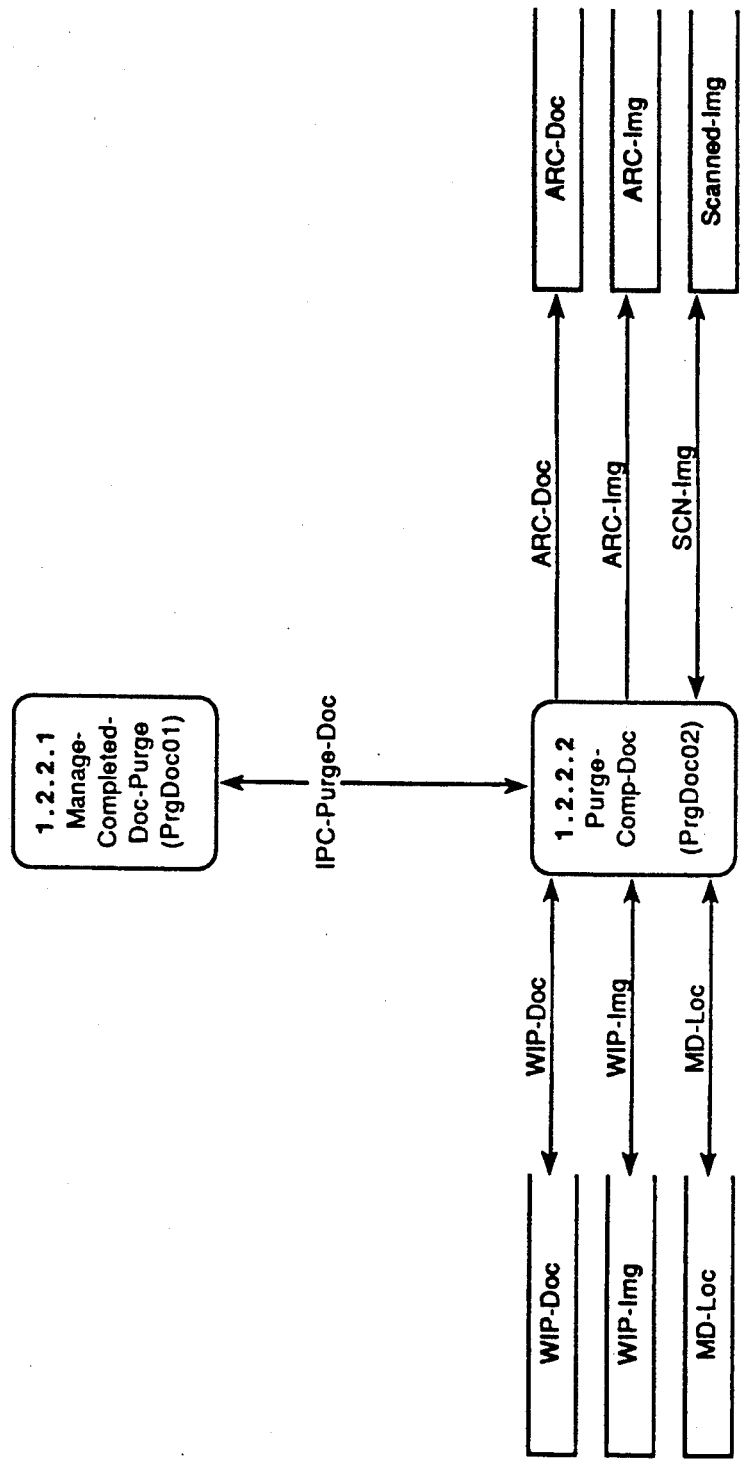
FIG._17B.

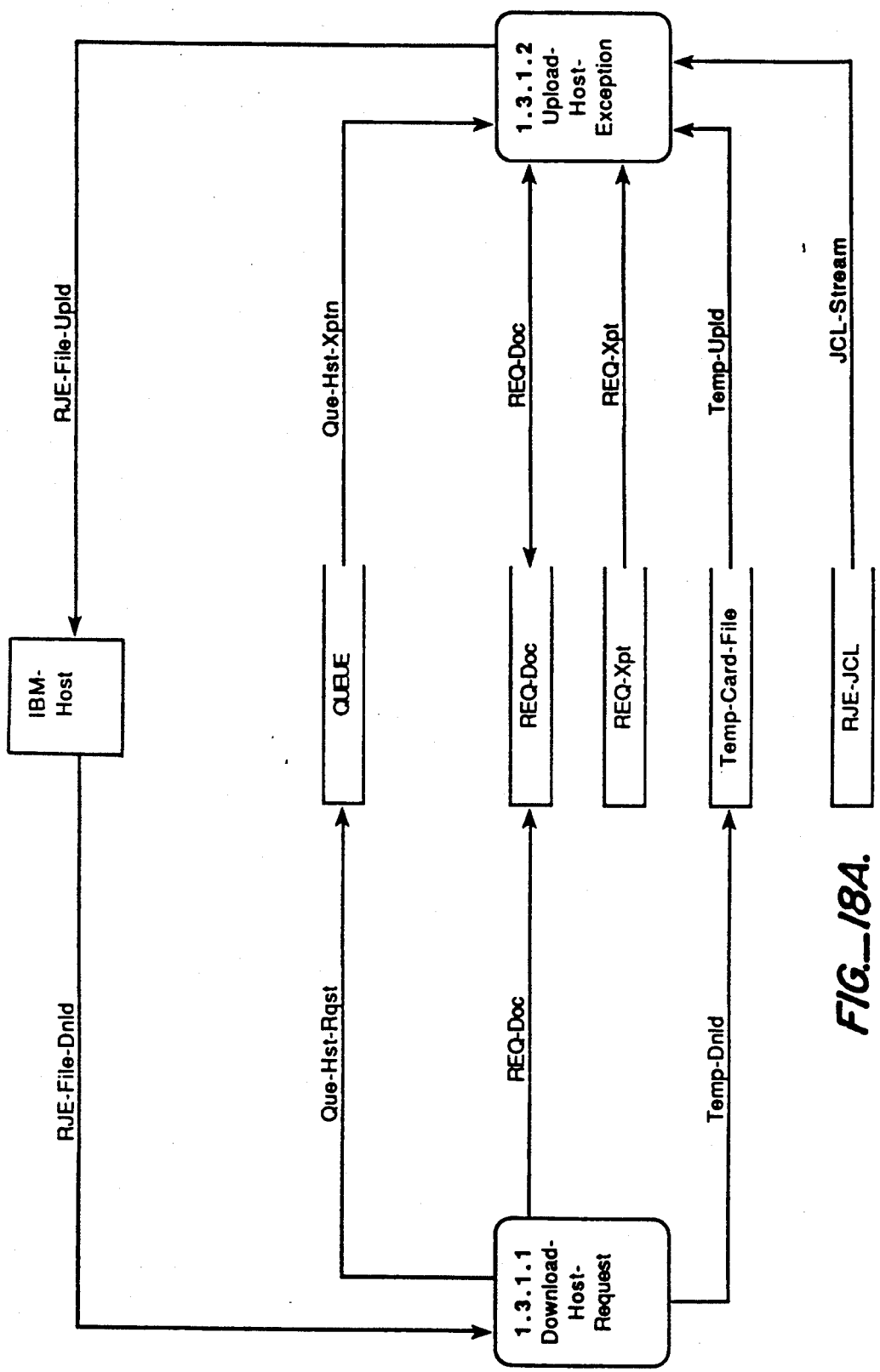
FIG._18A.

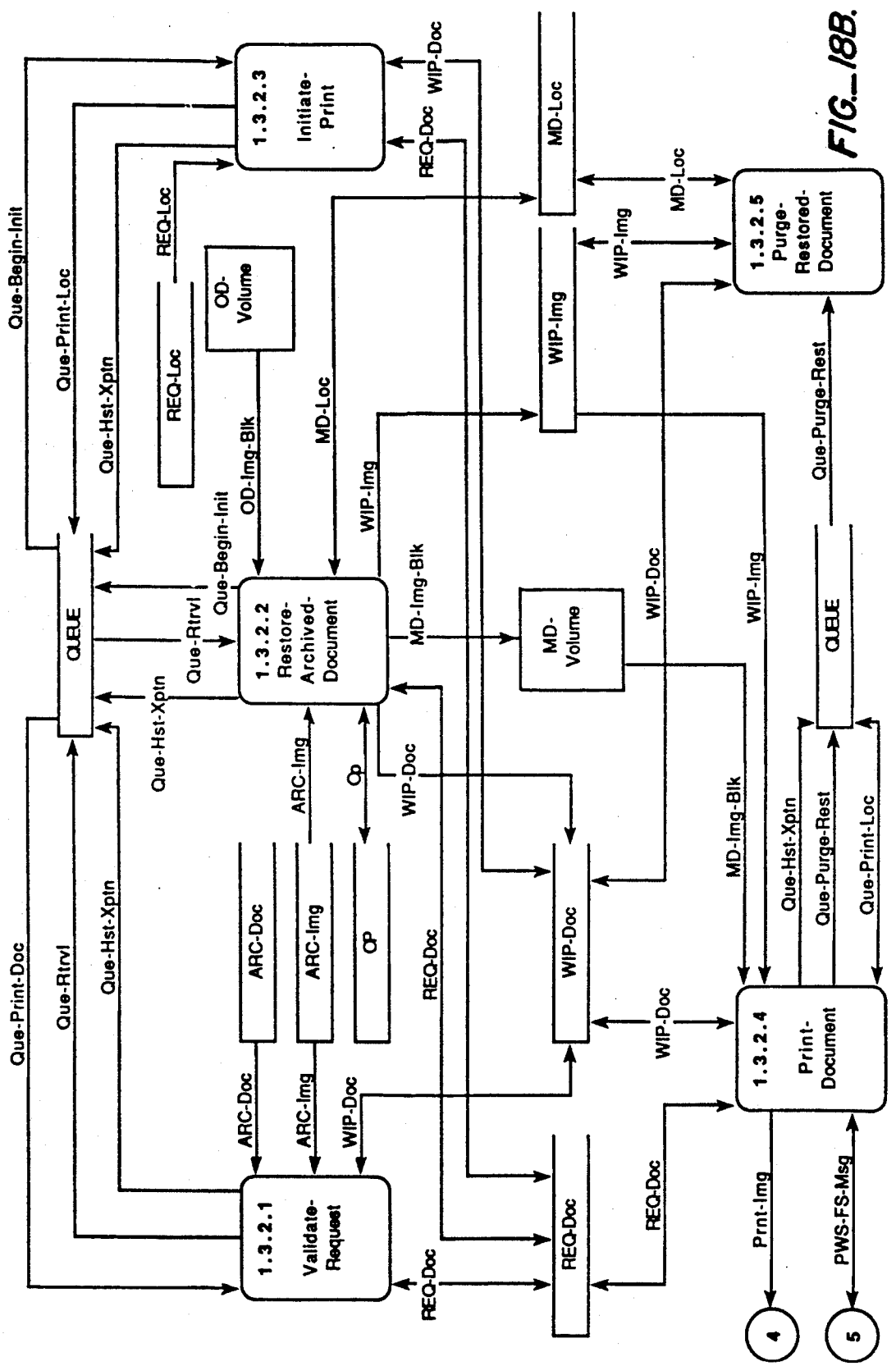
FIG._18B.

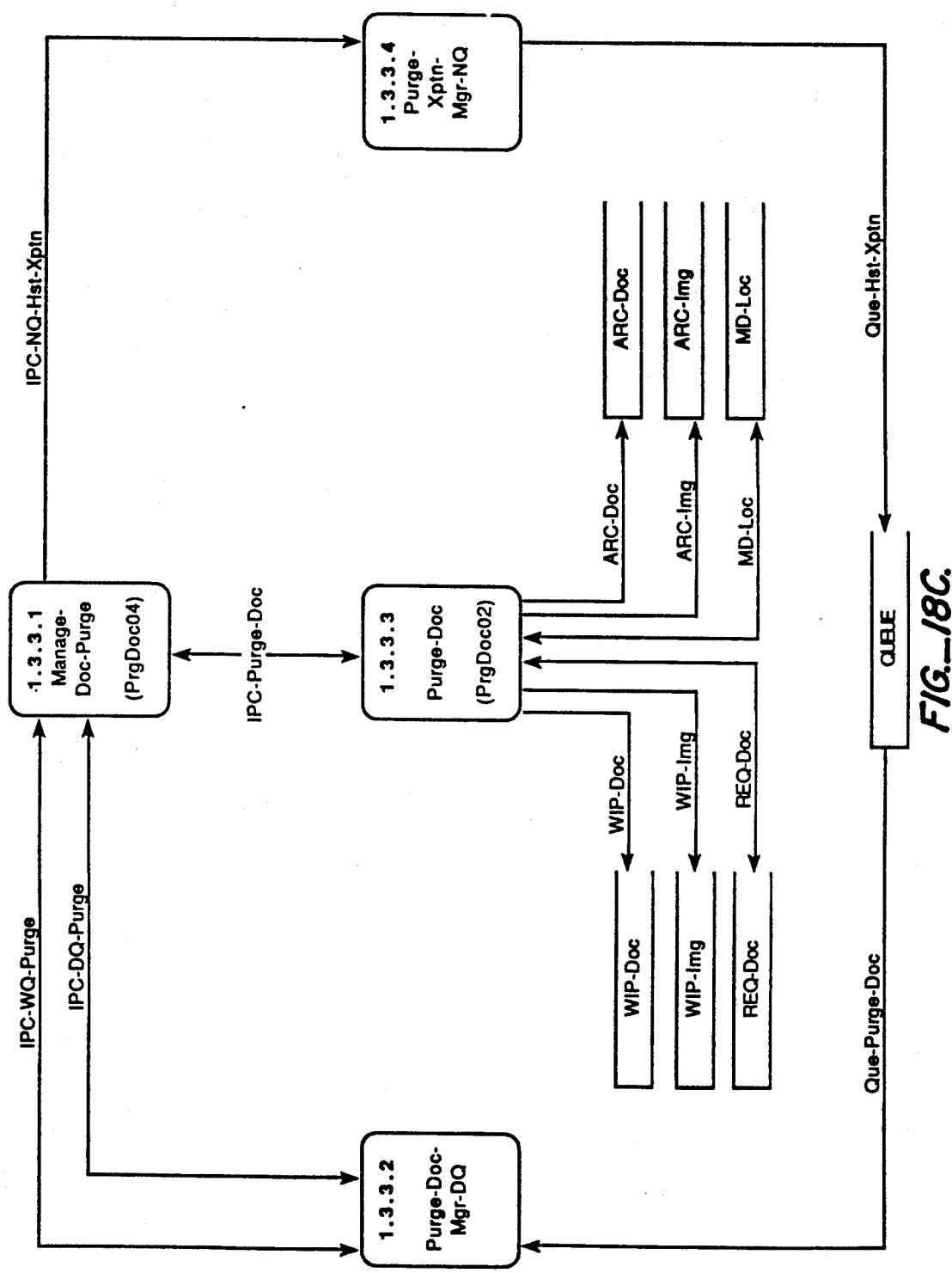
FIG._18C.

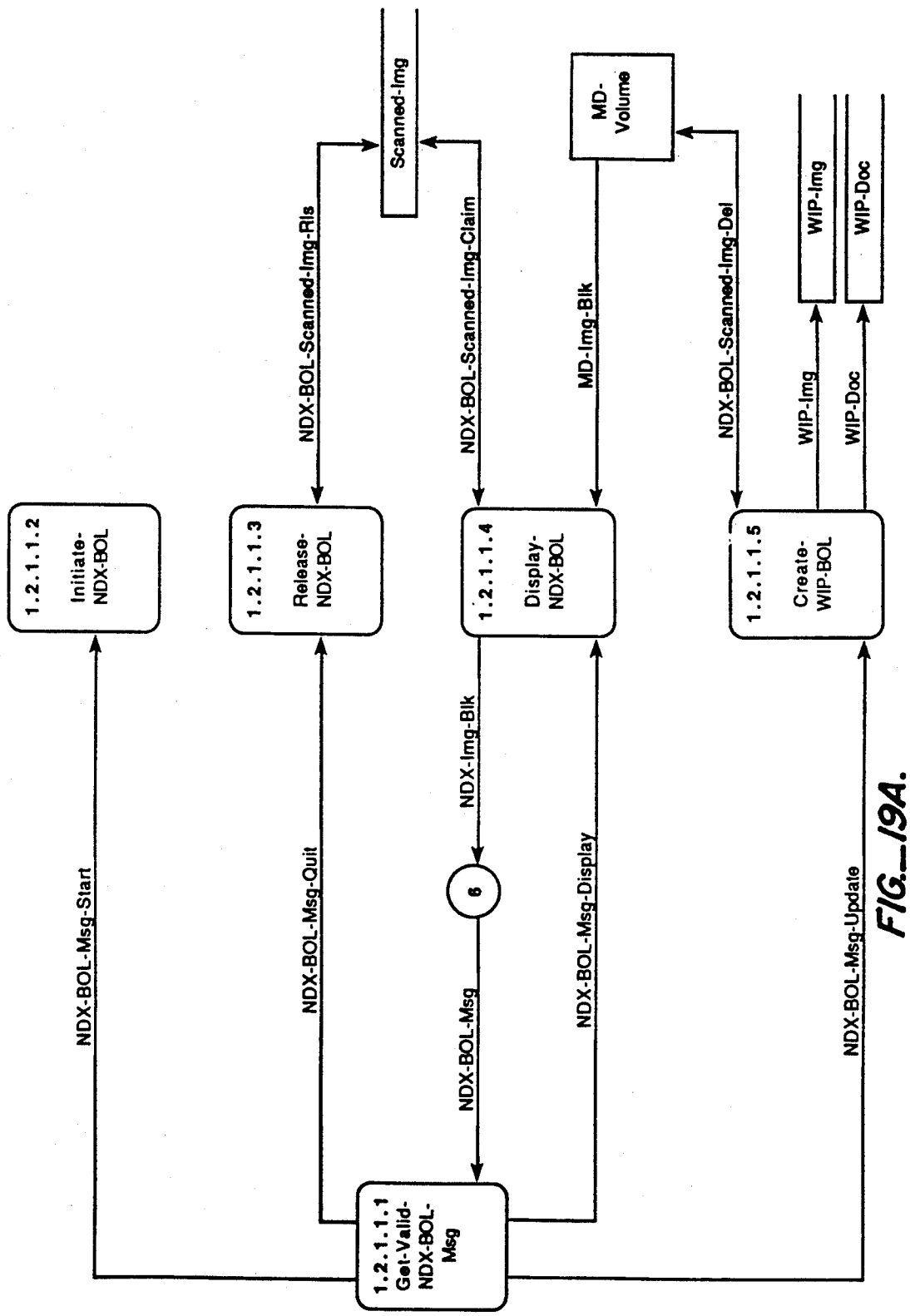
FIG.—19A.

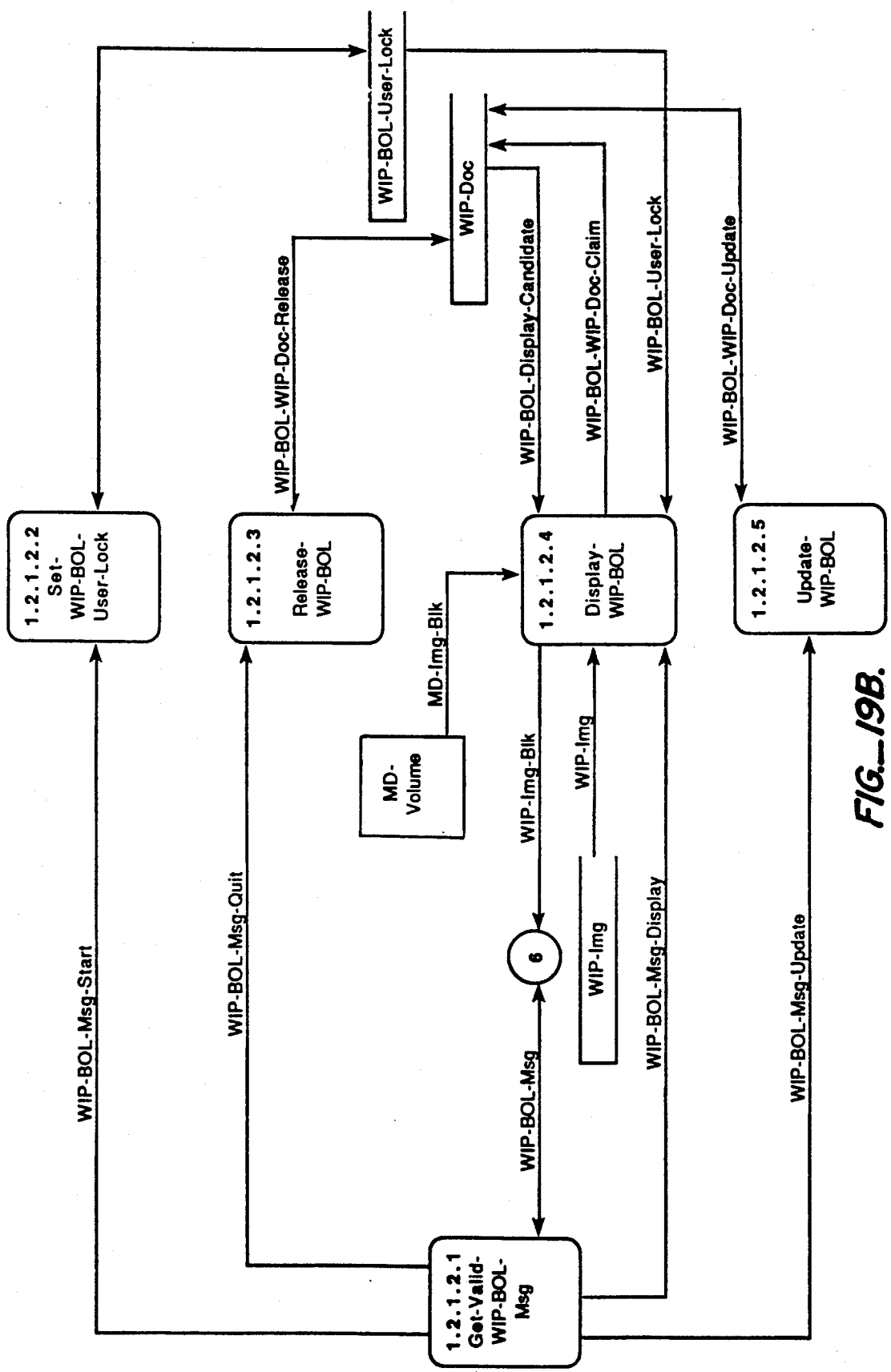
FIG._19B.

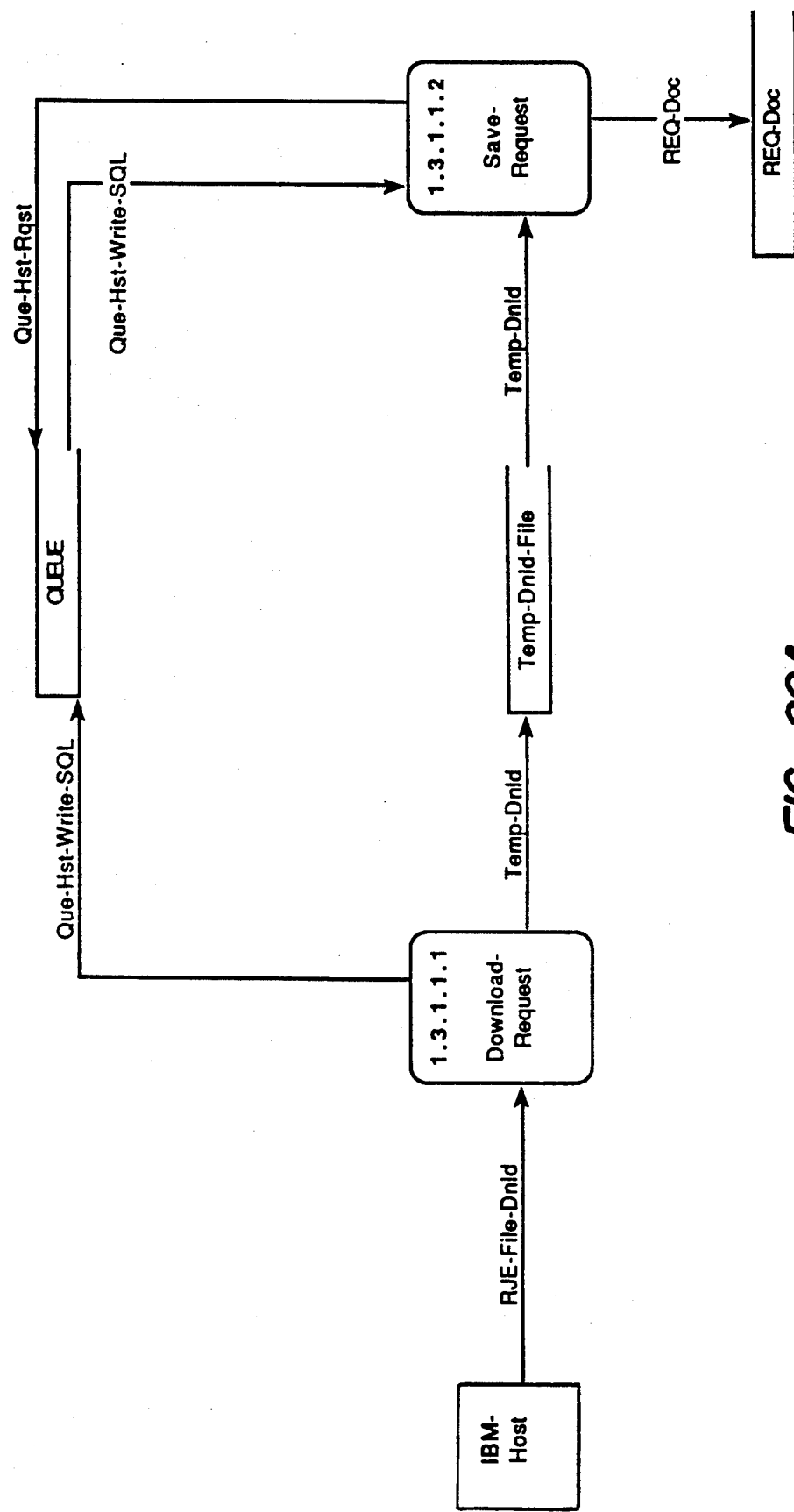
FIG._20A.

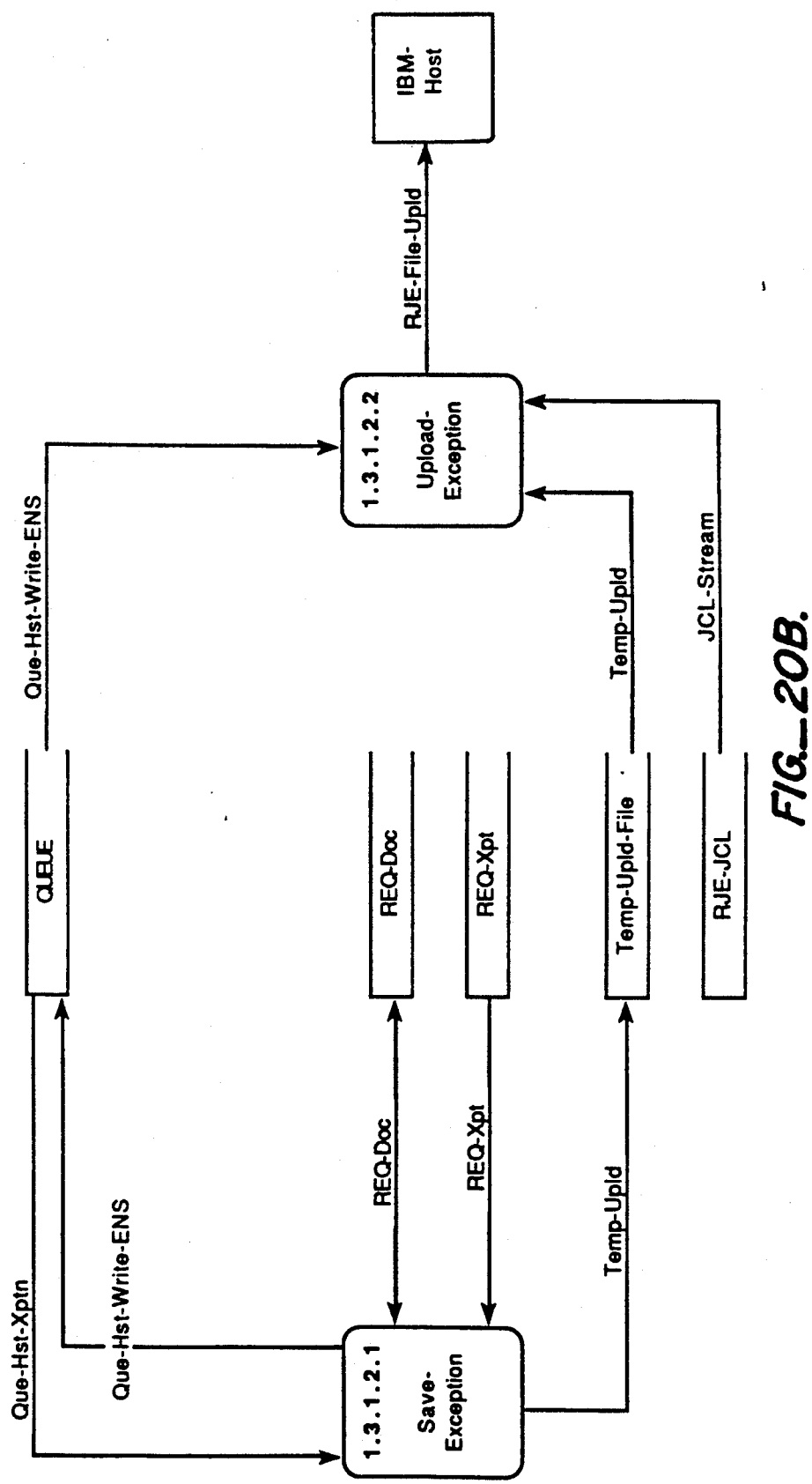
FIG._20B.

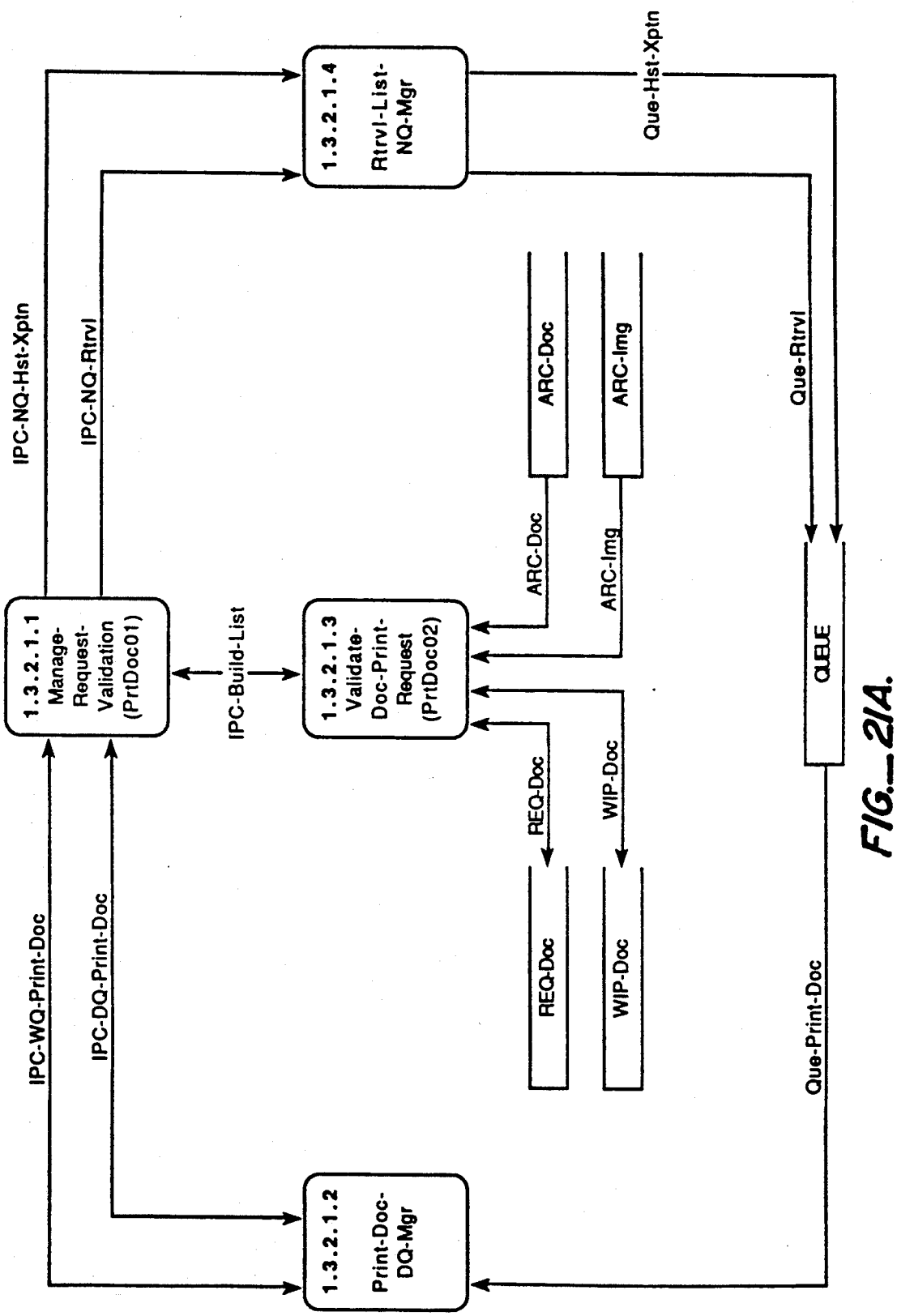
FIG._21A.

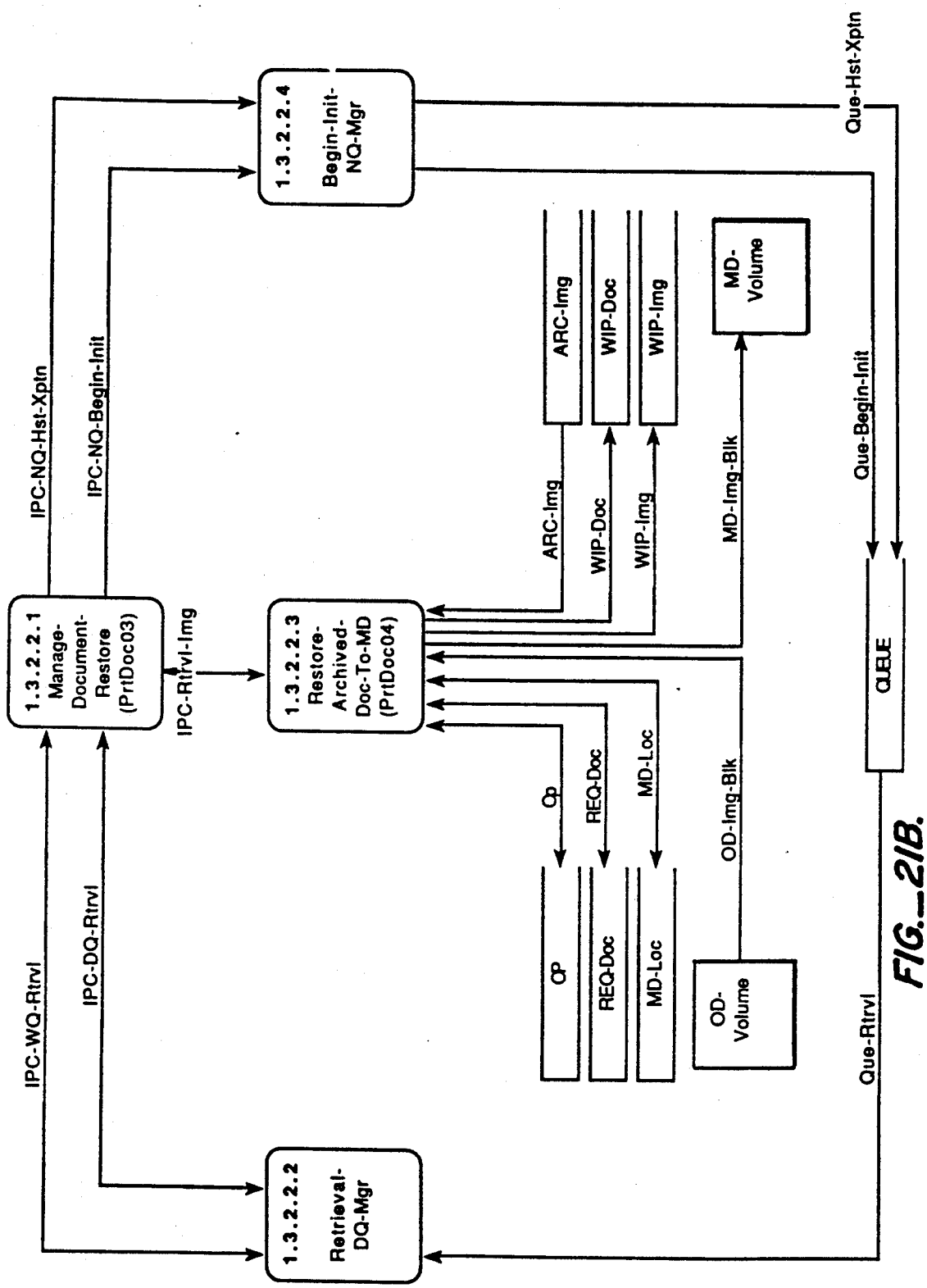
FIG._21B.

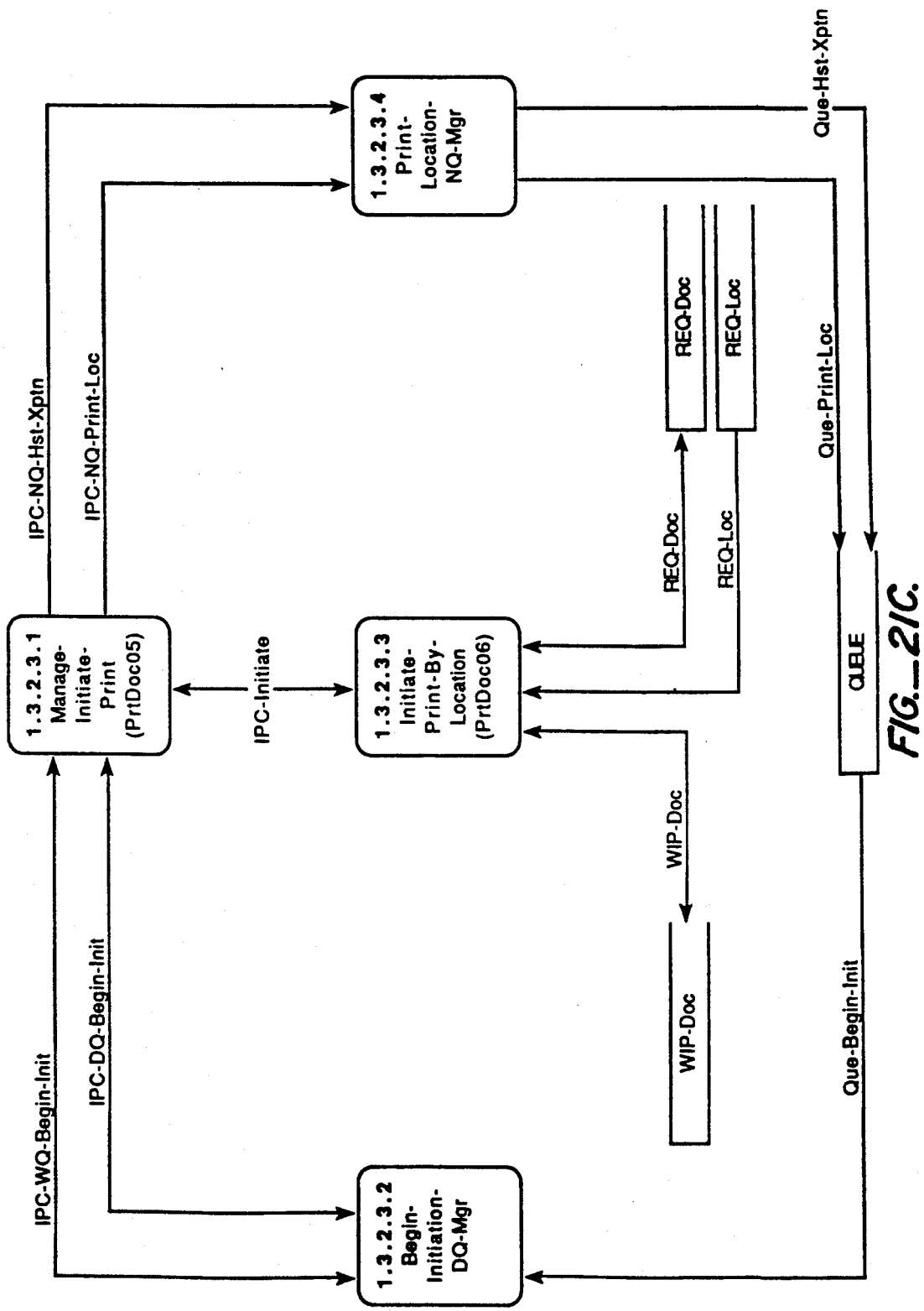
FIG._21C.

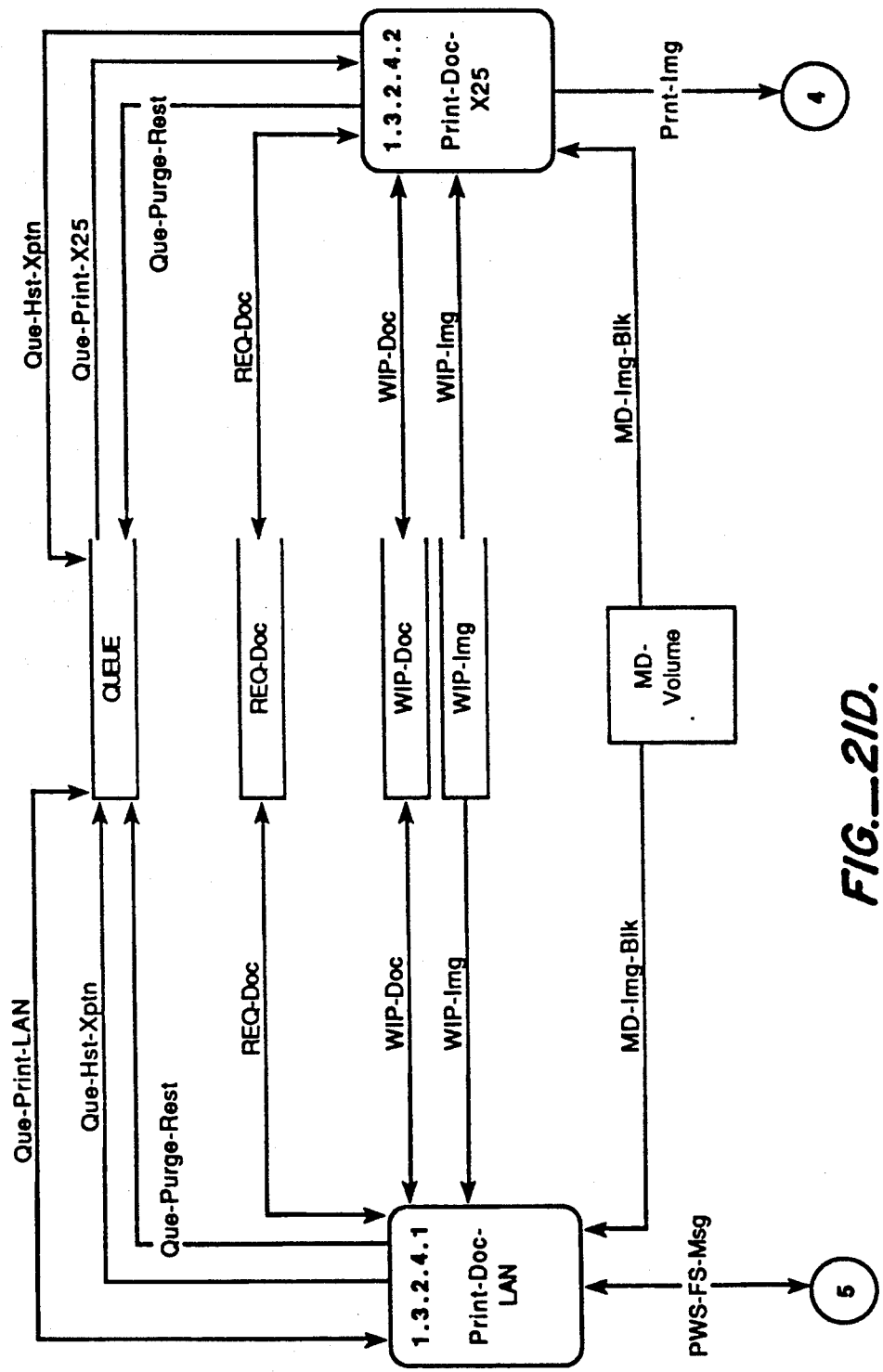
FIG._21D.

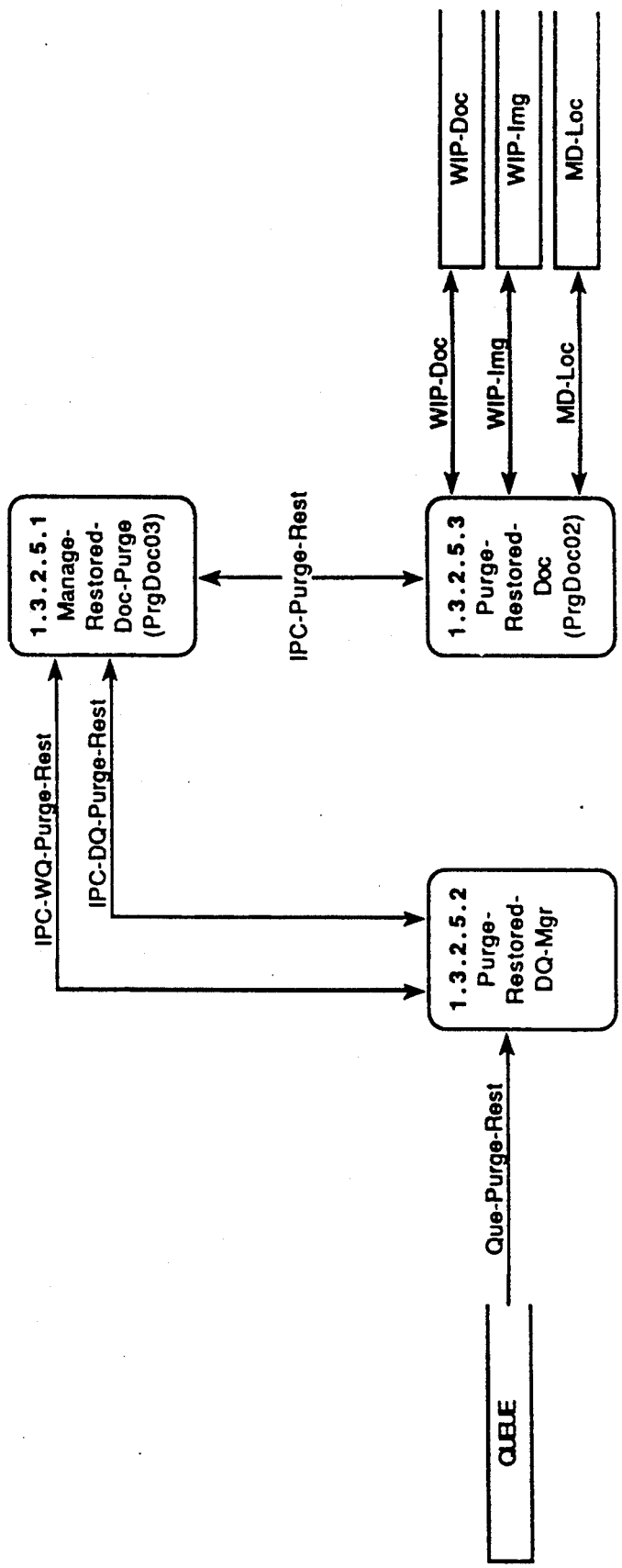
FIG._21E.

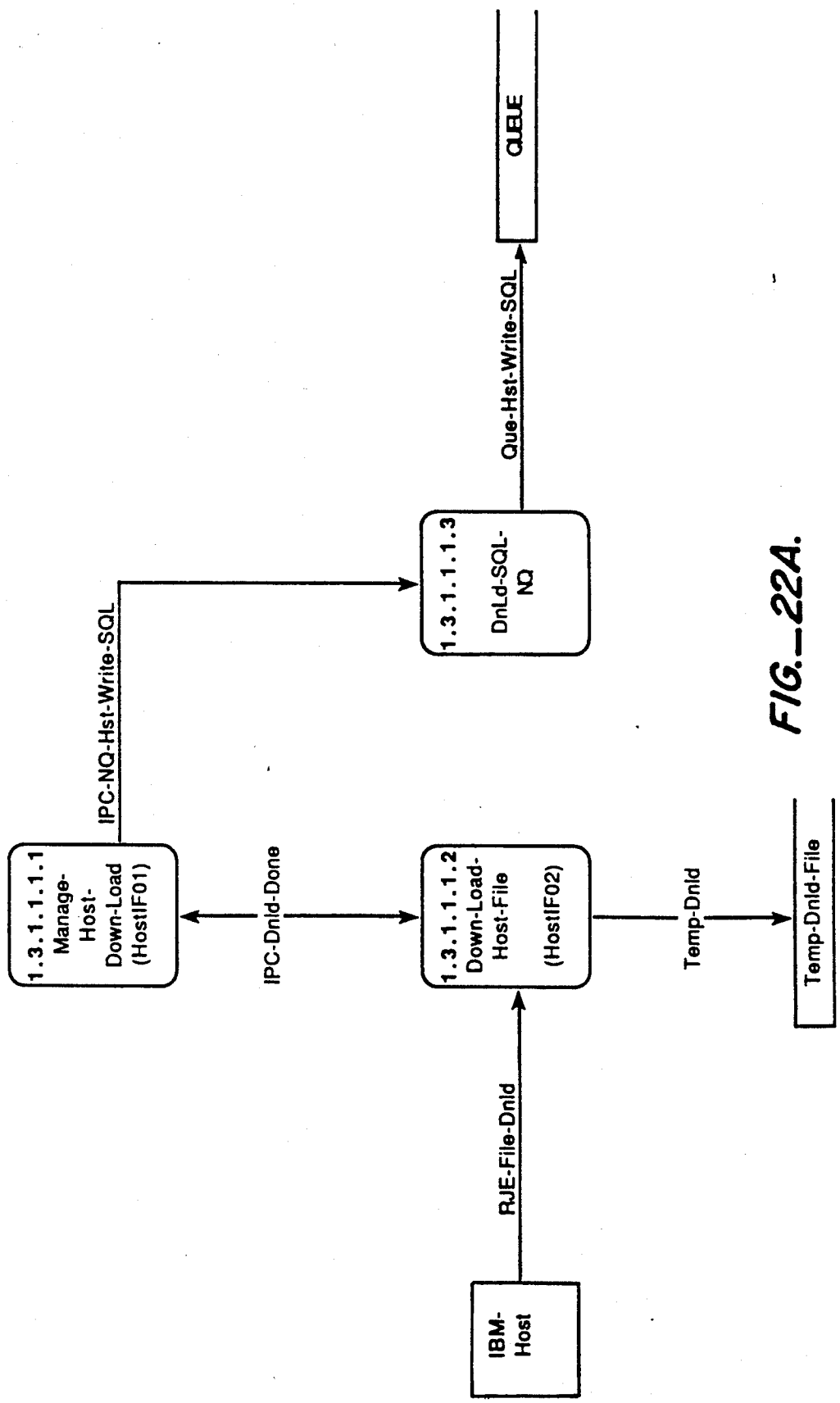
FIG._22A.

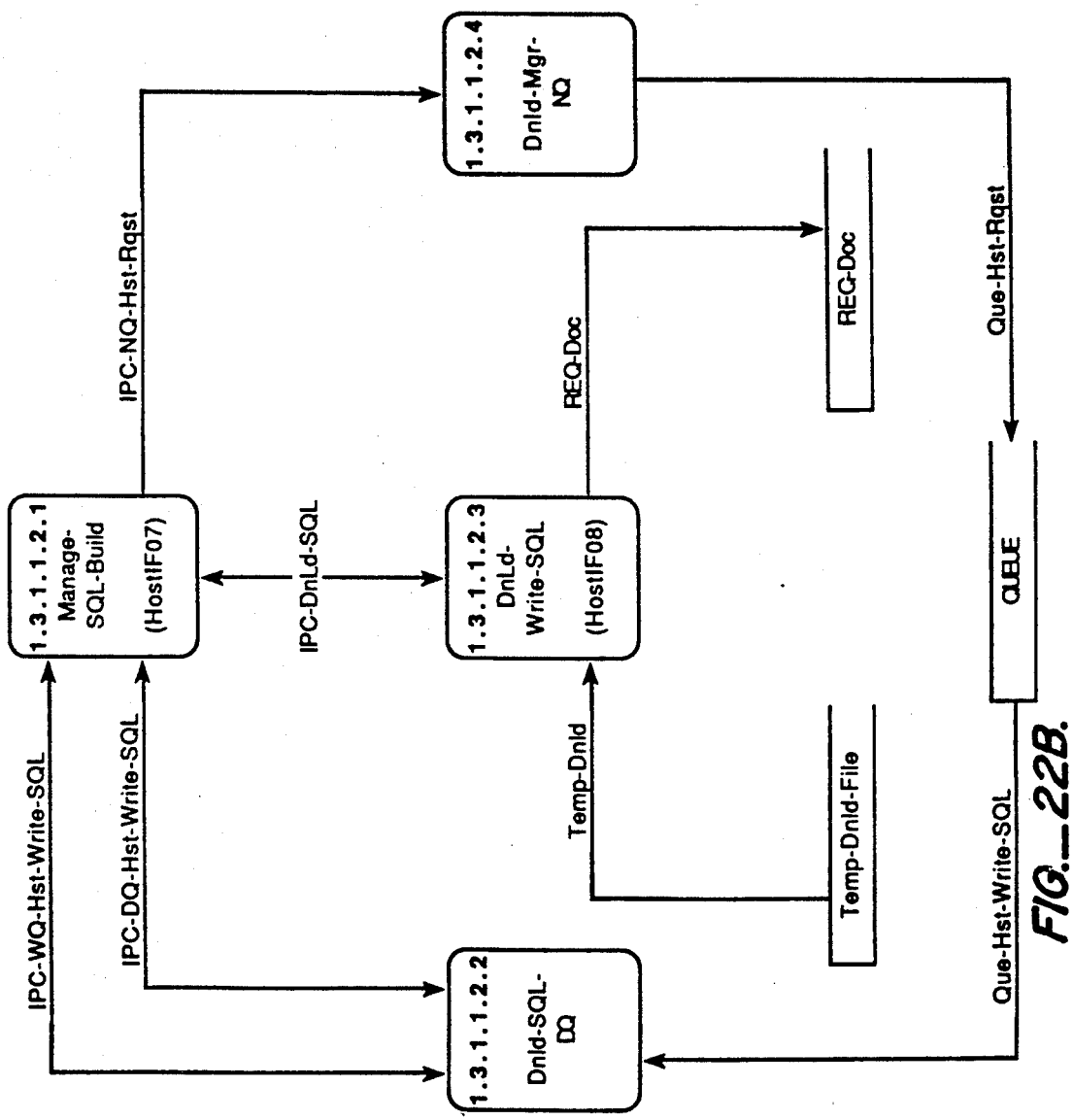
FIG._22B.

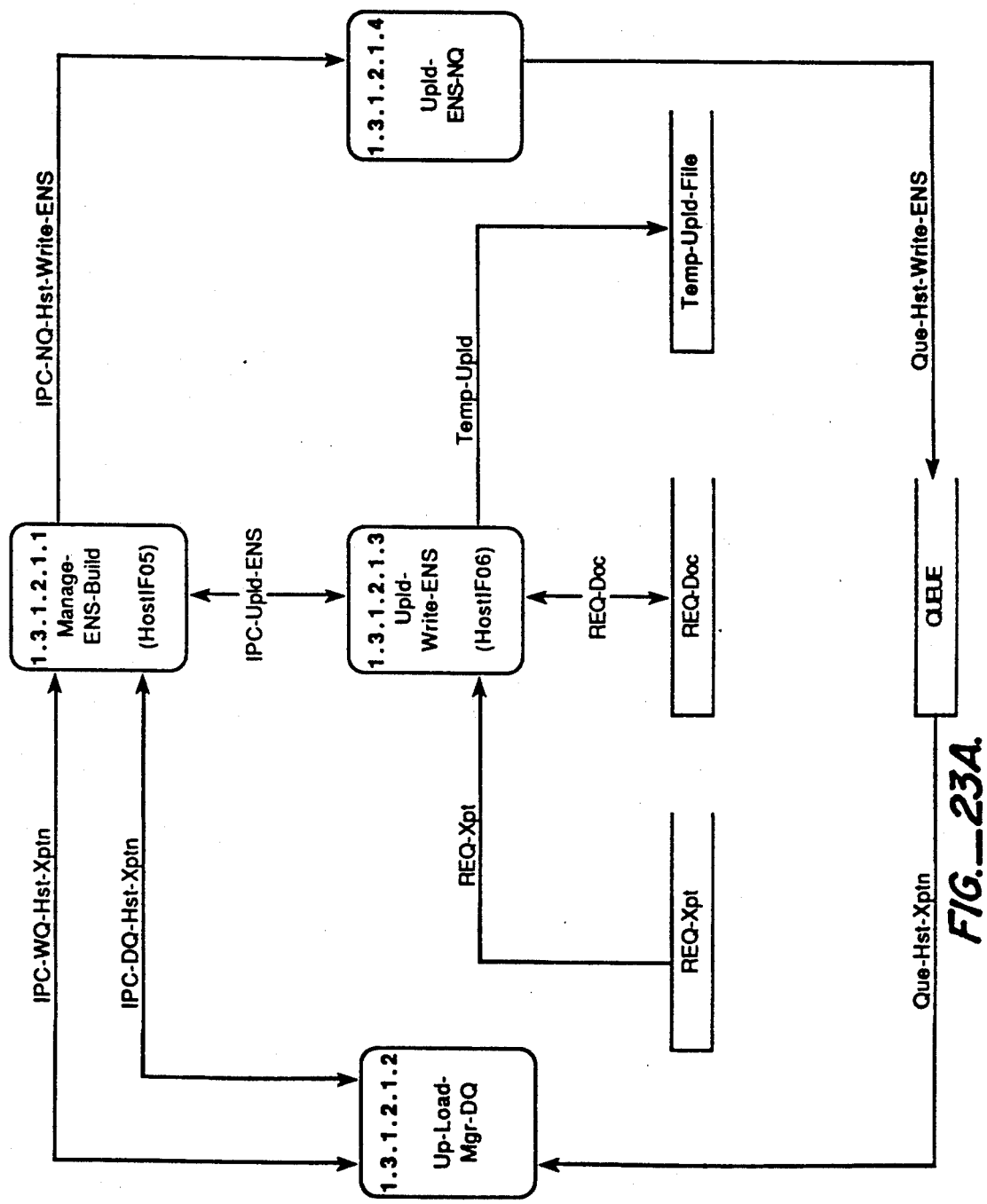
FIG._23A.

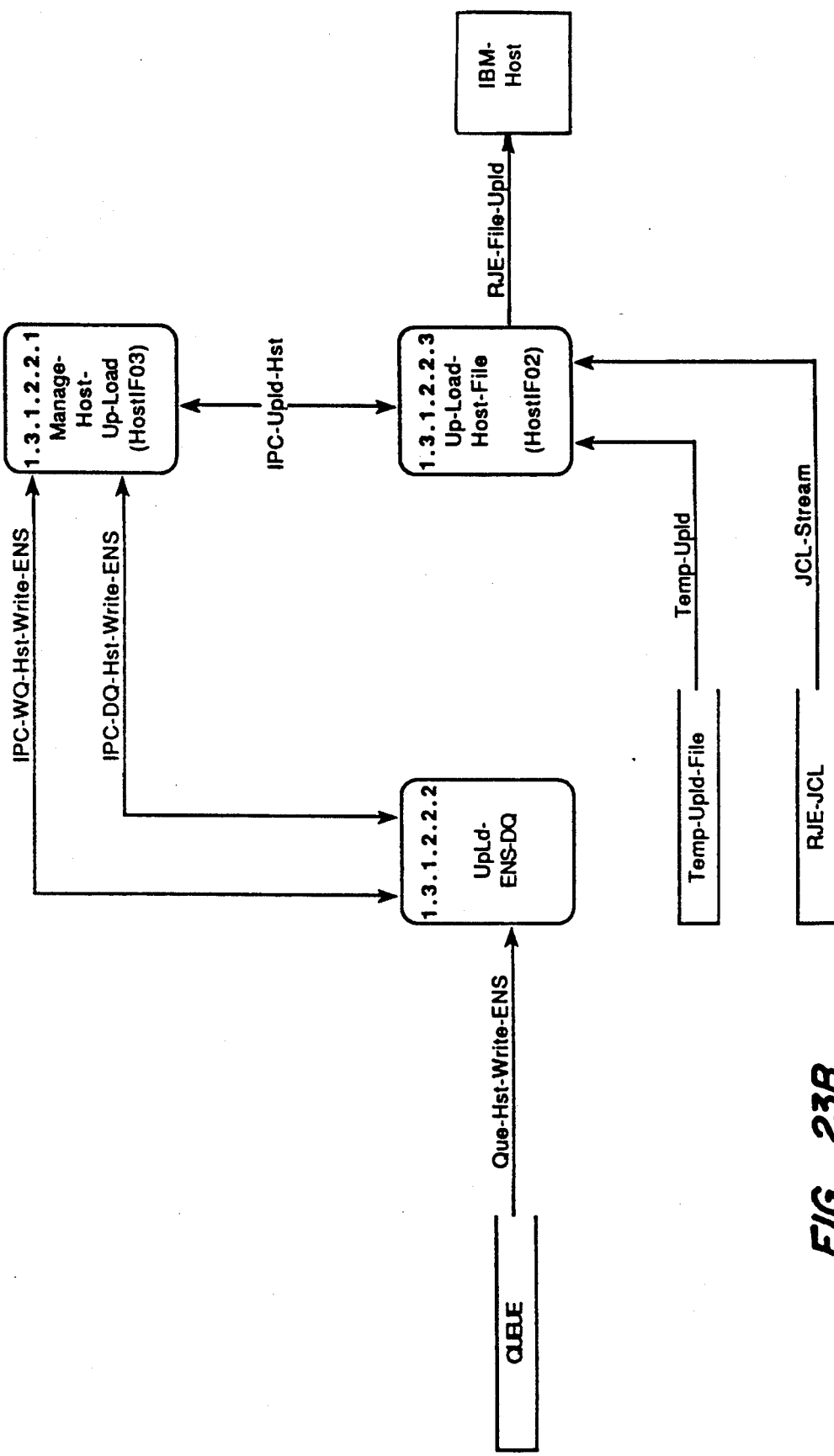
FIG._23B.

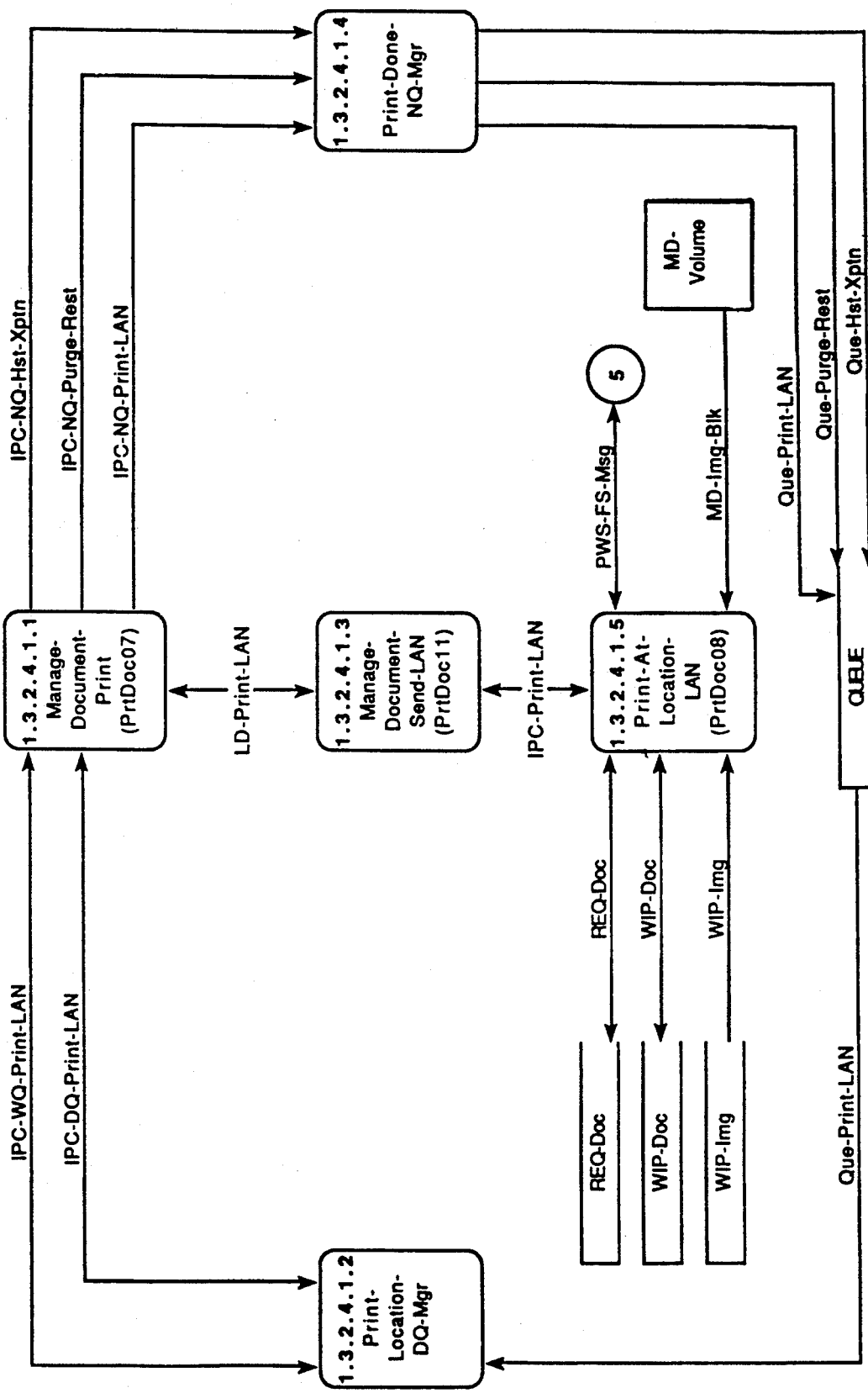
FIG._24A.

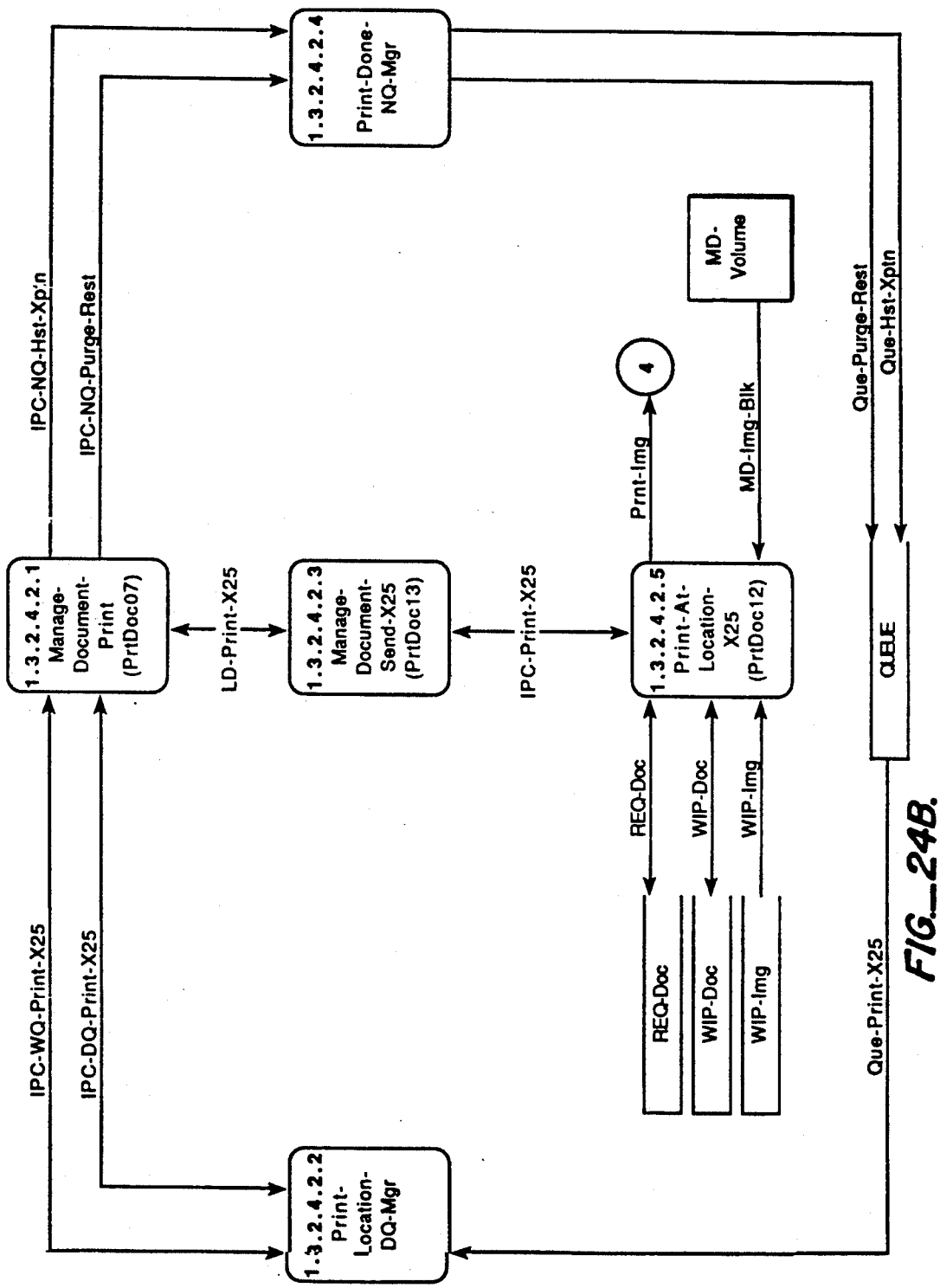
FIG.__24B.

SHIPMENT SYSTEM INCLUDING PROCESSING OF DOCUMENT IMAGES

BACKGROUND OF THE INVENTION

The present invention relates to the shipment of goods, for example by common carrier, and to the processing of documents, such as waybills, bills of lading, or delivery receipts, generated in the shipment transactions.

Commercial carriers of goods, such as railroads, trucking companies, air freight services, or ocean-going shipping companies, generate large quantities of paper documents to record and process the many individual shipments handled each day. A particular carrier will generally serve diverse customers, which impose varied document-handling demands on the carrier. The entities dealing with a carrier may vary, for example, from an individual desiring to ship a single package, to a large company with bulk shipments, or even another commercial carrier such as a trucking company delivering to a railroad or ocean-going vessel. The freight industry also includes specialized intermediary businesses such as freight consolidators and intermodal retailers, which facilitate the shipping of customers' goods on common carriers. The entity desiring to transport an article by means of a commercial carrier is generally referred to herein as the shipper. The intended recipient of that article from the commercial carrier is generally referred to herein as the consignee.

The nature and magnitude of the paper-handling problem may be appreciated by reference to the operations of a trucking company. A trucking company may handle as many as 40-50,000 shipping transactions per day. To handle the large number of shipments with diverse origins and destinations, some trucking companies maintain a plurality of local freight terminals having localized service areas for the pickup and delivery of shipments from or to shippers and consignees. The local terminals may transport shipments to or receive shipments from a smaller number of regional consolidation centers, which may be pictured as forming the hubs of regional wheels while the associated local terminals form the spokes of the wheels. The consolidation centers themselves may also receive and deliver shipments directly from and to shippers and consignees.

A party desiring to make a shipment may bring the goods to a local terminal, or may call upon the services of a local transportation company to pick up the shipment and deliver it to the carrier's local terminal, or the carrier itself may pick up the shipment at the shipper's facility. The various packages dropped off at the terminal are loaded onto a truck either for local delivery or for transportation to the regional consolidation center. There the packages may be transloaded to other trucks for shipment to other local terminals or transloaded to long-haul trucks and transshipped over great distances to other consolidation centers. At additional consolidation centers the load is again transloaded to other trucks going out to the various destination terminals fed by these consolidation centers. The various packages are then delivered to the intended consignees, or the consignees themselves arrange to pick up the shipments at the destination terminal.

The shipment of goods in the above manner is accompanied by a large amount of paperwork. If the shipping party is a commercial entity, then the shipment would typically be made pursuant to a purchase order to the shipper from the consignee. When the goods are picked up at the shipping company, the truck driver typically receives a bill of lading identifying the package or packages being shipped. At the local freight terminal, the truck driver delivers a copy of the bill of lading to a clerk to begin the paper trail.

To assist in keeping track of the many thousands of shipments per day, each shipment is assigned a unique number. In some cases, the truck drivers are provided with pre-printed stickers with a progressive sequence of numbers printed on them, referred to generally as PRO numbers. A sufficient number of duplicate stickers with the same PRO number are printed so that when the goods are first picked up, the truck driver may apply a sticker to the individual packages making up the shipment and to multiple copies of the bill of lading. In some cases, the PRO number is assigned by the trucking company's computer at the time that shipment information is first entered. In either case the PRO number is used to index and identify the goods and the accompanying documents as they make their way through the system.

In a typical computer-controlled accounting and billing system a clerk, who may be located at the local freight terminal, keys the PRO number and other information from the bill of lading at a computer terminal for entry into the company's main computer, which is typically located at a remote site such as the company headquarters. The data from the bill of lading are also used to determine the route, the necessary transhipments and the like, which the shipment will follow to its destination terminal.

When the shipment is delivered to the consignee, or picked up at the destination terminal by the consignee, the consignee is presented with a delivery receipt for signature. The executed delivery receipt provides proof that the shipment was completed. Sometimes the lading freight bill (i.e., with freight charges indicated) is used for this purpose; usually, however, a separate receipt is provided similar in form to the shipment invoice, but without the charges shown. When shipment is complete, a bill is sent to the payor (who may be the shipper or the consignee) either from the company's central billing office or from the freight terminal serving the shipper or consignee.

Such a system is subject to a number of drawbacks and problems, including the following: There are a large number of shipments per day and an even larger number of documents which must be tracked at several different sites. There is a tendency for documents in the field to be subjected to rough handling as they are passed from shipper to trucker to clerk to trucker, etc., such that often the documents are mutilated and partially obscured. A large clerical labor force is needed just to handle the paperwork, which adds significantly to the cost of shipment. Sufficient records must be kept of shipments en route such that misdirected or lost shipments can always be traced. It is critical that the information from the bill of lading always be entered accurately into the company's computer. Without accurate data entry, errors will appear in the company's billing and record-keeping, and it may become difficult to trace lost shipments. However, the initial data entry is typically done by the clerical staff at remote freight terminals, who have little accountability for errors and where close supervision is difficult. Many of the documents used in the shipment process also have legal significance. For example, the signed bill of lading represents a contract between the shipper and the carrier. The signed delivery receipt or lading freight bill constitutes proof of performance under the delivery contract with the carrier and may also constitute proof of acceptance under the original purchase order pursuant to which the goods were shipped. Many times the shippers routinely want a copy of the signed delivery receipt for their own records. And, equally as typical, many payors require that the invoice from the carrier be accompanied by a copy of the bill of lading or executed delivery receipt.

These problems are not limited to the trucking industry, but arise in analogous forms with the shipment of goods by other modes as well.

SUMMARY OF THE INVENTION

The present invention provides an integrated system for processing the documents generated in shipping transactions, which overcomes or greatly alleviates many of the above-referenced problems. The system provides for distributed processing of the shipping transactions from electronic images of the documents so as to avoid the need to handle the paper documents themselves during the transaction processing. More than a system for merely capturing, transmitting, storing and displaying document images, the invention provides an integrated approach to handling the billing functions for the thousands of transactions per day typical of the shipping industry and for handling the comparable number of documents generated at diverse geographical locations.

The system provides for enhanced reliability of data entry; allows for critical functions to be performed in an adequately supervised environment without any substantial increase in supervisory personnel; handles documents conveniently with minimum of errors and maximum speed; efficiently deals with the attachment problem; and enables invoices to be sent out for payment significantly earlier on the average than has heretofore been realized for such large numbers of transactions. A substantial benefit of the system, in addition to lower cost transaction handling, is a reduction in the float carried by the transportation company.

Briefly, a system according to the invention includes an arrangement of document scanners and/or telefax apparatus or the equivalent by which images of the shipping transaction documents are captured or otherwise provided to the system. The shipping document images may be scanned into the system at a plurality of remote stations established for that purpose, or the shipping document images may be telefaxed directly by the shippers to the system. The system includes a transaction processing facility, which receives the images of the shipping documents either from the scanners at the remote stations or from the receiving facsimile apparatus. The transaction processing facility includes appropriate storage for the document images, an image management facility, and a computer database of shipping transaction data, along with appropriate applications specifying the procedures and instructions for processing the shipping transaction data for such purposes as invoicing and record-keeping. The system also includes a plurality of image processing stations, at which key operators may view images of the shipping documentation and enter data into the shipping transaction database as called for by the data processing procedures based on the images of the shipping documents displayed at the image processing stations.

A system according to the invention may be configured as an entire integrated shipping transaction processing system as just described. However, a shipping company may already have existing computer databases and computerized (non-image) transaction processing procedures in place. For such companies a system according to the invention may be configured with a separate image file server, which may be interfaced with the company's existing host computer database and procedures to provide image processing capability. In one convenient manner of providing such interface, characteristic trigger strings are embedded in the pre-existing data-processing applications screens on the company's host computer. The image management facility then responds to the characteristic trigger strings to provide a queue of images on command to an image processing work station for processing by the key operator.

Other features and advantages of the system are described below or will readily be appreciated by those skilled in the art from the following specifications and accompanying figures.

BRIEF DESCRIPTION OF THE DRAWINGS

FIG. 1 shows a high level block diagram of a system according to the invention.

FIG. 2 shows a block diagram of a remote station.

FIG. 3 shows a block diagram of an image processing workstation.

FIG. 4 shows the database relations within the image file server.

FIG. 5 shows in block diagram form an overall system data flow diagram.

FIG. 5A is an exploded block diagram for the dual page workstation block of FIG. 5.

FIG. 5B is an exploded block diagram for the local print workstation block of FIG. 5.

FIG. 6 is a data flow diagram for the Manage-Document block 1 of FIG. 5.

FIG. 7 is a data flow diagram for the Manage-System Resource block 2 of FIG. 5.

FIG. 8 is a data flow diagram for the Maintain-System-Table block 3 of FIG. 5.

FIG. 9 is a data flow diagram for the Scan-N-Print-Remote block 4 of FIG. 5.

FIG. 10 is a data flow diagram for the Key-Enter-Document block 6 of FIG. 5.

FIGS. 11A, B and C are data flow diagrams for the blocks 1.1, 1.2 and 1.3 of FIG. 6, respectively.

FIGS. 12A and B are data flow diagrams for the blocks 2.1 and 2.2 of FIG. 7, respectively.

FIGS. 13A and B are data flow diagrams for the blocks 3.3 and 3.4 of FIG. 8, respectively.

FIG. 14A is a data flow diagram for the block 4.1 of FIG. 9.

FIGS. 15A, B and C are data flow diagrams for the blocks 6.2, 6.3 and 6.4 of FIG. 10, respectively.

FIGS. 16A, B and C are data flow diagrams for the blocks 1.1.1, 1.1.2 and 1.1.3 of FIG. 11A, respectively.

FIGS. 17A and B are data flow diagrams for the blocks 1.2.1 and 1.2.2 of FIG. 11B, respectively.

FIGS. 18A, B and C are data flow diagrams for the blocks 1.3.1, 1.3.2 and 1.3.3 of FIG. 11C, respectively.

FIGS. 19A and B are data flow diagrams for the blocks 1.2.1.1 and 1.2.1.2 of FIG. 17A, respectively.

FIGS. 20A and B are data flow diagrams for the blocks 1.3.1.1 and 1.3 1.2 of FIG. 18A, respectively.

FIGS. 21A, B, C, D and E are data flow diagrams for the blocks 1.3.2.1, 1.3.2.2, 1.3.2.3, 1.3.2.4 and 1.3.2.5 of FIG. 18B, respectively.

FIGS. 22A and B are data flow diagrams for the blocks 1.3.1.1.1 and 1.3.1.1.2 of FIG. 20A, respectively.

FIGS. 23A and B are data flow diagrams for the blocks 1.3.1.2.1 and 1.3.1.2.2 of FIG. 20B, respectively.

FIGS. 24A and B are data flow diagrams for the blocks 1.3.2.4.1 and 1.3.2.4.2 of FIG. 21D, respectively.

DETAILED DESCRIPTION OF AN ILLUSTRATIVE EMBODIMENT

A system according to the invention may be configured in a variety of ways, depending upon such factors as the number and arrangement of terminals or stations for handling the goods, the documentary requirements of the particular mode of shipment, or the particular computers used to implement the system. Thus, the invention is not intended to be limited to the specific embodiment disclosed here, which is offered only by way of illustration.

System Overview

A specific embodiment of the invention adapted for the trucking industry is offered here by way of illustration. Documents are referred to here by the names generally used in the trucking industry, but those familiar with the practices in regard to other modes of shipment will readily be able to make the correspondences with the present example.

FIG. 1 shows a system according to the invention including a plurality of remote stations 10 and a transaction processing station 11. The remote stations are disposed at local freight terminals, at regional consolidation centers, or at any remote location where shipments and shipping transaction documents are brought to, or otherwise enter, the system. At these remote stations the electronic images of the shipping transaction documents are captured or received, are subjected to such preliminary processing as batching and labeling, and are transmitted to a processing station for data entry and billing operations.

As depicted in FIG. 1, the processing station 11 includes image processing facility 12, for managing and storing the electronic images of the shipping transaction documents and by which one or more operators extract useful information from those images. The transaction processing station may sometimes be referred to as "central" in the sense that it processes document images from a plurality of remote stations or sources. It need not process the document images from all remote stations. Thus, a system according to the invention may include several "central" transaction processing stations so that the image processing function may be distributed over a large geographical area. This may be desirable, for example, where a company has several regional billing centers or where it is desired to transmit customers' shipping documentation to stations located in the customers' respective service area for processing. Similarly, other modes of shipment may call for "remote" stations which are only logically remote but physically may be in the proximity of the central station.

Image processing facility 12 of FIG. 1 further includes a main image storage and management facility, comprising an image file server 13 and disk storage 31-33, and one or more image processing workstations 18. A host computer 19 maintains a non-image database of transaction-related information. For the purposes of the present description, host computer 19 is considered as a logical component of central processing station 11, although in any particular implementation it may be provided by a separate computer located off-site and perhaps even serving several such "central" processing stations. Of course, in other implementations, the non-image transaction database of host computer 19 and image file server 13 for the image database may be provided by the same computer and may be integrated with one another.

Each of the remote stations (see FIG. 2) includes a means 21 for providing the images of the shipping documents to a local microcomputer 22, by which the document images enter the system. The image means 21 may be provided, for example, by free-standing high-speed document scanners at the various remote stations. In the illustrated embodiment the image capture means is provided by a Bell and Howell Copiscan 2115 Scanner, which converts the scanned documents to electronic digital images at a resolution of 200 dots per inch and is able to sustain a feed rate of 20 pages per minute. The scanner is connected to a microcomputer 22, for example, of the IBM PC/AT class. In some modes of shipment, for example, shipment by rail, transaction documents are often sent to the terminal by facsimile transmission. For such applications, the system may be configured to receive and accommodate fax transmissions for entry directly into the system without the need to re-scan a faxed document, as discussed more fully below. Thus, in such a system configuration the means for providing the images to the system comprises facsimile receiving apparatus and facsimile switch.

The microcomputer 22 serves as a controller for the scanner and also provides data file 23 by which transaction-related information is associated with the captured images. The data file may be composed most simply of a small header record associated with each image. The selection of the data to be included in the data file at this point is important for efficiency and reliability of system operation. At this stage it is advantageous for the data file to include the shipping priority along with limited document identifying and/or categorizing information such as the document type. To provide sufficient overhead for the normal peaks of shipping activity in the course of a day, for a remote freight terminal processing approximately 1000 shipping transactions per day, the microcomputer 22 is equipped with an 80 megabyte hard disk and two megabytes of internal memory.

For entering transaction-related information the microcomputer 22 is provided with data entry means 24 typically in the form of a conventional keyboard or a specially adapted keypad. Typical transaction-related information to be entered at this time includes the document type, for example bill of lading or delivery receipt, and the shipment priority, for example, overnight delivery, next-day delivery, or non-priority. If desired in any particular application, the system may be configured so that other transaction-related information may also be entered at this time such as the shipper and consignee names or addresses or the PRO number. For other modes of shipment, of course, the data to be entered should be selected according to the practices of the given mode. For example, for shipment by rail the remote terminals may be located at individual railroad agencies receiving goods with accompanying bills of lading for shipment. The waybill number and identity of the railroad car may advantageously be selected as part of the header record. The header information is useful for tracing missing or delayed shipments and, in part for that reason, may be used for key-indexing the document images at the central processing station, as explained more fully hereinbelow.

For system configurations in which only minimal transaction-related information is to be entered at the remote stations, a full keyboard is not needed and a simplified keypad may be provided instead, which includes specific keys signifying document priority and document type. Whether a keypad or full keyboard is used, the microcomputer may be programmed for batch entry of document type and priority so that consecutive documents will be scanned into the system with the same document type and priority until a new document type or priority key is depressed.

The remote stations also include means 26 for communicating document images and related information back and forth with the central processing site. As will be explained more fully below, images with their associated header files are transmitted to the central processing station for processing and archiving. For convenience in responding to customer inquiries, the remote stations may also receive images or other data back from the processing site for filling customer requests for duplicate copies of archived documents or the like.

In the illustrated embodiment, the basic communications functions are implemented by a commercially available communications package, described below, which provides a co-processor card for the microcomputer and utilizes the standard X.25 communications protocol. Through the co-processor card the microcomputer communicates with the central processing station over a 56 kilobit per second leased line. Those skilled in the art will recognize that other forms of communications link, such as switched point-to-point or multi-point data links, and other communications protocols, such as SNA, or other communications rates, may also be used to fill the needs of the present invention.

The remote station microcomputer 22 also includes a co-processor card 27 for compressing document images received from the scanner prior to storage and transmission to the central site and also for decompressing the images received from the central station prior to printing at the remote station. The compression is performed using the CCITT group 3 or group 4 two-dimensional compression standard. Those skilled in the art will recognize that other image compression means, such as compression and expansion software, may be used to meet the needs of the present invention. Prior to compression a typical $8\frac{1}{2} \times 11''$ document requires about 456 kilobytes of storage. Using the group 3 compression standard, a typical bill of lading image requires about 60 kilobytes of storage, and a typical delivery receipt requires about 40 kilobytes.

For quality control, the microprocessor at the remote stations may also be provided with a display monitor 28 so that an operator may verify the accuracy with which documents are scanned into the system. So as not to interfere with the fast scanning rate of the document scanner, microcomputer 22 may be configured to display only occasional documents at a display frequency selectable by the operator as the documents are scanned into the system. For example, the operator may choose to display only every other document or only every fifth document. In this way the operator can quickly detect systematic or recurring scanning errors without slowing down the scanning operation to inspect every document image.

The remote station may also be provided with a printer for filling customer requests for documents so that hard copies need not be maintained on site.

The central processing station includes image file means for storing the images of documents captured at remote stations and data file means for storing transaction-related information. In some situations, a shipping company desiring to avail itself of the benefits of the present invention will already have installed a fully operational and satisfactory computer-based system for invoicing shipping transactions and for keeping records of the transactions. Such a computer-based system will generally include data files containing transaction-related information for accounting purposes, for pricing the shipments, for routing purposes, and the like. The specific embodiment of the invention described here takes advantage of the existing files in such an installed computer-based system. The freight rating, accounting, and invoicing functions, as well as other functions, are performed by host computer 19, which includes appropriate data files 31 for storing transaction-related information. The separate image file server 13 manages the images. The image file server receives images captured or received by fax at the remote stations, and manages the storage, retrieval, and printing functions. The image file server also makes images available to image processing workstations 18 for indexing, data entry, and exception processing functions, as explained more fully below.

In the illustrated embodiment the image file server is provided by an appropriately programmed Tandem TXP multiprocessor computer system, available from Tandem Computers, Inc., of Cupertino, CA, and the host computer is an IBM 3094. The commercially available Tandem system is modified to include appropriate workflow software to support the image reception, storage, printing, and communications, as well as to provide an interface with the image processing workstations and with the host computer. The image file server is discussed in more detail below.

The image file server houses a permanent optical image index data base, a transient workflow data base, and software for cataloging new images and retrieving existing images for display and print. The image file server also provides for such other routine computer system functions as file transfer to and from the host computer, the production of periodic management reports, and support for a supervisory console for use in monitoring the various aspects of the system.

In the illustrated embodiment temporary storage is provided by both mirrored 14 and unmirrored 15 magnetic disk storage, although, of course, the storage may all be mirrored if desired. The mirrored storage 14 is provided for the file server operating system, utilities, and various application programs, the permanent optical image index data base, and the transient work flow data base. In the mirrored storage, read requests are shared between the two drives, and the operating system switches transparently from a failed drive in a mirrored pair to a backup drive so as to provide for enhanced performance and additional reliability. The unmirrored storage 15 provides for the caching of images received from the remote stations or retrieved from optical disk storage.

The images are archived on optical disk storage 16. In the embodiment illustrated here, the optical storage is provided by a commercially available Tandem Optical Storage Facility, commonly referred to as a jukebox, interfaced to the image file server by means of a standard small computer systems interface (SCSI) bus. The Tandem Jukebox contains two optical disk drives and thirty-two 2.4 gigabyte platters. For system reliability, image integrity, and prevention of work flow bottlenecks, in the illustrated embodiment one of the optical disk drives is dedicated to archiving document images as they are received from the remote stations. The second optical disk drive is used as a read-only unit to service random image retrieval requests.

The host computer 19 continues to run its existing applications for pricing, invoice printing, and the like, which are enhanced by the image processing capability in such areas as bill of lading data entry prior to billing, printing of attachment documents to accompany invoices, and exception-item processing.

The operator-run image processing capability is provided by a plurality of workstations 18. Each workstation employs a microcomputer 36 (see FIG. 3) such as an IBM personal computer of the PC/AT class with a hard disk having two megabytes of memory, a high-resolution display monitor 37 for clear images of the scanned documents, and a keyboard 38 for data entry. The illustrated embodiment uses display and processing workstations, sometimes referred to as dual page workstations, capable of displaying an image of a document on one-half of the display screen while displaying one or more data-entry windows on the other half of the display screen. For access to the image data, the workstation microcomputer 36 communicates with the image file server through a Local Area Network. The images are sent to the workstation by the image file server in compressed form, using the CCITT group 3 or group 4, two-dimensional compression standard. The images are decompressed by the microcomputer, stored in buffer memory, and queued for display.

The workstation maintains a first image buffer memory 39, provided by magnetic disk storage, holding about twenty images in compressed form as they are received from the image file server. The workstation maintains a second image buffer memory 40 holding about four images in decompressed form ready for immediate display. The microcomputer is equipped with control software providing a multi-tasking environment so that images may be transferred from the image file server and decompressed in the background while the operator is performing the various processing functions. In this manner, delays in displaying images are greatly reduced, and are essentially limited to the screen painting time, which enhances the speed with which an operator can process the documents.

To provide the data entry window on half of the display screen, the workstation communicates directly with the host computer, and emulates the host computer terminal. Characteristic trigger fields are inserted into the applications screens for the pre-existing host computer applications programs. In this manner, an operator can call up host computer applications screens from the workstation and enter data from the image of the relevant document. Previous to the present invention, the data would have to be entered by clerks working from the paper documents themselves, with the consequent delays in assembling and handling the documents. Use of the characteristic trigger fields permits changes to the host computer applications programs to be made without any input on the image file server or workstation software.

Having described the basic components of the system in an illustrative application to the trucking industry, an overview is now provided of the system operation.

A shipment typically arrives at a remote freight terminal either delivered directly by the shipper or is picked up at the origin and delivered to the freight terminal by truck. The shipment is accompanied by at least one copy of a bill of lading, which has been previously filled out. One copy of the bill of lading stays with the goods during shipment; a second copy is left at the remote freight terminal where it is scanned into the system by the image capture means. In practice, bills of lading are separated into batches at the freight terminal and scanned into the system at high speeds a batch at a time. For efficiency of handling the scanned images, it is preferable to group the bills of lading according to priority (e.g., overnight or next day) and by shipper, although this is not absolutely necessary. The paper bills of lading may then be filed away for permanent storage or other disposition, as they need not be used again throughout the shipping and billing cycle.

As the bills of lading are scanned, a key operator enters certain preliminary data into a header record, such as the shipment priority and/or document type (delivery receipts, or other documents as well as bills of lading may of course also be scanned into the system at the remote freight terminals). This information need be keyed only once for groups of like documents and re-keyed only when the priority or document type changes. A bill of lading may itself comprise several pages if it lists a large number of commodities in the associated shipment. In addition, the bill of lading may be accompanied by other documents, such as purchase orders or other shipper or consignee documents. At this time the operator may identify such documents which accompany any particular bill of lading and electronically "staple" (i.e., electronically associate) the multiple pages together. The association so formed between the bill of lading and attachments is maintained throughout the subsequent processing.

As an added quality control check, the scanned documents may be viewed on a display monitor at the scanning station as they are scanned into the system. In this way, scanner maladjustments or malfunctions and other problems, such as double feeds, may be detected immediately. As the documents are scanned at the remote stations, they are compressed and then stored in a local image file, which may be provided by a local magnetic storage device under control of the microcomputer. The stored documents are then queued for transmission to the central processing site. The documents are queued for transmission by priority, and within a priority queue they are organized on a first in, first out (FIFO) basis.

The central processing station will generally receive large numbers of images and associated header records with identifying information from the remote stations. The central processing site may also be provided with a local scanner, by which images may be entered into the system locally. Upon receipt at the central processing station, the images and header records are stored on magnetic disk associated with the image file server and an acknowledgement is returned to the remote station. The images are first archived onto optical disk storage before they are subjected to further processing. After an image has been written to the optical disk, an archive acknowledgement signal is returned to the particular remote scanning station from which the images came.

The document images are retained on the magnetic storage at the remote stations until the archive acknowledgement signal is received. This assures that after transmission to the central processing station, and during the active period of processing, the document images will always be retained in two separate stores—either the magnetic storage at the remote and central stations (prior to archiving) or the magnetic storage and optical storage at the central station (after archiving). If a remote station does not receive an archive acknowledgement signal within a predetermined period, the remote station will retransmit the images. The image file server at the central station maintains a workflow data base, which among other things includes state information for all documents for which processing has not been completed.

Once the document images are archived, they are ready for processing at the workstations. In the illustrated embodiment the documents are subjected to three categories of processing—indexing, commodity entry, and exception—and separate queues by priority are maintained for each category. The document images are first queued for indexing, then queued for commodity entry, and then queued for exception processing if necessary. However, the workflow for processing can involve fewer or greater processing categories depending upon user requirements.

In the indexing mode, a batch of the oldest, highest-priority images in the index state is presented to a workstation for processing. The operator has the ability to enter specific document criteria which will limit the selection of bills to retrieve. An example is the ability to enter the originating terminal as selection criteria for bill retrieval. An operator calls up the images of the documents one by one on the display monitor and, working from the display monitor, enters such transaction-related information as the PRO number, the shipper and consignee name and address, the party to be billed, any shipper bill of lading reference number, any shipper purchase order number, various standard code numbers such as the advanced standard carrier alpha code (SCAC), the beyond SCAC and the shipper request code, and the payment type (e.g., prepaid or on account). After review of the "entered" information on the display screen, the operator may commit the information to the data file maintained by the host computer. At the conclusion of this operation, the host computer returns an acknowledgment to the workstation that the information has been committed. The workstation forwards the acknowledgement to the image file server, which changes the state of the document in the work flow data base to "commodity."

After the document images are indexed, they are re-queued for commodity data entry. The document images are queued alphabetically by shipper name, by priority within each alphabetical queue, and on a FIFO basis within each priority queue. An operator at the workstation may work on the next available priority queue or may select a particular shipper. This is desirable so that the same operator will tend to process bills of lading from the same sets of shippers. The operator is also provided with other selection criteria for choosing the bills of lading to be processed, for example, scan date or scan location. As the document images are displayed on the monitor, the operator keys in the commodity information from the image. The commodity information is used by the host computer to create a delivery receipt, to assign price and to create an invoice for billing. After the information is keyed in, and the operator is satisfied that it is correct, it is committed to the data file maintained by the host computer. As in the indexing operation, the host computer returns an acknowledgement signal to the workstation and on to the image file server, and the document state is changed to "exception" in the work flow data base.

In the exception mode, the operator may review the information pertaining to the transaction entered into the host computer and the associated images to correct or reconcile any discrepancies. When exception processing is completed, the document state is set to "complete" in the work flow data base. At that stage the document is free to be deleted from the work flow data base and from the magnetic image cache storage.

Invoicing is performed by the host computer. Computer-assisted methods for rating freight shipments and preparing invoices are already known in the industry and will not be described here. The computer will generally have access to appropriate tariff information and will be able to assign the shipment price taking into consideration such factors as the quantity and nature of the commodity shipped and the distance shipped in accordance with applicable tariffs.

As explained above, it is common for shippers or consignees to require that the shipping invoice be accompanied by copies of various other documents, such as the bill of lading, purchase order, or signed delivery receipt. The host computer maintains in its data base an identification of the specific documents which individual shippers or consignees require to accompany the invoice. These documents are referred to generally herein as "attachment documents." During the invoicing process, the host computer downloads a list of attachment document identifications to the image file server for retrieval and printing. For each print request, the image is located in the work flow data base (or in the index for the optical disk storage, if the image has already been deleted from the work flow data base). The images are then printed in invoice order and are then merged with the invoices printed by the host. In this manner, the necessary information and copies of documents needed for invoicing are all made available through electronic means at the central processing station without having to wait for delivery of paper documents through the postal service or by other means. The result is that the invoices may be sent out all that much faster, reducing the float carried by the trucking company.

When document images are received by telefax, the workflow is somewhat different. The Local Area Network includes a fax station 29 comprising a microcomputer with a facsimile switch coupled to it. The facsimile switch comprises a number of facsimile boards, each for receiving a fax transmission. The transmissions are received at telephone line speeds, concentrated by a fax concentrator, and sent on to the central processing station.

Each group of images, which is faxed in one telephone session, is considered as one batch. The batch will generally consist of a cover sheet and remaining documents. A batch of this sort will sometimes be referred to as a FAX batch. As a FAX batch is received, it is collected in a buffer memory in the FAX concentrator. A FAX batch is transmitted to the image file server together with the fax sender's telefax number. As the FAX batch is received at the image file server, the documents are stored on mirrored magnetic disk, and a count is kept of the received documents. The image file server preliminarily identifies the shipper by the shipper's telefax number associated with the FAX batch. Upon receipt of a complete batch, the image file server examines a shipper-telephone table to determine whether the transmitting shipper would like an acknowledgement. The shipper-telephone table also includes the system shipper identification number. Each document of the FAX batch is permanently associated with the shipper ID from the table.

Once all the documents in the FAX batch have been properly indexed with the shipper ID, the batch is placed in a "ready for initial sort" state. If the table indicates that an acknowledgement is required, the FAX batch is also queued for acknowledgement processing.

The acknowledgement may be provided by transmitting a "stamped" copy of the cover sheet which may also be accompanied by the entire group of documents which the system received with the cover sheet. The "stamp" is, of course, provided electronically.

The initial sort operation is performed by an operator at a workstation. In this operation, the cover sheet may be discarded; non-billable documents are routed to printing for later manual routing; junk telefaxes are discarded; related documents, such as multi-page bills of lading or attachment documents, are "stapled" together; and tracing information may be associated with the bill of lading at this time. For example, in the railroad industry, the railroad car ID may be associated with the bill of lading. In some instances the railroad car identification will be found in the host computer, and the operator's workstation may be made to communicate directly with the host computer through trigger strings in the manner described in more detail below for the system of FIG. 1. Once the FAX batch is properly received, acknowledged, and preliminarily indexed in the image file server, the document images may be processed the same as the other document images in the system.

Having now presented an overview of the system, the individual components of the illustrated embodiment will now be described in greater detail.

Image File Server

The central image management is provided by the image file server, which is implemented on a TXP multiprocessor computer system available from Tandem Computers, Inc. Central image management could also be implemented on other Tandem processors or on computers manufactured by other companies, just so long as the computer selected has sufficient instruction speed, I/0 capability, disk capacity, and main memory to handle the volume of images and index data generated in the contemplated application.

The file server databases and specific processes run by the image file server will now be described.

File Server Databases

The image file server maintains four databases. The first database, referred to as the file index database, is used for space management of the magnetic disks where the images are stored. The second database is referred to as the optical catalogue; it keeps track of optical disk volumes that have been used on the system. The other two databases are used in document processing. They are the optical disk index and the work flow database.

Images are cached by the image file server in large unstructured files. There is one file per magnetic disk volume. These large files are subdivided into smaller slots with enough space to hold a certain number (N) of average-sized images. For the illustrated system the average slot capacity is 20 images. The image file server runs a number of receive processes for the various communications lines to the remote stations. Each receive process is dynamically assigned a slot in one of the large files into which it sequentially writes the received images. Each image may then be accessed by its file name, slot number within the file, and relative byte address within the slot.

The images are retrieved according to a key-indexed access method. The file index database contains a record entry for each of the slots within the file, which have been established to hold images. Each record contains overall status information about the slot.

The record may include an alternate key indicating the slot status so that when a receive process receives a transmission of images from a remote station, it can retrieve slots then available for writing images. Status is included to allow for multiple purge processes. The records in the file index database include the following fields: File-ID is a standard file name (volume, subvolume, file) assigned by the TXP file server computer. Slot-number is the relative position of the slot for N images within the file. Each slot takes up the same number of bytes (N times 60K) so that the relative byte address of the slot within the file can be found by multiplying the slot number times N times 60K. Status describes the current state of the slot. Values are assigned to indicate slot free, slot assigned, slot ready to be archived, slot archived. Number-of-images indicates the number of images presently contained in the slot. This number will be incremented each time a receive process adds an image to the slot and will be decremented each time the purge process removes an image.

An average slot capacity of 20 average images at 60 Kilabytes per image yields a slot size of 1.2 megabytes. Given 412 megabytes per volume in the illustrated system (4 extents of 103 megabytes each), there are 343 slots per volume. With 8 volumes the file index database will have 2744 entries (one per slot).

The optical catalogue maintains a record of the optical volumes (there are two volumes per optical platter) known to the system. This is a relatively small database; no alternative keys generally need be defined.

The records in the optical catalogue include the following fields: Optical-volume is the volume name of the optical disk. Directory-SW indicates that a directory of images has been written onto the volume. Data-type specifies either "image" or "data". Start-date provides a time stamp for the start of the disk contents. End-date provides a time stamp for the end of the disk contents.

At 55,000 images per day, 2.5385 volumes per day are filled. This will generate about 700 volumes per year.

The system includes two document tables: the optical disk index, which is a permanent record of the location of an image, and the work flow database, which is a transient database containing one record per image until the image has gone through a complete processing cycle.

The records in the optical disk index include the following fields: Optical-volume names the optical disk volume in which the image resides. Optical-subvolume names the subvolume on the optical disk. Optical-file names the file on the optical disk in which the image resides. Optical-RBA specifies the relative byte address of the image within the optical file. Host-primary-key is the document primary key assigned by the host computer. For bills of lading this will generally be a nine digit PRO number assigned at the time of the shipment with a tenth digit as a check digit. The PRO number is used to track the shipment and each of the associated documents through the system. The host primary key may also include a four-digit company number, a two-digit year field, and a two-digit document type. Document-type specifies the type of document scanned. These will generally be bills of lading or delivery receipts. Sequence-number, is the sequence number of the image within the document. Year-month specifies the year and month that the PRO number was archived. Image-size specifies the size of an image in bytes.

This database will generally require about 1.2 million records for a month's worth of images, and it will generally be desirable to keep several month's images on-line at a time.

The workflow database keeps track of the image workflow in the image file server. Record entries in the work flow database include the following fields: Scan-time-stamp specifies the time at which the document was scanned. Scan-location specifies the remote site station at which the document was scanned. Sequence-number is the sequence number of the image within the document, which may consist of multiple pages. Optical-volume, optical-subvol, optical-file, optical-RBA, file-ID, slot-number, Host-primary-key, document-type, document-size, and owner are defined as above. Slot-RBA specifies the relative byte address of a specific image within the image slot. Priority specifies the shipment priority. Number-of-images specifies the number of images comprising a document. Host-sec-key contains the code for the customer to be billed, which is a useful key for retrieving images in commodity data entry and exception processing. ISN number is the key of the record maintained for this image on the host computer database. Document-state is a two-bit field containing status information. State values are defined to indicate: ready to be indexed, ready for commodity processing, ready for exception processing, being indexed, in commodity processing, in exception processing, being printed, being purged, delivery receipt ready for recognition, unrecognized delivery receipt, unknown document, and processing complete.

A workflow database record is maintained for each image while the image is still in the processing cycle. Assuming a day's worth of images constitutes 55,000 records, the workflow database carries at least two day's worth of records, or 110,000 records.

FIG. 4 shows the relationship among the four database indexes maintained by the image file server: the file index database 41, the workflow database 42, the optical disk index 43, and the optical catalogue 44. The arrows 45 show the cross indexing from one index to another.

The various functions performed by the image file server and interactions with the above databases are described below. The specific implementation of these processes will depend on the particular computer and operating system employed. Given the benefit of the descriptions provided herein, their implementation is within the routine skill of those experienced with the TXP system and GUARDIAN 90 operating system. As used herein, a program refers to a static group of instruction codes and initialized data residing in a file. A process, on the other hand, refers to a dynamically running program executing under the control of the operating system. A program can be run concurrently on one or more CPUs, with each execution constituting a different process. Each function described is a logical collection of one or more processes, where, as described earlier, a process is an executing instance of a static program.

Receive

A receive function is associated with each of the communications lines to the remote stations. The receive function reads the incoming images from the X.25 Access protocol in 4K blocks, and writes each 4K block to magnetic disk. When an individual receive function comes up, it does a TMF "BEGIN TRANSACTION" and reads the File Index Database to find a slot with a status indicating "empty." The receive function updates that slot with a status indicating "ready for archiving." When a slot is filled with images, or when a predetermined timeout period has elapsed, a notification is written to a "ready for archiving" queue, and a TMF "END TRANSACTION" is done.

Archive

Document images are archived on optical storage as permanent records. When a slot in a magnetic disk file has been filled by the receive function, the receive function writes a notification to the "ready for archiving" queue with the name of the slot ready for archiving.

The archive function writes the images to the optical disk on a slot-by-slot basis. The archive function does a TMF "BEGIN TRANSACTION," dequeues a "ready for archiving" notification, and creates a file on an optical disk large enough to hold the entire slot of images. As the function copies the images in the slot to the optical disk, it accumulates information in memory about each image. After the entire slot is written to optical disk, the function inserts a record for each image into the workflow database containing the optical and magnetic disk locations, data extracted from the image header (e.g., image ID, document type) and a status of "ready for indexing." The function then reads the file index database, and updates it with a status of "archived." The function then queues a "ready for acknowledge" notification to the acknowledgement queue that contains the identification of the slot. Finally the function does a TMF "END TRANSACTION."

Acknowledge

The acknowledge function sends an acknowledgement back to the remote scanning workstation that an image has been archived to optical disk. One acknowledgement is sent for each slot and contains the IDs of each individual image in the slot. There is one acknowledge function for each remote station. The acknowledge function does a TMF "BEGIN TRANSACTION" and dequeues a "ready for acknowledge" notification, with the slot ID containing the images to acknowledge. The function then builds an acknowledgement message containing the IDs of each image in the slot. After the message is built, it is sent to the remote station using the X.25 protocol. Once the message has been sent the acknowledge function does a TMF "END TRANSACTION."

Print Manager

A list of documents to be printed is sent from the host computer to the image file server system. These documents may be printed at the local print workstations, e.g., for daily invoice attachments, or at the remote scanning stations, e.g., for customer service requests. The print manager is the process that communicates with the host computer over the remote job entry connection and receives the file of documents to be printed. The process then determines where the printing is to take place and dispatches the list of documents to be printed to the appropriate print process. Where there is more than one local print station, the print manager balances the print load among all the processes and maintains the proper sequence of the documents. There is one print manager per system, which wakes up when a message is received indicating a print request is pending.

Print

The print process is the module which controls the printing of documents. Documents to be printed are identified by their reference number (host primary key) and document type. The print function reads the workflow database for the desired records. If an image record is still on this database, the function updates the print status of the record with a status of "being printed." The record is committed immediately. If the image to be printed is not in the workflow database, the archive database is read. If the record is found there, the image is moved from optical disk to magnetic disk, and the workflow database is updated to reflect that the image is now on magnetic disk. Once all images in the list have been moved to magnetic disk, the print function retrieves each image from the magnetic disk file and sends it to a local print station designated by the print manager process. Once the image has been printed, the record is read and updated with the status "print complete." After the images are printed, a "purge restored" notification is sent to the purge function to purge the images that have been restored from optical disk.

Remote Print

The remote print process functions similarly to the print process except that the retrieved images are routed to the designated X.25 communication system services for transmission to the associated remote station for printing.

Remote Commands

A capability is provided to examine and manipulate workstations from terminals connected to the image file server. These commands allow an operator using the image file server to check the status of processes running on the workstations, restart processes, issue operating system level commands (i.e. DOS/XENIX commands), and download files (object and data). For remote scanning workstations, a special circuit on the X.2S line, #diag, is used for communicating between the workstation and the image file server. For the LAN connected workstations, each workstation adds a special name to the LAN, diag nnnnnn, (where "nnnnnn" is the workstation id) which the remote command function can "CALL" when communication with that workstation is desired.

Purge

Documents are typically retained on magnetic disk for only one day. As documents complete the work in process function they must be removed from magnetic disk, to make room for the next days processing workload.

There are three purge functions that can be utilized either individually or simultaneously. They are "Purge By Request," "Purge Continuous," and "Purge Restored." Each function finds images to purge in a different manner, but the purging of a selected image is always performed in the same manner.

Once an document has been selected to purge, a TMF "BEGIN TRANSACTION" is done. The corresponding records are removed from the workflow database. The image count in the slot where the image resides is decremented. If the image count for the slot is reduced to zero, the slot status is set to "empty" If the image count is greater than zero, the status is left alone. If the "purge continuous" function is being executed, records are inserted into the Archive database. A TMF "END TRANSACTION" is done.

The following describes how each of the three purge functions selects document images to purge.

Purge Continuous

The "purge continuous" function runs continuously. It continuously reads through the workflow database sequentially, looking for documents that have a work in process status of "complete." Once it reaches the end of the work in process database, it begins reading again at the beginning of the database. This function also inserts records in the Archive database as they are removed from the Work in Process database.

Purge By Request

A list of documents to be purged can be sent from the host to the image file server. Documents to be purged are identified by their reference number (host primary key) and document type. The purge by request function reads this list, and purges the documents on the list, regardless of their work in process status or print status.

Purge Restored

After the print function has completed, a notification is sent by the print function to the purge function. The purge restored function reads through the workflow database, purging only those documents that have been restored from optical disk for the purpose of printing them.

Work In Process Fetch

All the Work in Process applications on the workstations must "fetch" document images from the image file server. The Dual Page workstations and the image file server communicate over a Local Area Network (LAN). The LAN interface that is used is the NETBIOS standard, and thus either a Token Ring or an Ethernet LAN can be used. The image file server and the workstation applications communicate in a requestor/server relationship, where the workstation applications are the requestors, and the image file server fetch function is the server.

Images are fetched out the workstations in "batches." A batch can be any number of images, from one to "n." The workstation determines how large the batch is and passes this number to the fetch function as part of the fetch request. The fetch request also contains selection criteria that determine which images are to be fetched. The selection criteria include the document type, the document work in process status, scanning location, scan batch id, etc.

There are multiple copies of the fetch function running on the image file server. Connections between the workstation applications and the fetch functions are dynamic. That is, a particular workstation may be connected to one copy of the fetch function for one batch, and may be connected to another copy of the fetch function for a subsequent batch.

The fetch function first adds a standard "fetch" group name to the LAN. It then posts a "LISTEN ANY" on the LAN. When a workstation application needs to fetch images, it "CALL"s the fetch group name, and a "fetch request" session is established between a fetch function on the image file server and the workstation application. This session is used strictly for the fetch function and the workstation application to communicate the request and the status of the request (i.e. executed successfully, or execution failed).

The fetch function then posts a "RECEIVE" to receive a fetch request from the workstation application. Once a fetch request has been received, the fetch function begins to send available images to the workstation application. An available image is an unclaimed image in the database that matches the selection criteria of the request. The request also contains the "transfer" name that the workstation application has added to the LAN to establish a "fetch transfer" session over which the images are actually transferred.

The fetch function next establishes a "transfer" session with the workstation application by first adding another name to the LAN, and "CALL"ing the "transfer" name the workstation has added.

Once the "transfer session" is established, the fetch function does a TMF "BEGIN TRANSACTION." It then reads the workflow database to find the first available image to transfer. Once an image is found, the fetch function first updates the image record by writing the workstation id in the record to "claim" the image. Then the fetch function reads the image and transfers it to the workstation application through a succession of LAN "SEND"s. Multiple "SEND"s are usually required, since the size of the images is usually larger than the largest "SEND" block that the LAN will support. After the image transfer is complete, the fetch function posts a "RECEIVE" on the "transfer session" expecting a "transfer acknowledgement" from the workstation application. If the "transfer acknowledgement" is bad, a TMF "ABORT TRANSACTION" is done, and no attempt is made to transfer more images for this batch. If the "transfer acknowledgement" is good, the fetch function does a TMF "END TRANSACTION," and continues to find and send more images, bracketing each image with a TMF "BEGIN TRANSACTION" and "END TRANSACTION" until the count of images transferred equals the number in the request, or no more images are available.

Once all the requested images have been transferred, or a transfer has failed, the fetch function ends the "transfer session" by performing a "HANG UP," and then "DELETE"ing the LAN name it added. Once the "transfer session" is complete, the fetch function then sends a "request acknowledgement" to the workstation application via the "request session." If all the images were transferred successfully, a good reply is sent, otherwise a bad reply is sent. Once the reply has been sent, the fetch function does a "HANG UP," closing the "request session" and posts another "LISTEN ANY."

Work In Process Update

All the Work in Process applications on the workstations must "update" document images from the image file server. The image processing workstations 18 and the image file server communicate over a Local Area Network (LAN). The LAN interface used is the NETBIOS standard, and thus either a Token Ring or an Ethernet LAN can be used. The image file server and the workstation applications communicate in a requestor/server relationship, where the workstation applications are the requestors, and the image file server update function is the server.

Images are updated by the workstations in "batches" A batch can be any number of images, from one to "n." The workstation determines how large the batch is and passes this number to the update function as part of the update request. The update request contains a batch of image id's and the new data for each image id that must be applied to the workflow database. This data includes new work in process status (i.e., next workflow status, delete the image, complete, etc.), and other information such as shipper id, consignee code, PRO number, etc.

There are multiple copies of the update function running on the image file server. Connections between the workstation applications and the update functions are dynamic. That is, a particular workstation may be connected to one copy of the update function for one batch, and may be connected to another copy of the update function for a subsequent batch.

The update function first adds a standard "update" group name to the LAN. It then posts a "LISTEN ANY" on the LAN. When a workstation application needs to update images, it "CALL"s the update group name, and an "update request" session is established between an update function on the image file server and the workstation application. This session is used strictly for the update function and the workstation application to communicate the request and the status of the request (i.e., executed successfully, or execution failed).

The update function then posts a "RECEIVE" to receive an update request from the workstation application. Once an update request has been received, the update function does a TMF "BEGIN TRANSACTION" and then updates each image id in the request with the update data contained in the update request. If an update of any image in the batch fails, the update function discontinues updating of subsequent images in the batch and does a TMF "ABORT TRANSACTION" If all images are successfully updated, the update function does a TMF "END TRANSACTION" If all the images were successfully updated, the update function "SEND"s a good reply back to the workstation application, otherwise, it "SEND"s a bad reply back to the workstation noting the id of the image that had the failed update. After the reply (good or bad) has been sent, the update function does a "HANG UP," ending the session.

Communications Links

The interfaces among the image file server, remote stations, and image processing workstations will now be described.

Remote Station-Image File Server

The X.25 link between the image file server and a remote scanning station supports multiple virtual circuits, each of which constitutes an independent session between an application process in the remote station and a corresponding process in the file server. For each link, four corresponding sessions are defined as follows:

| Remote Station | Image File Server |
|---|---|
| Transmit Process | Receive Process |
| Print Process | Remote Print Process |
| Statistics Process | Statistics Process |
| Command Response Process | Remote Commands Process |

These sessions connect processes that are functionally different and independent, and as a result, a variety of messages are transported over each link. These messages include the transmission of images for archiving and for printing, reporting performance statistics collected at the remote stations, status reports, and event logs from the remote stations, acknowledgements (ACKs) for documents received, and commands issued to the remote stations from the central site.

All messages comprise header, length, message type, message data, and checkword portions. The message header comprises a flag indicating the beginning of a message. The following message types are defined: image data for archive; image data for print; ACK for image data; report statistics, status, and events; and request statistics and status. The data field contents depend on the type of message being exchanged. For image data, this field contains image scan time, scan location, document type, document priority, size of image, number of images in document, compression format, and the image itself. If the message type is an ACK, the data field will contain the list of images received correctly, identified by the document ID of scan time plus scan location. If the message type is the report or request of statistics/status/events, the data field will contain the information requested or reported. The checkword is included as an additional check for data integrity.

The remote station-file server communications use the standard protocols defined by the X.25 access method. One of those is a process-to-process protocol, which allows communication between two "host" systems and is the protocol relied on by the file server process and the remote station processes.

The virtual circuit established between the processes is set up as a permanent virtual circuit (PVC). For a PVC, there is no need for a call request sequence. The connection is always present. If there is an outage, the PVC is re-established as soon as a connection is possible.

Above the transport level, the processes that are in session with each other observe a simple "message exchange" protocol. The message header notifies the receiving process of the beginning of a new message. The receiving process assembles the entire message from the length field and checks for data integrity by comparing the checkword. If there is an error in the checkword, the entire message is ignored and recovery is initiated according to message type.

In the transmission of image data, the following protocol is observed. The transmitting process sends a message which includes the image data. The receiving process checks the integrity of the message and starts the next processing step of the message, archiving to optical disk in one case, and writing to a disk file for printing in the other. When the processing that follows is complete, an ACK message is sent back to the transmitting process. If an ACK message is not received at the transmitting process within a predetermined timeout period, the image data is re-transmitted.

No ACKs are exchanged in the other message types. The messages that invoke a response, such as request for status, are sent by the transmitting process, and if a response is not received within a pre-determined timeout period, the request is merely sent again. Messages sent periodically, such as statistics and event reports, are lost if an error occurs in the transmission of the message, but will be received in the next period.

Image Processing Workstation-Image File Server

The image processing workstations and the image file server system communicate over a local area network by establishing sessions between each workstation and the appropriate workflow process in the image file server.

The Tandem TXP computer system, on which the file server is implemented, is equipped with a Tandem MULTILAN network, which allows multiple microcomputer local area networks to interconnect to the file server system. The file server includes a dual-ported controller which communicates with the workstation microcomputers over a ten-megabit-per-second link.

The MULTILAN software provides the necessary support for distributed applications, as well as terminal-based or microcomputer-based applications. The illustrated embodiment uses distributed applications. Application programs reside both on the file server and on the image processing workstations. The workflow process in the Tandem TXP system uses the MULTILAN process-to-process interface, and the workstations are equipped with the compatible NETBIOS interface so as to provide a common protocol for LAN communication by which the file server and workstations initiate sessions, send and receive data, and terminate the sessions. The NETBIOS interface is implemented by means of a standardized data structure referred to generally as a network control block (NCB), which contains the information needed for communications: e.g., command codes, network code names, and return codes.

Beyond the NETBIOS application interface, the workflow process and the workstation application that are in session with each other obey a further set of conventions. Before any messages can be exchanged, the two sides first have to establish the session. After a session is set up, messages are passed, with the message header indicating the beginning of a new message. The receiving process is used to determine the integrity of the message received. If any errors are encountered, the entire message is ignored, and recovery is initiated according to the message type sent.

All messages have the same format as the remote station messages. The message types include: image data for display (at the image processing workstation); image data for print (at the local print station; image data for archive (from the local scan station); ACK for image data received; ACK for image processed (commit from mainframe); report statistics, status and events; request statistics and status.

If the message type is image data (for display, print, or archive), an ACK for that image is expected at the transmitting process within a pre-determined timeout period. If an ACK message for that image is not received, then the image is retransmitted. The ACK message is returned only after the receiving process has completed the required processing on the image. The same general procedure is followed for file server communications with the remote stations or with the host computer. If the image is received from a remote station for archiving, the ACK is returned after the successful write to optical storage. If the image is for print, the ACK is returned after the image has been successfully written to the local print station's disk.

It is for the transmitting process which sends messages that require a response, to retransmit that request if some response has not been received within a certain period. Other messages such as statistics or event reports are lost if an error occurs in the relaying of the message. However, these are messages sent periodically and will be received in subsequent transmission.

Image Processing Workstation

As indicated above, the image processing workstation comprises an IBM AT microcomputer 36 with a 40-megabyte hard disk and two megabytes of internal memory. The workstation also includes a 1.2-megabyte floppy disk drive. To enhance the workstation operational throughput and minimize operator wait time, the workstation is provided with a multi-tasking environment. This is achieved by supplementing the MS-DOS operating system with DESQview control software, available from Quarterdeck Software. For implementing the LAN communications with the TXP file server system, the microcomputer is equipped with a LAN access card 42, for example an Ethernet interface card, which includes the NETBIOS network interface standard. Images are sent to the workstations in compressed format (using the CCITT Group 3, two-dimensional standard). The microcomputer is equipped with decompression means 43 for use in expanding the images for display. Decompression printed circuit boards for general use with personal computers are commercially available, such as the Kofax KF-8200 compression/decompression board or the Kofax CEP option for the KF-8400 Document Display board available from Kofax Image Products. Given the descriptions provided herein, those skilled in the art can readily apply these commercially available compression/decompression products for the purposes of the present invention.

To emulate the IBM 3278 host computer, the workstation microcomputer includes an IRMA board available from Digital Communication Associates of Atlanta, GA, which provides a synchronous connection to the IBM 3274 cluster controller. The IRMA board directly supports the terminal protocol and provides a host computer applications screen image within the local board memory at the workstation. The board is supported by the E78 emulation software provided by Digital Communication Associates, which has been adapted to run as a subroutine.

The workstation includes a display monitor 37 which is configured to provide rapid access to the display memory and to provide good resolution. In the illustrated embodiment, the IBM AT microcomputer is provided with a display adapter card which utilizes the 16-bit I/O bus facilitating rapid access to the buffer memory. The system had a resolution of 1664 dots by 1200 lines, with four levels of grey scale, i.e., approximately two million pixels. Thus, with a nineteen-inch display monitor, the resolution is approximately 110 dots per inch. The microcomputer includes a display controller 44, such as provided by the Kofax KF-8400 document display adaptor card. That card supports two windows on the display monitor. This first is the image window for the images from the file server; the second is a window such as a Hercules emulation window for displaying applications screens from the IBM host.

The image processing workstation performs five processes: the keyboard controller process, which intercepts keystrokes and directs them to the relevant process; the 3270 controller process, which handles the interface with the IRMA board and the host computer; the file server communications process, which handles communication with the image file server via the LAN; the image controller process, which handles the flow and display of images at the workstation; and the image handler process, which receives designated image handling keystrokes and responds to them.

The keyboard controller receives all keystrokes entered by the user. These keystrokes are compared with a table for disposition. Image handling keystrokes are passed on to the image handling process and all other keystrokes are passed on to the 3270 controller process.

The 3270 controller process receives keystrokes passed on by the keyboard controller and forwards them on to the host terminal emulator. Standard host computer application screens are passed down to the workstation using the IRMA board. These screens contain special trigger fields recognizable by the image processing workstation. The trigger fields are prefaced by pre-determined characters, such as $$ and a designated trigger name: for example "$$INDX". The characters and designated name are followed by specific information pertinent to the transaction.

As a screen is received from the host computer, the 3270 controller process searches for the trigger field and interprets it, using the information to communicate with the image controller or the image handler, as appropriate. When the 3270 controller process intercepts a trigger which indicates a state change to a new function, the controller sends an initial request for N images having the given state to the image controller. The image controller requests and receives the images, displaying the first one as it comes and buffering the rest. As the 3270 controller process intercepts a "view new document" flag from the host screen, it sends a request to view document to the image controller which displays the initial image. As the 3270 controller process intercepts a "commit" trigger, it passes the commit information to the image controller, which releases the image and relays the "commit" to the file server process. After an image is indexed, all subsequent operations are performed from images maintained on a queue found on the file server. As the images are retrieved and made available, information such as the primary key and the system ISN (the F-BOL-BASE access key) is passed to the host computer via designated fields on the applications screens.

The image controller runs in background and serves as the traffic director for images. The image controller receives a signal from the 3270 controller process indicating a request for images. The request is passed on to the file server communications process, which receives the images and passes the relevant information such as document ID (in all instances), primary key (when available), system ISN (when available), and number of attachments per document to the image controller.

As the initial document is received, the image controller reads the image into an initial buffer, holding about 20 images in compressed format. The process then decompresses the first image and reads the expanded image into one of three image buffers. Subsequently, the image controller receives documents in background, stores them in the initial buffer, and decompresses them asynchronously into the three image buffers. The expanded images are drawn from these buffers for display. After the initial four (buffered) documents are received, subsequent documents are written to the PC's magnetic disk to be available for immediate reading into the initial buffer prior to expansion. In order to support scrolling amongst an initial document with more than two attachments, the initially received documents may also need to be written to magnetic disk.

The image controller displays documents as requests to view documents are received. At each initial request to view the first image of a document, relevant information from the image file server (the primary key and the system ISN) is passed along to the 3270 controller process for insertion into the workstation's data-entry screens. The displayed images are scaled so as to fit on one-half of the display screen, the other half being reserved for applications screens from the host computer applications programs.

The image handling process receives keystrokes passed on by the keyboard controller. As the keystrokes are received, this process performs the requested operation. The logical image unit of work at a workstation is referred to as a "document" and is defined to consist of an image and all of its attachment images. Function keys on the workstation microcomputer are provided for scrolling back and forth amongst the images of a document. The workstation may also be beneficially provided with the capacity to expand a designated portion of an image for clearer viewing, for example, by using a mouse.

The file server communications process handles the interface to the ethernet local area network for both image traffic and other information passing to and from the file server system. Request to retrieve documents from the image file server are initially received from the image controller and, as the documents are received, the relevant information is passed back to the image controller through the communications process.

The generalized data flow within the workstation is based on state change information. The state change information is provided by characteristic trigger strings, which are strings embedded in the host computer applications screens and prefaced with predetermined indicia, such as the characters $$.

The trigger strings, typically inserted on the second line of the host computer applications screen, have the following format:

$$XXXXAKKKKKKKKSSPPPPPPPPPPPPPPS-
SSSSSSSSSSPPVP$ where the separate elements of the string have the following significance:

| | |
|---|---|
| $$ | Begin delimiter (2 characters) |
| XXXX | State information ("trigger") (4 characters) |
| A | Display next document: N = no, Y = yes (1 character) |
| KKKKKKKK | System ISN (8 characters) |
| SS | Status bytes (2 characters) |
| PPPPPPPPPPPPPP | Primary key (14 characters) |
| SSSSSSSSSSS | Secondary key (11 characters) |
| PP | Priority (2 characters): 01 = top priority 02 = overnight 03 = next day |
| V | Visible bit: N - no, Y - yes (1 character) |
| P | Print flag: N - no, Y - yes (1 character) |
| $ | End of string delimiter (1 character) |

The 3270 controller process extracts this string and looks for state changes as indicated by a change in the XXXX value. If the string includes a "Y" in the "display next document" field, the 3270 controller process displays the first image in the next available document. The visible bit tells it whether or nót to display the applications screen. Where applicable, the 3270 controller process fills in selected information on the application screens, for instances, the primary key and the system ISN on the commodity and exception screens.

The workstation responds to two major state changes: $$MENU, which is the trigger field in the host computer main menu, and $$XXXX, where XXXX indicates a host computer application. In response to the $$MENU trigger, the workstation clears its image buffers and erases any remaining images from magnetic storage. The workstation also sends a signal to the image file server so that the file server will be prepared to make the previously buffered image available for processing at another workstation.

The XXXX field comprises four characters indicating a specific application, for example, INDX, for indexing, COMM, for commodity pricing, and EXCP, for exception processing. When the state changes to XXXX, the workstation initiates image processing by sending a message to the file server indicating that N images should be delivered to the workstation for the "XXXX" application. When the first image is received, it is displayed immediately, so that the user may begin processing. When the processing on the displayed image is complete, the transaction is committed to the host computer's database(s). Another $$XXXX screen is sent by the host to request the next document for processing. This screen also indicates to the workstation that the previous document processed has been committed and that the image can be released. The workstation informs the file server to release the image and passes on the status value in the SS field, which is used for work queue management. In some cases (e.g., indexing), the commit of the host computer transaction may also cause information to be updated in the file server.

On completion of the indexing transaction ($$INDX), the workstation passes the newly entered primary key (in the case of bills of lading, this is the company number, 4 characters, and the PRO number, 10 characters) to the file server. It also passes on a secondary key or billing ID of the form AAANNNNNBBB, where AAA is the first three characters of the name of the company being billed, NNNNN is the first five digits of the zip code, and BBB represents suffix codes. The billing ID is used for building commodity queues. The workstation also passes on the system ISN, which is a host database access key for the skeleton freight bill formed at the conclusion of the indexing transaction.

When the workstation microcomputer is powered up, the processes are initialized. A message is sent to the image file server, which performs the initialization and sets up the workstation as on-line. In the event that such communication cannot be initiated, a status message is displayed. After the 3270 emulator is initialized, any problems in communicating with the host computer may be displayed at the bottom of the screen.

At this stage, the keyboard controller is ready to begin intercepting keystrokes and the 3270 controller process is ready to handle the terminal emulation.

The initial work flow is the same for all transactions. After the user logs onto the system and the desired user application, the application begins by sending the $$MENU screen. The activating string is $$MENUN$. $$MENU is the menu trigger, and N indicates that the next document is not to be displayed. No other fields are required, and the string is terminated with the $ delimiter. The visible bit has a default value of Y, and thus the screen is made visible to the operator. All image buffers are flushed. Any remaining images on the magnetic disk are erased. The image file server is notified to prepare for processing.

After the user selects the indexing option from the main menu, the following indexing-specific data flow takes place. The workstation receives the indexing screen, which includes the initial trigger string: $$INDXY$. The workstation alerts the image file server to send N images from the index queue, and the indexing screen is made visible to the operator.

The operator works through the various screens of the indexing application using the host computer application via the 3270 emulator. The keyboard controller sorts the keystrokes, passing the applications keystrokes on to the host computer and the image-manipulating keystrokes on to the image handling process. The initial characters of the trigger string for the screens, which are passed down at this stage, are $$INDXN$, where N indicates that no new document is to be displayed.

At commit time the host computer sends a commit screen for the workstation as follows:

```
SSINDX-
    YKKKKKKKK02PPPPPPPPPPPPPPSSSSSS-
    SSSSSPP$
```

All fields are to be filled in. This string is then passed directly on to the image file server along with the document ID for each of the images making up the document. The status (SS) is set to 02 to indicate that the document will be routed to commodity processing. The status is free to be changed at this time if it is not desired to send the document to commodity processing next.

Upon receiving the $$INDXY screen, the workstation selects and displays the first image for the next document and continues to filter keystrokes until the next $$INDXY is received. This processing continues until a $$MENU state is received.

After the user selects the commodity input option from the main menu, the following commodity input-specific data flow takes place. The initial commodity input screen contains the initial characters $$COMMY$. At this point the workstation runs a separate application which requests the user to enter the shipper ID which the operator wishes to process. The workstation alerts the image file server to begin sending over the N images from the commodity input queue for the selected shipper ID. The commodity input screen is made visible to the operator. Upon receiving the initial string, the workstation waits until it has received the first image and modifies the string to:

```
SSCOMMNKKKKKKKK-
    PPPPPPPPPPPPPPPSSSSSSSSSSSSPP$
```

The N after the $$COMM indicates that no new image should be displayed. The workstation fills in the primary key and the system ISN for the host's accesses. Since the status field is only updated by the host computer, it is left blank. The string is then sent back to the host computer. As in indexing, the operator works through the various screens of the commodity input application using the host application via the 3270 emulator.

At commit time the host computer sends down a commit screen as in the case of indexing, and the commodity processing proceeds analogously to indexing.

The exception-specific data flow begins with the initial trigger field $$EXCPY$ and proceeds analogously to the indexing and commodity data flows. At commit time, the document status is updated to "processing complete."

Remote Scanning Station

As indicated above, the remote scanning station is provided with an IBM AT class microcomputer, which is configured with the Xenix operating system. This system provides a standard multi-tasking environment on microcomputers, such as the IBM AT, equipped with the Intel 80286 and 80386 microprocessors and permits utilization of the full memory capacity of the microprocessor. The multi-tasking, large-memory environment permits simultaneous operation of the scanner, display, and communication functions of the remote station. Programming the microcomputer within the Xenix operating system to perform the various control functions called for by the invention for a particular remote-station configuration is routine and need not be described in any detail here. Maintenance of the various queues and various disk-based data base structures may be provided by commercially available software products, for example, by the C-ISAM data base product available from INFORMIX. The C-ISAM data base product is desirable in that it provides for transaction recovery after a machine fault, such as a hardware fault or power fault, thereby maintaining the integrity of the data base, although other database management products are available, which also have this feature.

The remote station microcomputer contains four major processes, which run independently. A scanner process controls scanner operation and interface of the operator to the scanner. A communications process controls the transmission of images to the central site and the reception of images back for printing. A print process prints images that have been received from the central site. A statistics process maintains statistics on the performance of the system and provides the administrative and operational functions.

Upon powerup, the communications and print processes are launched. The communications process will periodically check the transmission queue to see if there are documents queued for transmission. It will also be woken up when there is a document to receive. The print process will periodically poll the print queue for images to print.

The scanner program comes up when the user logs on. The user is presented with a screen and may begin scan operations. Documents are scanned in on a document by document basis. As soon as a document is scanned, compressed, and written to disk, it is placed in the transmission queue.

All operator interaction is through the keyboard or auxiliary keypad. Once an operator has logged on, he or she will only be allowed to perform the functions available through the keyboard or keypad.

The scanner is immediately initiated when an operator logs on. The operator interface is kept as simple as possible: whenever possible, functions are implemented with one key stroke. Upon logging on to the computer the operator will be presented with the initial screen which includes a listing of the default priorities for scanning, for example, "bill of lading" for document type and "overnight" for priority. Prior to scanning, the operator may change either of these defaults. These defaults can also be set (or changed) via the configuration file at system startup.

Scanning operations are initiated by hitting a start scan key. The documents will be written to the image file as they are scanned and compressed. The user scans in documents until the stop scan key is pressed or until one minute has elapsed between documents (automatic time-out). The user may view documents at the rate of 1 out of N by pressing a designated key and a numerical key: default is to view all documents (N=1). During scanning the user may designate that a document is an attachment to the previous document by pressing another function key prior to the scan. If a document does not scan in correctly, the user may use the cancel key whereby the image will not be stored in the disk file nor transmitted.

Upon completing a scan of a series of images, number of images scanned, number of cancels, and time are written to the operations database. Scanned documents are compressed in the KF-8200 compressor/decompressor board and written to disk using raw disk input/output calls: the Xenix file system is bypassed for image storage to increase the speed of the system. Images which cannot be compressed successfully, or which compress to larger than the original image, are stored in uncompressed format and an indication of this is written in the image file.

The image unit of work in this system is a document and its attachments. As an individual document and its attachment(s) are scanned in, a record of it/them is inserted into the image file. At the same time the disk database are updated with number of free blocks and the address of the next available block. The calls to these two databases are bracketed with begin and end transaction to ensure database consistency.

Prior to scanning, the user may request to view the last document scanned and may then scroll through the existing images using next and prior keys. While viewing the images, the user may request a print of the image on the screen. In this case, the compressed image is written to a disk file and an entry is placed in the print queue. The file name is based on a combination of a unique process code and a value obtained, for example, from the time function in order to ensure uniqueness. The user may also view images queued for printing in a similar function using a second function key.

The last operator-initiated function is logging off. When the operator designates this key, he or she will be requested to press it again to verify the log-off.

The program is controlled from a standard IBM PC keyboard. There are two basic groups of keys: function keys, which signal the start of an operation (e.g., begin scan, print image), and parameter keys, which set a program parameter (e.g., priority, document type). To provide greater appreciation of the structure and operation of the invention in the illustrated embodiment, these keys are now described.

Function Keys

Scanning Operation Keys

START SCAN—This key signals that the operator is ready to scan in a batch of documents. It will turn on the scanner and signal the operator, for example, by sounding a tone, that the scanning operations may begin. Once a scan operation has begun, the scanner will remain ready for scanning until one full minute passes without a scan operation or until the operator presses the STOP SCAN key.

STOP SCAN—This key signals that the operator wishes to halt scanning operations. The scanner is turned off and the system returns to the main menu.

Keys Valid Only During Scanning

VIEW LAST IMAGE—This key provides support in the event that the system goes down during scanning operations. It causes the program to retrieve the last image successfully scanned and display it on the screen.

VIEW PRINT IMAGE—This key enables the operator to view all images queued for printing.

VIEW NEXT IMAGE and VIEW PRIOR IMAGE—These keys are used for scrolling through images after VIEW LAST IMAGE or VIEW PRINT IMAGE has been pressed.

PRINT SCREEN IMAGE—This key causes the image currently displayed on the screen to be queued for printing. The image will be written out as a file and an entry placed in the print queue.

STOP VIEW—This key erases any images on screen. To recall images, VIEW LAST IMAGE or VIEW PRINT IMAGE is pressed again.

LOG-OFF—The operator uses this key to log off the system. As a safety measure, the key is pressed twice to verify log-off.

SHUT-DOWN—This key is used to log the operator off of the system and to shut down the Xenix file system in an orderly fashion so that machine may be powered off.

Keys Valid Any Time

QC ON/OFF—This key signals that the image should be displayed as it is scanned. It is followed by a number to indicate how often quality control (QC) viewing should take place: "0" indicates no QC, "1" indicates "view all images"; "2" indicates "view every second image," etc. This key may be pressed at any time to update the QC frequency.

Parameter Keys

Keys Valid Only When Not Scanning

CHANGE PRIORITY—This key together with a number sets the priority. Default priority is "overnight."

DOCUMENT TYPE—The document type is entered by pressing this key followed by the designated number key. The default Document Type is "bill of lading."

The detailed data flows for the image file server and its interaction with the other system components for the embodiment illustrated here are shown in the data flow diagrams of FIGS. 5-24. The Appendix to this specification lists and explains the abbreviations and acronyms labeling the various data flow diagrams. With the explanations of the Appendix these diagrams will be readily understood by those of ordinary skill in the art and thus need not be described in further detail here.

While the above provides a full and complete disclosure of an illustrative embodiment of the invention in a system intended for the trucking industry, various modifications and substitutions will be apparent to persons skilled in the relevant arts given the benefit of this disclosure. For example, the skilled artisan will appreciate that a system according to the invention may be implemented with different computers based on different computer architectures and the resulting implementation will necessarily be quite different from the example disclosed here. Analogous to the present example, the system may also be implemented for processing transaction documents arising in other modes of shipment as well. Accordingly, it is not intended that the invention be limited only to the specific examples and embodiments described herein, but that the invention be defined by the appended claims.

APPENDIX
Glossary of Abbreviations Used

| | |
|---|---|
| ARC | Archive |
| Ack | Acknowledgement |
| Arc | Archive |
| Attrib | Attribute |
| BOL | Bill of Lading |
| Blk | Block |
| Clct | Collection |
| Comm | Communication; commodity |
| Comp | Completed |
| Ctl | Control |
| Cur | Current |
| DB | Database |
| DPWS | Dual Page Work Station |
| DQ | De-queue |
| DR | Delivery receipt |
| Del | Delete |
| Diag | Diagnostics |
| DnLd | Download |
| Dnld | Download |
| Doc | Document |
| Drv | Drive |
| Dsply | Display |
| EMS | Event Management System |
| ENS | Enscribe |
| Excp | Exception |
| FS | File Server |
| Filt | Filter |
| HST | Host |
| Hst | Host |
| IBM | International Business Machines |
| IPC | Inter-process communication |
| Img | Image |
| Imgs | Images |
| Indx | Index |
| Info | Information |
| Init | Initial; initialize; initialization; initiate |
| JCL | Job Control Language |
| LAN | Local Area Network |
| LD | Linkage data |
| Loc | Location; local |
| MD | Magnetic Disk |
| MGMT | Management |
| MON | Monitor |
| MSG | Message |
| Mag | Magnetic |
| Mesgs | Messages |
| Mgmt | Management |
| Mgr | Manager |
| Msg | Message |
| NDX | Index |
| NQ | En-queue |
| Nxt | Next |
| OD | Optical Disk |
| ODUP | Optical Disk Utility Program |
| OP | Optical |
| OSF | Optical Storage Facility |
| Oper | Operations; operator |
| PUP | Peripheral Utility Program |
| PWS | Print Work Station |
| Prnt | Print |
| Purg | Purge |
| Q | Queue |
| Que | Queue |
| REQ | Request |
| RJE | Remote Job Entry |
| RWS | Remote Work Station |
| Rcv | Receive |
| Rdy | Ready |
| Res | Resource |
| Rest | Restored |
| Rls | Release |
| Rply | Reply |
| Rqst | Request |
| Rtrvl | Retrieval |
| SQL | Structured Query Language |
| SQLCI | SQL Conversational Interface |
| Scn | Scan |
| Scrn | Screen |
| Slt | Slot |
| Stat | Statistic |
| Stats | Statistics |
| Stn | Station |
| Sts | Status |
| Sys | System |
| Tbl | Table |
| Temp | Temporary |
| Updt | Update |
| Upld | Upload |
| WIP | Work-In-Process |
| WQ | Wait queue |
| WS | Work Station |
| X25 | X.25 |
| Xmit | Transmit |
| Xpt | Exception |
| Xptn | Exception |

What is claimed is:

1. An integrated shipping transaction management and billing system comprising:

image means for providing images of shipping documents to said system from a plurality of sources, said shipping documents characterizing individual shipping transactions; and a transaction processing facility receiving images of said shipping documents from said image means for processing said shipping transactions, comprising:

storage means for storing the document images received from said image means;

a plurality of image processing stations, each station including a display monitor;

image management means including means for acknowledging receipt of said images in said transaction processing facility, for maintaining a database of said images, and for providing images to said image processing stations on command in prescribed workflow queues for processing according to shipment priority;

database means providing a shipping transaction database and shipping-transaction data-processing instructions for use in processing said shipping transactions; and means for entering transaction data into said shipping transaction database responsive to said instructions based on document images displayed on said display monitors at said image processing stations.

2. The system of claim 1 wherein said image means for providing said images comprises a plurality of scanning stations including scanners for capturing the images of said shipping documents.

3. The system of claim 2 wherein said scanning stations are remote from said processing facility and include means for transmitting said images to said processing facility and wherein said processing facility includes means for receiving the transmitted images from said remote scanning stations.

4. The system of claim 1 wherein said image means for providing said images comprises a means for receiving a plurality of facsimile transmissions of documents from said plurality of sources.

5. The system of claim 1 wherein said image management means includes means for storing said images in unstructured files and SQL pointers for pointing to images in said unstructured files.

6. The system of claim 1 wherein said storage means is structured and arranged to store each said received image in at least two storage locations.

7. The system of claim 1 wherein said database means includes at least one applications screen and said means for entering transaction data includes a characteristic trigger string embedded in said applications screen for providing shipping-transaction data-entry instructions to operators at said image processing workstations.

8. The system of claim 7 wherein said characteristic trigger string contains indicia for specifying a selected one of said prescribed image-processing workflow queues.

9. The system of claim 1 wherein said database means is provided by a host computer and said image management means is provided by a second computer distinct from said host computer.

* * * * *